(12) United States Patent
Masone et al.

(10) Patent No.: US 12,116,468 B2
(45) Date of Patent: Oct. 15, 2024

(54) COMPOSITE PARTICLES COMPRISING A HYDROPHOBIC DYE AND AN AMPHIPHILIC BLOCK COPOLYMER AND USE THEREOF IN OPTICAL APPLICATIONS

(71) Applicant: Coloursmith Labs Inc., Halifax (CA)

(72) Inventors: Gabrielle Masone, Halifax (CA); Morrgan Payne, Halifax (CA); Yuan Pang, Halifax (CA); Ian Desmond Conrod, Halifax (CA); William Michael Anthony Curtis, Dartmouth (CA); Nancy Kilcup, Dartmouth (CA); Roderick Angus Chisholm, Head of Chezzetcook (CA)

(73) Assignee: Coloursmith Labs Inc., Halifax (CA)

( * ) Notice: Subject to any disclaimer, the term of this patent is extended or adjusted under 35 U.S.C. 154(b) by 233 days.

(21) Appl. No.: 17/614,048

(22) PCT Filed: May 25, 2020

(86) PCT No.: PCT/CA2020/050708
§ 371 (c)(1),
(2) Date: Nov. 24, 2021

(87) PCT Pub. No.: WO2020/237363
PCT Pub. Date: Dec. 3, 2020

(65) Prior Publication Data
US 2022/0235197 A1 Jul. 28, 2022

Related U.S. Application Data

(60) Provisional application No. 62/852,535, filed on May 24, 2019.

(51) Int. Cl.
C08K 5/1545 (2006.01)

(52) U.S. Cl.
CPC .................................. C08K 5/1545 (2013.01)

(58) Field of Classification Search
CPC .................................................... C08K 5/1545
USPC ........................................................ 523/106
See application file for complete search history.

(56) References Cited

U.S. PATENT DOCUMENTS

| | | | |
|---|---|---|---|
| 4,157,892 A | 6/1979 | Tanaka et al. | |
| 4,252,421 A | 2/1981 | McCarry | |
| 5,034,166 A | 7/1991 | Rawlings et al. | |
| 5,292,350 A | 3/1994 | Molock et al. | |
| 5,846,457 A | 12/1998 | Hoffman | |
| 5,938,795 A | 8/1999 | Molock et al. | |
| 7,572,841 B2 | 8/2009 | Chen et al. | |
| 8,133,274 B2 | 3/2012 | Zhou et al. | |
| 8,820,923 B2 | 9/2014 | Harding et al. | |
| 8,845,095 B2 | 9/2014 | Harding et al. | |
| 8,931,930 B2 | 1/2015 | Harding et al. | |
| 8,939,576 B2 | 1/2015 | Harding et al. | |
| 9,022,562 B2 | 5/2015 | Harding et al. | |
| 9,574,067 B2 | 2/2017 | Harding et al. | |
| 9,594,188 B2 | 3/2017 | Chauhan et al. | |
| 9,885,883 B2 | 2/2018 | Harding et al. | |
| 9,956,179 B2 | 5/2018 | Johnson et al. | |
| RE47,983 E | 5/2020 | Gao et al. | |
| 10,739,349 B2 | 8/2020 | Chiu et al. | |
| 2002/0096795 A1* | 7/2002 | Chandler | B01J 13/046 264/4.1 |
| 2010/0069550 A1 | 3/2010 | Gao et al. | |
| 2011/0022129 A1 | 1/2011 | Prud'Homme et al. | |
| 2017/0000908 A1 | 1/2017 | Li et al. | |
| 2019/0154831 A1 | 5/2019 | Decker et al. | |
| 2019/0169438 A1 | 6/2019 | Fromentin et al. | |
| 2019/0234953 A1 | 8/2019 | Chiu et al. | |

FOREIGN PATENT DOCUMENTS

| | | |
|---|---|---|
| CA | 2371965 | 8/2002 |
| CA | 2603510 | 10/2006 |
| EP | 0396376 | 11/1990 |
| EP | 3363862 | 8/2018 |
| JP | 2005263953 A | 9/2005 |
| JP | 2006347728 A | 12/2006 |
| JP | 2007033808 A | 2/2007 |
| JP | 2007538113 A | 12/2007 |
| JP | 2011516627 A | 5/2011 |
| JP | 2015525245 A | 9/2015 |
| JP | 2018145366 A | 9/2018 |
| JP | 2019038973 A | 3/2019 |
| JP | 2022516248 A | 2/2022 |

(Continued)

OTHER PUBLICATIONS

Chinese First Office Action dated May 5, 2023.
Abdel-Rahman Badawy, Muhammad Umair Hassan, Mohamed Elsherif, Zubair Ahmed, Ah K. Yetisen, and Haider Butt. Contact Lenses for Color Blindness. Adv. Healthcare Mater. 2018, 7, 1800152.
Samuel Gause and Anuj Chauhan. Incorporation of ultraviolet (UV) absorbing nanoparticles in contact lenses for Class UV blocking. J, Mater Chem. B, 2016, 4, 327-339.
Min-Jae Lee and A-Young Sung. Polymerization and Preparation of Functional Ophthalmic Material Containing Carbon Nanoparticles. Korean J. Mater. Res. vol. 28, No. 8 (2018).

(Continued)

*Primary Examiner* — Deve V Hall
(74) *Attorney, Agent, or Firm* — BERESKIN & PARR LLP / S.E.N.C.R.L., s.r.l.

(57) ABSTRACT

Composite particles comprising a hydrophobic dye and an amphiphilic block copolymer encapsulating the dye are disclosed. The dye exhibits absorbance peaks at one or more points in the ultraviolet, visible, or infrared regions of the electromagnetic spectrum. The particles are thus useful in optical applications, such as the preparation of contact lenses that screen out harmful radiation. In select embodiments, the dye is Zinc (II) 5, 10, 15, 20-(tetraphenyl) porphyrin and the copolymer is an acrylate or PEO copolymer that has been crosslinked.

20 Claims, 39 Drawing Sheets

(56) References Cited

FOREIGN PATENT DOCUMENTS

| WO | 2009126388 A1 | 10/2009 |
|---|---|---|
| WO | WO2009126388 | 10/2009 |
| WO | 2013160773 A2 | 10/2013 |
| WO | WO2015171507 | 11/2015 |
| WO | 2018081780 A2 | 5/2018 |
| WO | 2018085483 A1 | 5/2018 |
| WO | WO2020046948 | 3/2020 |

OTHER PUBLICATIONS

Y Shona Pek, Hong Wu, Edwin P Y Chow & Jackie Y Ying. Transparent nanostructured photochromic UV-blocking soft contact lenses. Nanomedicine (Lond.) (2016) 11(12), 1599-1610.

A-Young Sung and Tae-Hun Kim. High Functional Nano Materials for Ophthalmic Lenses Containing Silicon 2,3- Naphthalocyanine Bis(trihexylsiiyloxide) and Silicon 2,9, 16,23-Tetra-Tert-Butyl-29H31 H-Phthalocyanine Dihydroxide. J. Namsci. Nanotechnol. 2014, vol. 14, No. 11.

Kevin M Pustulka 1 , Adam R Wohl, Han Seung Lee, Andrew R Michel, Jing Han, Thomas Hoye, Alon V McCormick, Jayanth Panyam, Christopher W Macosko. Flash nanoprecipitation: particle structure and stability. Mol Pharm. Nov. 4, 2013;10(11):4367-77.

Hao Shen et al: "Self-assembling process of flash nanoprecipitation in a multi-inlet vortex mixer to produce drug-loaded polymeric nanoparticles", Journal of Nanoparticle Research ; An Interdisciplinary Forum for Nanoscale Science and Technology, Kluwer Academic Publishers, DO, vol. 13, No. 9, Apr. 11, 2011 (Apr. 11, 2011), pp. 4109-4120, XP019937336, ISSN: 1572-896X, DOI: 10.1007/S11051-011-0354-7.

Petzetakis Nikos et al: "Hollow Block Copolymer Nanoparticles through a Spontaneous One-step Structural Reorganization", ACS Nano, vol. 7, No. 2, Feb. 7, 2013 (Feb. 7, 2013), pp. 1120-1128, XP055941484, US ISSN: 1936-0851, DOI: 10.1021/nn400272p.

Zhang Ze-sheng et al., "Stability of Water-Soluble Nano-Micelle Formulation of Lutein Loaded in Amphiphilic Block Copolymer", Journal of Tianjin University of Science & Technology, vol. 25, No. 4, pp. 33-36.

English Translation of Japanese Office Action dated Mar. 25, 2024.

\* cited by examiner

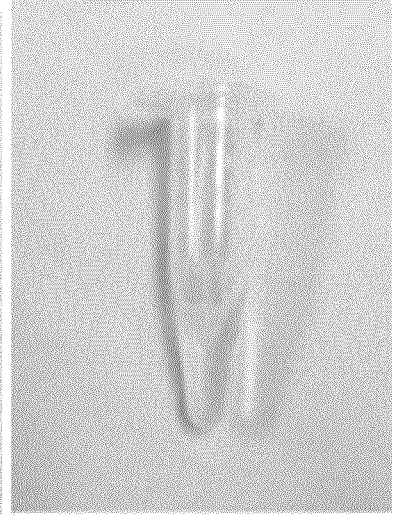
Figure 3A     Figure 3B
Figure 3C

G

H

I

J

K

D

E

F

G

H

I

J

K

A

B

A

B

C

D

G

H

COMPOSITE PARTICLES COMPRISING A HYDROPHOBIC DYE AND AN AMPHIPHILIC BLOCK COPOLYMER AND USE THEREOF IN OPTICAL APPLICATIONS

CROSS-REFERENCE TO RELATED APPLICATIONS

The present application is a U.S. national phase entry of PCT/CA2020/050708, filed May 25, 2020 which claims the benefit of priority from U.S. provisional application No. 62/852,535, filed May 24, 2019, the contents of which are incorporated herein by reference in their entirely.

FIELD

The present disclosure relates to composite particles comprising one or more hydrophobic dyes and one or more amphiphilic block copolymers and to compositions comprising such composite particles, and their use, for example, to selectively filter light, optionally in contact lenses, including hydrogel-based and silicone hydrogel-based contact lenses. The present disclosure also relates to the ophthalmic lens comprising one or more composite particles or one or more compositions of the present disclosure.

INTRODUCTION

Optical filters are devices having wavelength-selective transmission acting on sources or receivers of light. Such filters may be configured to transform aspects of colour appearance as seen by the human eye or any recording devices. Optical filters are useful, for example, in situations where certain wavelength(s) of light must be controlled, modulated, or attenuated, particularly in fields including but not limited to vision care, medical treatments, ophthalmic lens development, cinematography, and entertainment. For example, optical filters in ophthalmic lenses can provide eye-protection from high-energy radiation in the ultra-violet (UV), visible, and/or infrared spectra. Optical filters can also provide cosmetic benefits, such as colour balancing to improve contact lens aesthetics or colour augmentation for entertainment or to achieve a desired visual effect. Further, optical filters can serve in medical applications of ophthalmic lenses, such as altering human spectral responses associated with the short (S), medium (M), and long (L) cone cell photoreceptors for use in treating genetic and/or non-genetic vision conditions, such as colour vision deficiencies or myopia.

Currently, two different methods exist to prepare optical filtering contact lenses containing light-filtering additives such as dye(s). The first method is the incorporation of dye(s) into contact lenses by soaking hydrated or non-hydrated lenses in a bath of dye(s) and solvent. This method can result in the migration of dye molecules out of the bulk, hydrogel material, loss or reduction in optical filtering ability, and potential for health concerns resulting from the release of dye(s) onto the eye.

The second method is the incorporation of dye(s) into contact lenses is to directly cure a solution of contact lens monomer containing a dye where the dye is especially functionalized to be reactive to contact lens monomer. For example, the dyes can be functionalized with a vinylsulfonyl group or a halogen triazine group. Although attempts to polymerize dye(s) with the hydrogel monomer could significantly reduce the migration of dye molecules out of the bulk hydrogel material, only a limited number of commercially valuable dyes have the correct local chemistries required for covalent attachment to the bulk hydrogel material. Applying this method to a non-functionalized dye would often necessitate elaborate de novo redesign and modification of dyes to have the correct local chemistries to satisfy covalent attachment within the bulk hydrogel material. Further, synthetically altering non-functionalized dye in this manner could result in the alteration of the dye's natural absorption spectra, rendering it unsuitable for use as an optical filter for the desired application for which it was selected.

For example, light-absorbing dye zinc(II) tetraphenylporphyrin (Zn (II) TPP) has optical properties that would make it commercially valuable as a HEV/blue light blocker in contact lenses. However, Zn (II) TPP does not have the correct local chemistries required for direct covalent attachment to the bulk hydrogel material. Synthetically modifying Zn (II) TPP to provide the correct functionalization would result in the loss, reduction, and/or alteration of its HEV/blue light blocking ability.

Depending on the particular setting where light-absorbing additives are used, different challenges arise from this method that necessitate various properties of the dyes employed.

For instance, dye(s) to be integrated into the contact lens monomer may be exposed to a number of harsh lens manufacturing processes and conditions, such as photosetting by UV/HEV light, thermosetting by the application of heat, and/or catalyst initiated polymerization by incorporating a polymerization catalyst in the bulk contact lens monomer. Further, during use, contact lenses containing dye(s) may be exposed to damaging UV/HEV radiation from natural and/or artificial sources.

The manufacture of hydrogel-based contact lenses often uses photosetting by use of UV/HEV light could degrade the optical properties of dyes, which render many dyes non-useful for optical filtering applications in contact lenses.

Further, dyes may be exposed during lens manufacture to various organic solvent extraction, solvent washing, hydration, autoclave sterilization, and/or prolonged exposure to high or low temperatures during. One of the solvents used during manufacture of contact lenses is ethanol.

SUMMARY

The present disclosure relates to composite particles, compositions comprising such composite particles and methods of preparation thereof. The present disclosure also relates to their use as optical filters in contact lenses, and methods of optical filtration in contact lenses. The present disclosure further relates to a contact lens comprising composite particles or compositions thereof.

Accordingly, in one aspect, the present disclosure includes a composite particle comprising:
 a hydrophobic dye; and
 an amphiphilic block copolymer encapsulating the hydrophobic dye, wherein the hydrophobic dye has an absorbance in the range of from the ultraviolet region to the infrared region of the electromagnetic spectrum.

In another aspect, the present disclosure includes a composition comprising composite particles of the present disclosure in a solvent selected from aqueous solvent, organic solvent and combinations thereof.

In another aspect, the present disclosure includes a contact lens comprising one or more composite particles or compositions of the present disclosure.

In another aspect, the present disclosure includes a composite particle or a composition of the present disclosure for use as an optical filter, optionally as an optical filter in contact lenses, optionally wherein the contact lenses are hydrogel or silicone hydrogel based.

In another aspect, the present disclosure includes use of one or more composite particles or compositions of the present disclosure as an optical filter, optionally as an optical filter in contact lenses.

In another aspect, the present disclosure includes a method of optical filtration comprising selectively blocking light radiation using one or more composite particles or compositions of the present disclosure.

In another aspect, the present disclosure includes a method of preparing a composition of the present disclosure comprising:
  preparing a dye/polymer solution comprising the hydrophobic dye and the amphiphilic block copolymer in an organic solvent; and
  adding the dye/polymer solution to water, while mixing, to obtain the composition as an aqueous micelle solution.

In another aspect, the present disclosure includes a method of preparing a composition of the present disclosure comprising a composite particle of the present disclosure, as an aqueous solution, the method comprising:
  preparing a dye/polymer/crosslinking agent solution comprising the hydrophobic dye, the amphiphilic block copolymer and one or more crosslinking agents in an organic solvent;
  adding the dye/polymer/crosslinking agent solution to water, while mixing, to obtain an aqueous micelle solution.

A method of preparing a composite particle of the present disclosure, comprising:
  preparing a dye/polymer solution comprising the hydrophobic dye and the amphiphilic block copolymer in an organic solvent;
  adding the dye/polymer solution to water, while mixing, to obtain the composite particle in an aqueous solution; and
  optionally obtaining the composite particle from the aqueous solution by filtration.

A method of preparing a composite particle of the present disclosure, comprising
  preparing a dye/polymer/crosslinking agent solution comprising the hydrophobic dye, the amphiphilic block copolymer, and a crosslinking agent in an organic solvent;
  adding the dye/polymer/crosslinking agent solution to water, while mixing, to obtain an aqueous solution; and
  optionally obtaining the composite particle from the aqueous solution by filtration.

Other features and advantages of the present disclosure will become apparent from the following detailed description. It should be understood, however, that the detailed description and the specific examples, while indicating embodiments of the application, are given by way of illustration only and the scope of the claims should not be limited by these embodiments, but should be given the broadest interpretation consistent with the description as a whole.

DRAWINGS

The embodiments of the application will now be described in greater detail with reference to the attached drawings in which.

FIG. 3 shows the physical appearance of the dye Epolight™ 5843 without and with encapsulation. Panel A shows the insoluble dye in water without encapsulation. Panel B shows the dye dissolved in tetrahydrofuran (THF). Panel C shows an exemplary image of the encapsulated dye in an aqueous medium.

FIG. 4 shows the spectral data and physical appearance of a composite particle composition comprising the dye Exciton ABS 594 according to an embodiment of the present disclosure. Panel A shows a comparison between the UV-Vis absorption spectrum of the dye without and with encapsulation. Panel B shows a calibration curve of the encapsulated dye in 10% THF and 90% water.

FIG. 5 shows the spectral data and physical appearance of a composite particle composition comprising the dye Exciton ABS 456 according to an embodiment of the present disclosure. Panel A shows a comparison between the UV-Vis absorption spectrum of the dye without and with encapsulation. Panel B shows a calibration curve of the encapsulated dye in 10% THF and 90% water.

Figure 6A:
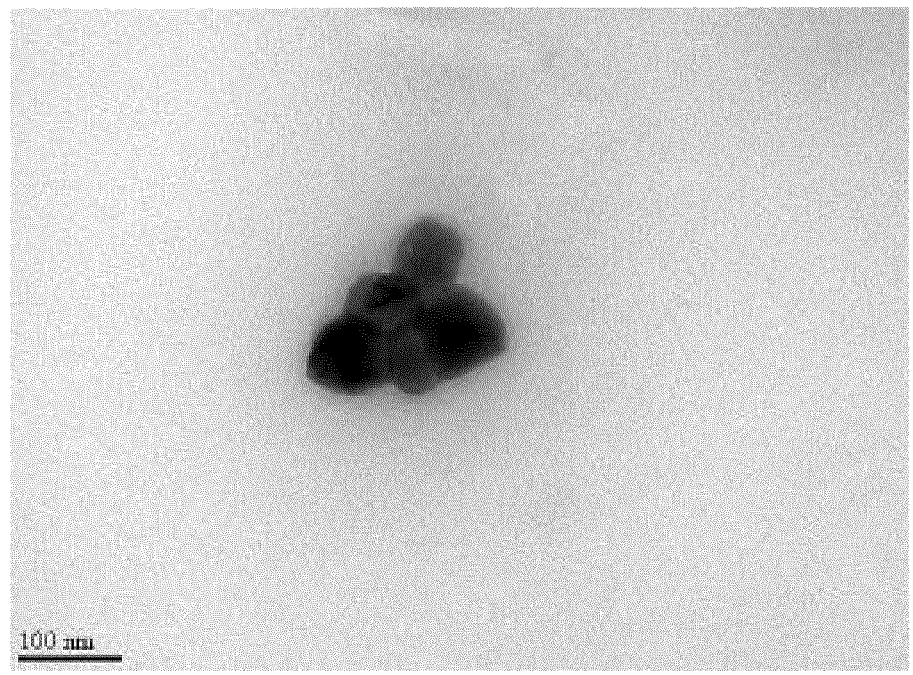
Figure 6B:
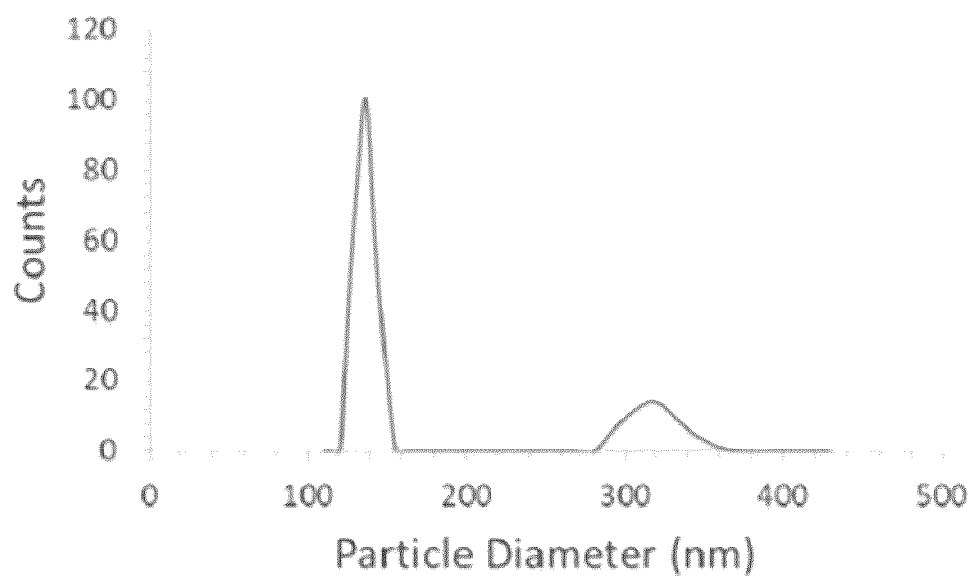

FIG. 6 shows an exemplary transmission electron microscopy (TEM) image and dynamic light scattering (DLS) results of a composite particle comprising the dye Exciton ABS 594 according to an embodiment of the present disclosure. Panel A shows a TEM image of the composite particle comprising the dye Exciton ABS 594. Scale bar indicates 100 nm. Panel B shows the DLS results of the composite particle comprising the dye Exciton ABS 594.

Figure 7A:
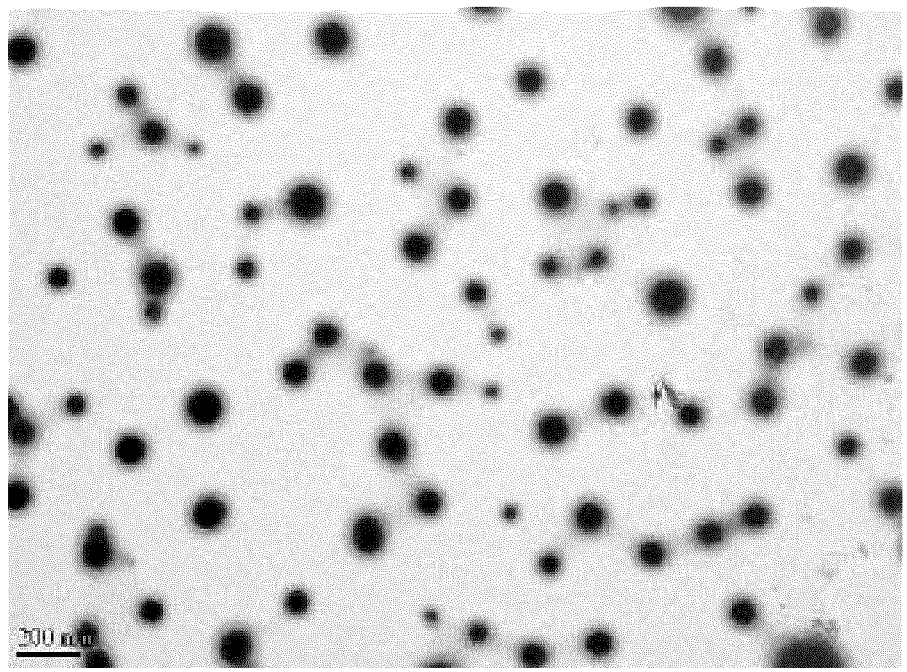
Figure 7B:
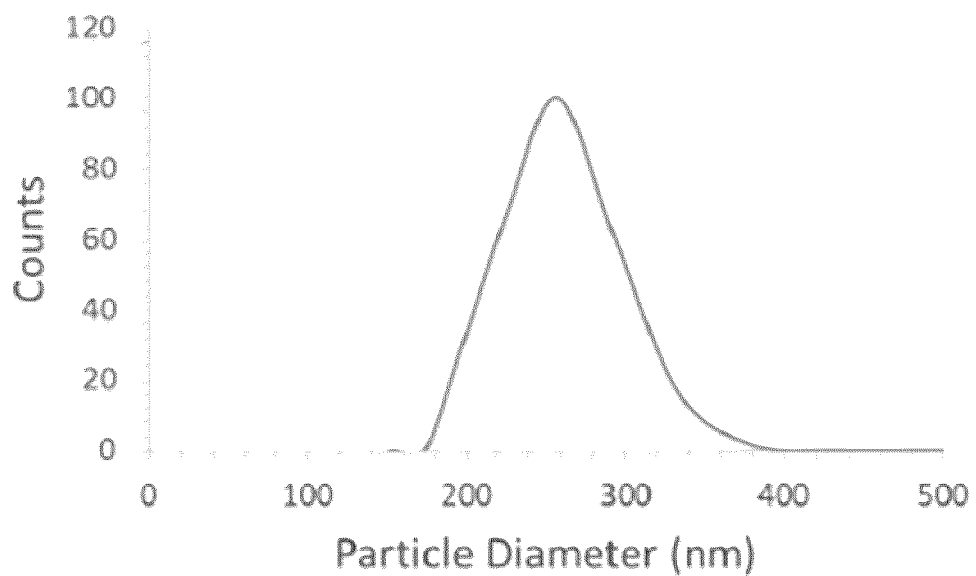

FIG. 7 shows an exemplary TEM image and the DLS results of a composite particle comprising the dye Exciton ABS 456 according to an embodiment of the present disclosure. Panel A shows a TEM image of the composite particle comprising the dye Exciton ABS 456. Scale bar indicates 200 nm. Panel B shows the DLS results of the composite particle comprising the dye Exciton ABS 456.

Figure 8:
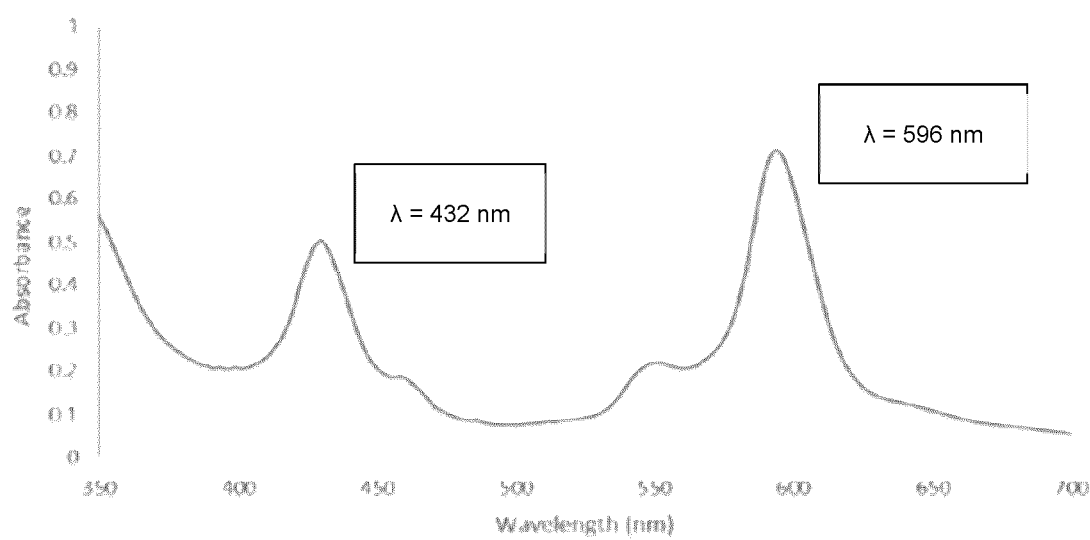

FIG. 8 shows the UV-Vis absorbance spectrum of a composition of the Exciton ABS 594 composite particles and the Exciton ABS 456 composite particles according to an embodiment of the present disclosure.

FIG. 9 shows the UV-Vis absorbance spectra of composite particle compositions formed using General Encapsulation Procedures 1, 2, and 3 according to embodiments of the present disclosure. Panel A shows a comparison between the free dye and the composite particle composition formed using a syringe pump (General Encapsulation Procedure 2). Panel B shows a comparison between composite particle compositions formed using a syringe pump (General Encapsulation Procedure 2) and Pasteur pipette (General Encapsulation Procedure 1). Panel C shows a comparison between composite particle compositions formed using a syringe pump (General Encapsulation Procedure 2) and FNP (General Encapsulation Procedure 3).

Figure 10:
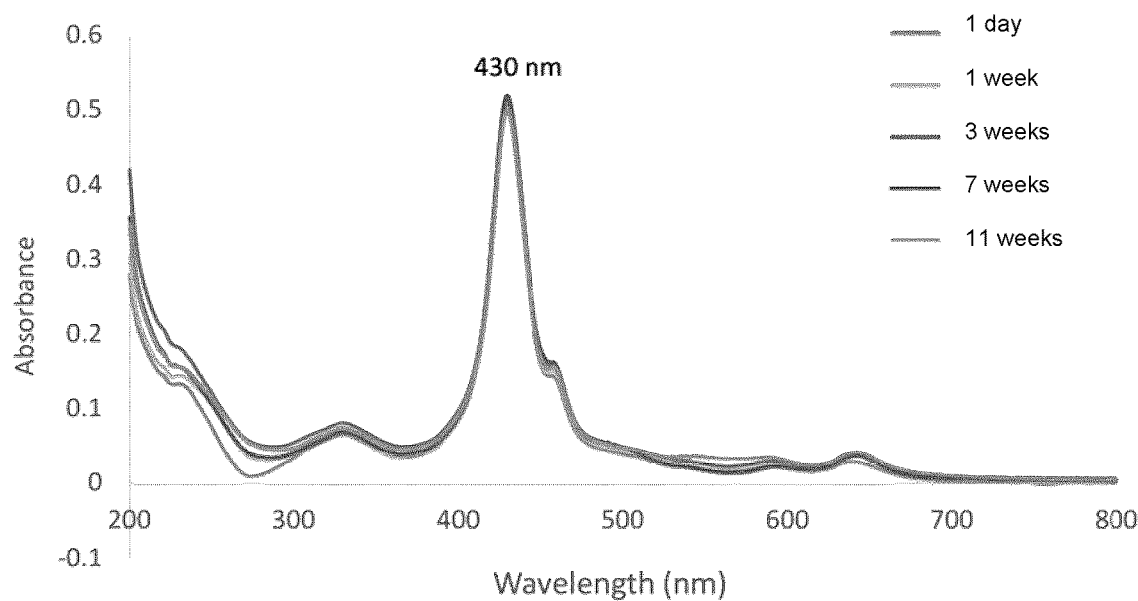

FIG. 10 shows an overlay of UV-Vis spectra of Exciton ABS 456 composite particle composition at different time points (1 day, 1 week, 3 weeks, 7 weeks and 11 weeks) according to embodiments of the present disclosure.

FIG. 11 shows results of a UV stability test for an Exciton ABS 456 composite particle composition according to an embodiment of the present disclosure and free dye. Panel A shows a comparison between the UV-Vis absorbance spectrum of the free dye before and after UV exposure of various lengths of time (10, 20 or 30 minutes). Panel B shows a comparison between the UV-Vis absorbance spectrum of the composite particle composition before and after UV exposure.

FIG. 12 shows the DLS results of an Exciton ABS 456 composite particle composition before and after UV exposure according to an embodiment of the present disclosure. Panels A and B show the number distribution and the intensity distribution, respectively, of the composite particle composition before UV exposure. Panels C and D show the number distribution and the intensity distribution, respectively, of the composite particle composition after UV exposure. Panels E and F show scanning electron microscopy (SEM) images of the composite particle before and after UV exposure, respectively. Scale bar in each SEM indicates 5 μm.

Figure 13:
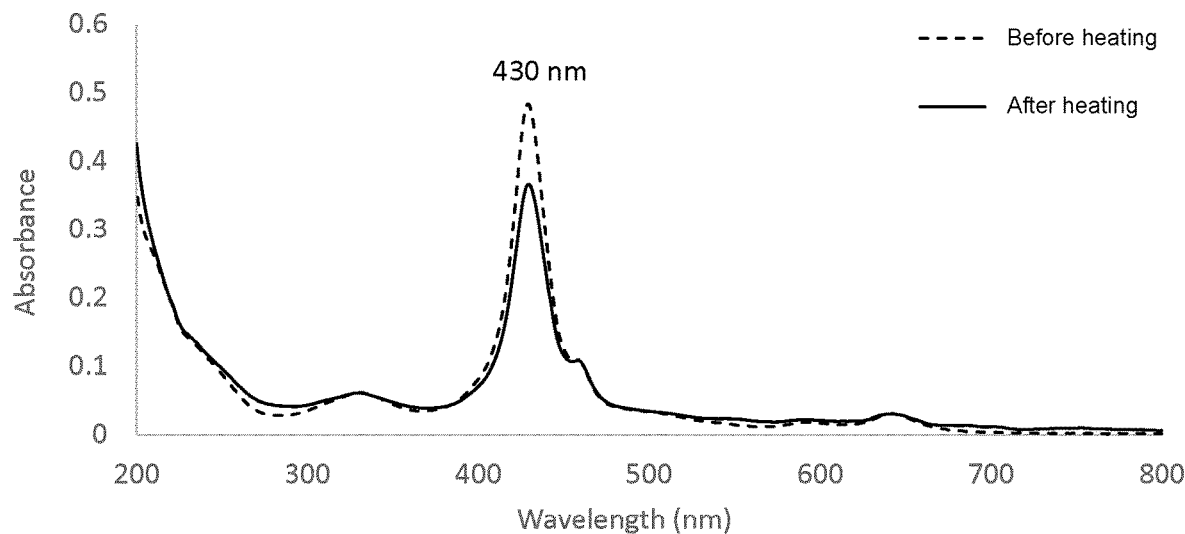

FIG. 13 shows a comparison of the UV-Vis spectra of an Exciton ABS 456 composite particle composition according to an embodiment of the present disclosure before and after heating.

Figure 14:
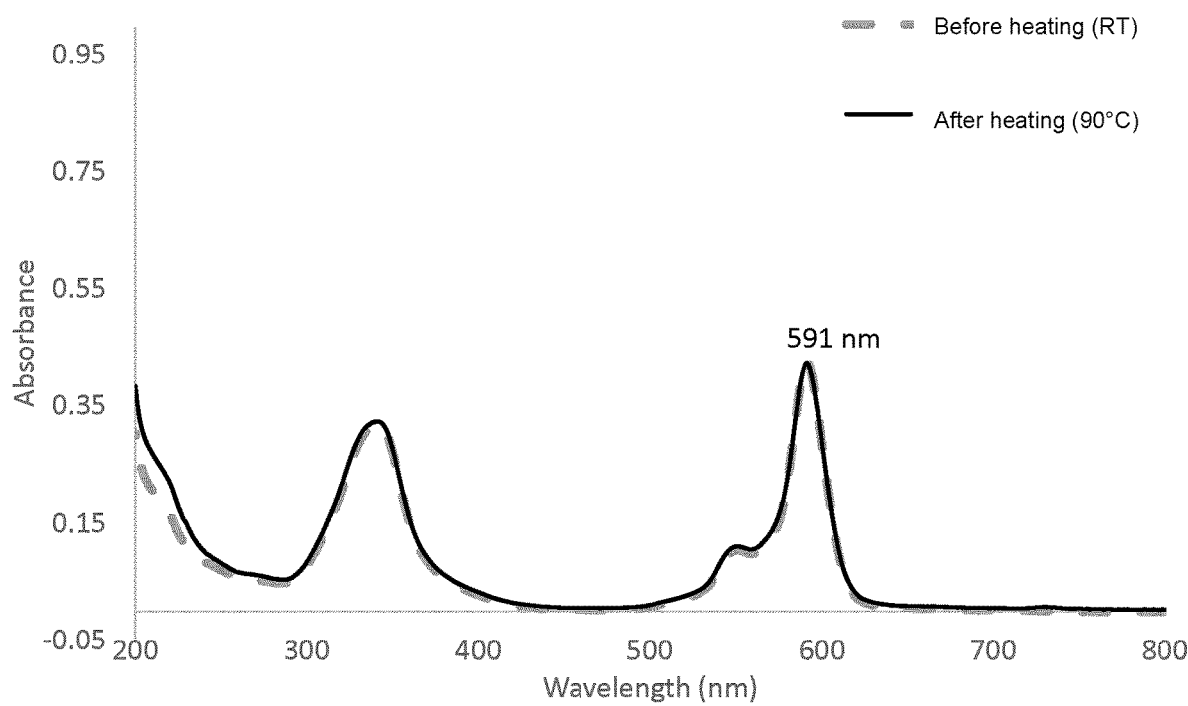

FIG. 14 shows the absorbance spectra of an Exciton ABS 594 composite particle composition according to an embodiment of the present disclosure before and after heating.

FIG. 15 shows the UV-Vis spectra of an Exciton ABS 456 composite particle composition according to an embodiment of the present disclosure in different concentrations of THF/water at different time points and after UV bleaching. Panel A shows the UV-Vis spectra of the composite particle composition in 35% v/v THF following UV exposure at various lengths of time. Panel B shows the UV-Vis spectra of the composite particle composition in 10% v/v THF following UV exposure at various lengths of time. Panel C shows the UV-Vis spectra of the composite particle composition in 64% v/v THF following UV exposure at various lengths of time. Panel D shows the UV-Vis spectra of the composite particle composition in 99% v/v THF following UV exposure at various lengths of time.

Figure 16:
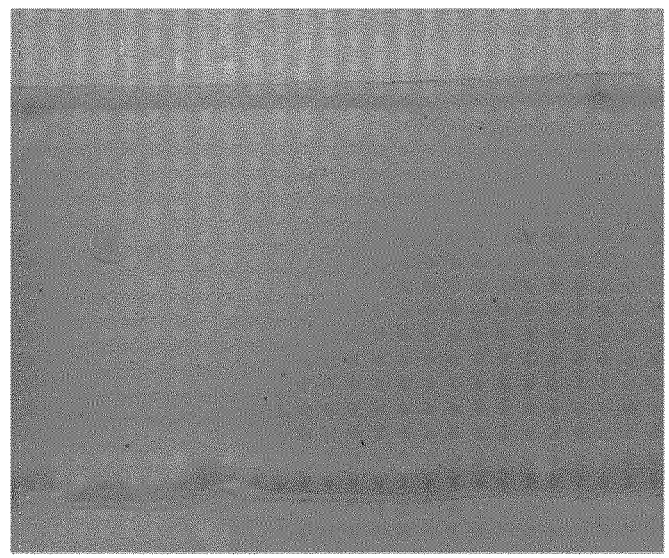

FIG. 16 shows an optical image of a polyacrylamide gel doped with ABS 594 and ABS 456 encapsulated dye micelles according to an embodiment of the present disclosure.

Figure 17:
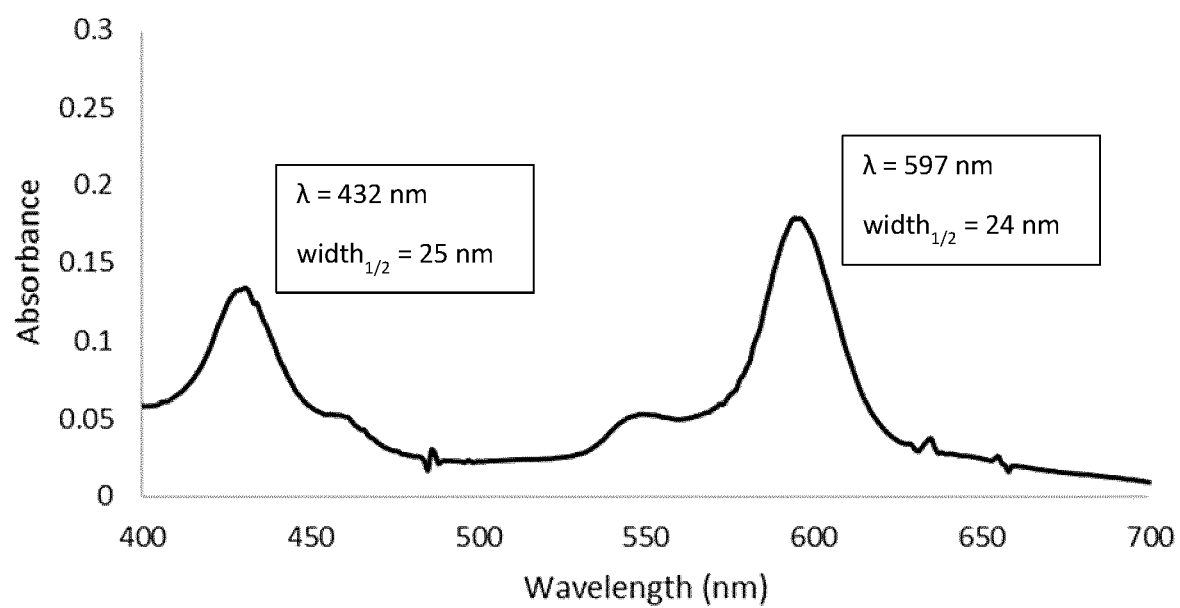

FIG. 17 shows an absorbance spectrum of a polyacrylamide gel doped with ABS 594 and ABS 456 encapsulated dye micelles according to an embodiment of the present disclosure.

Figure 18:
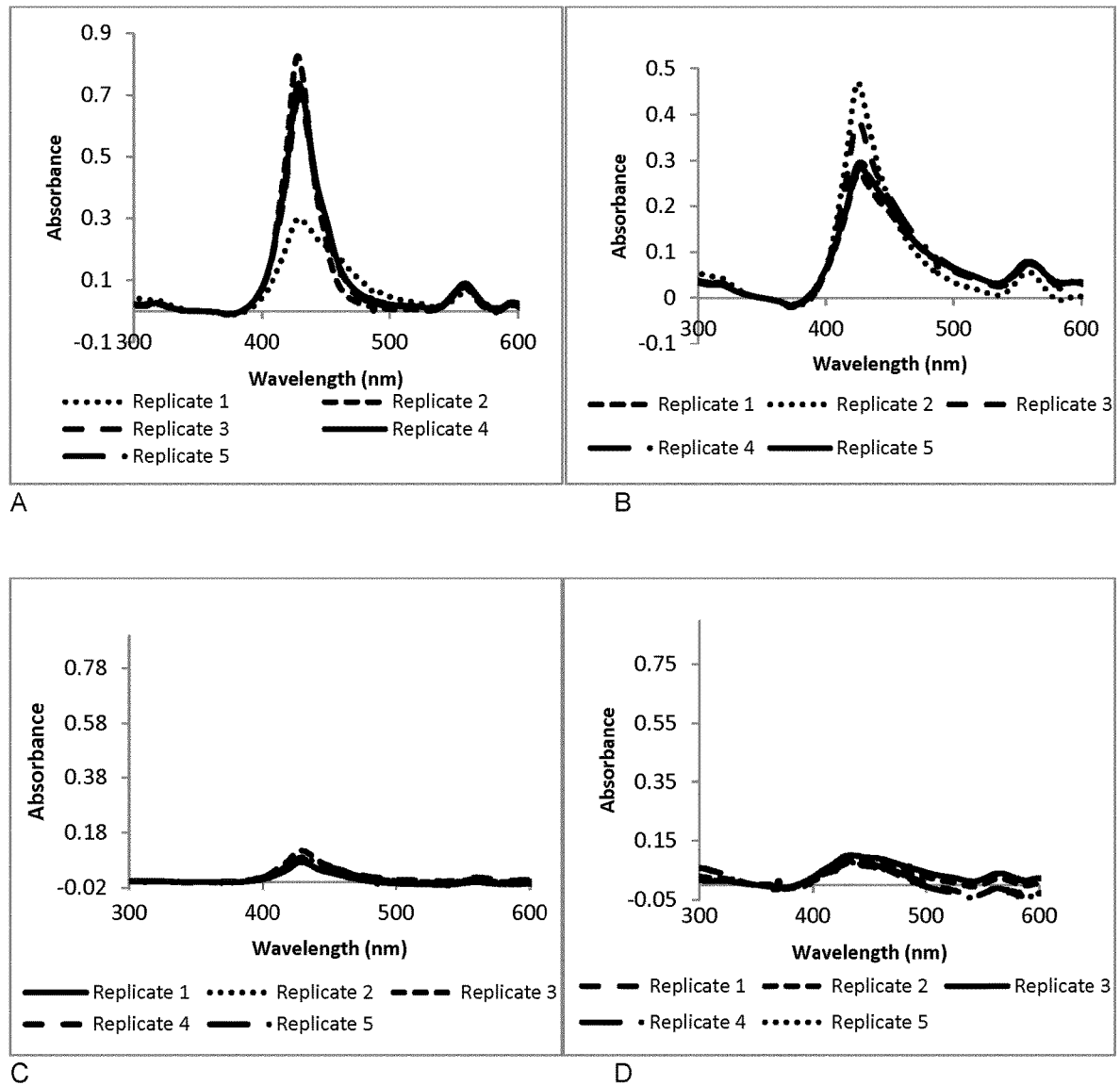

FIG. 18 shows the UV-Vis absorbance spectra of composite particles prepared using direct injection (A), flash nanoprecipitation (B), ultrasonic method (C) and vortex method (D).

Figure 19:
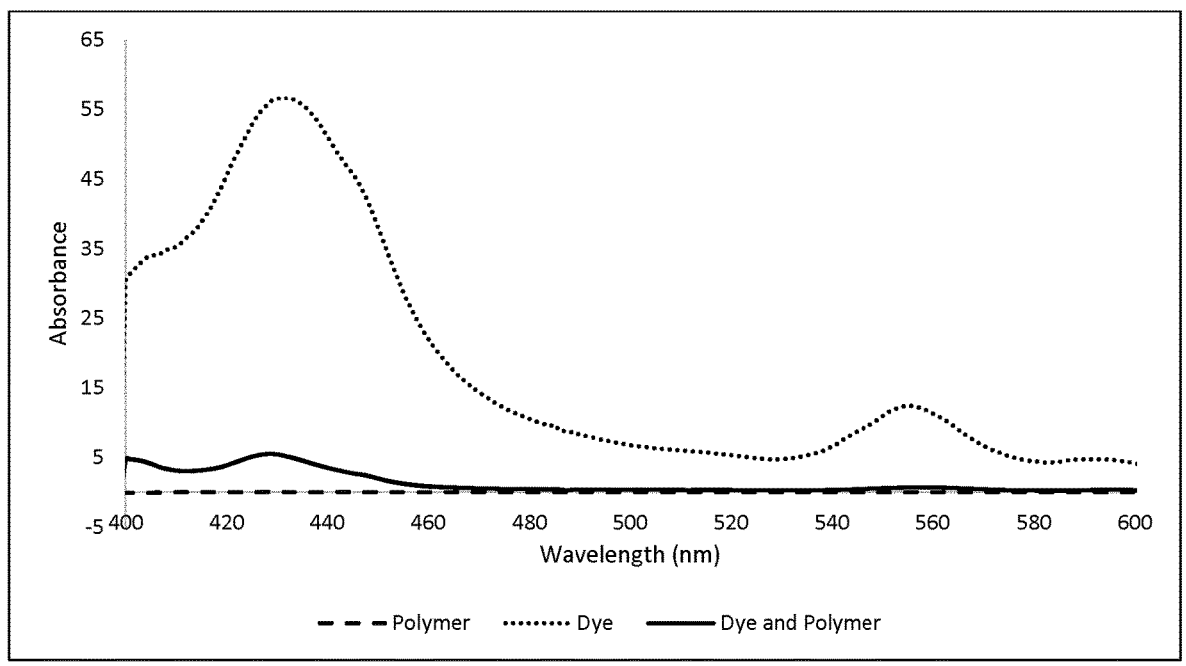

FIG. 19 shows the UV-Vis absorbance of amphiphilic block copolymer, free dye and dye+amphiphilic block copolymer after flocculation with calcium chloride.

Figure 20:
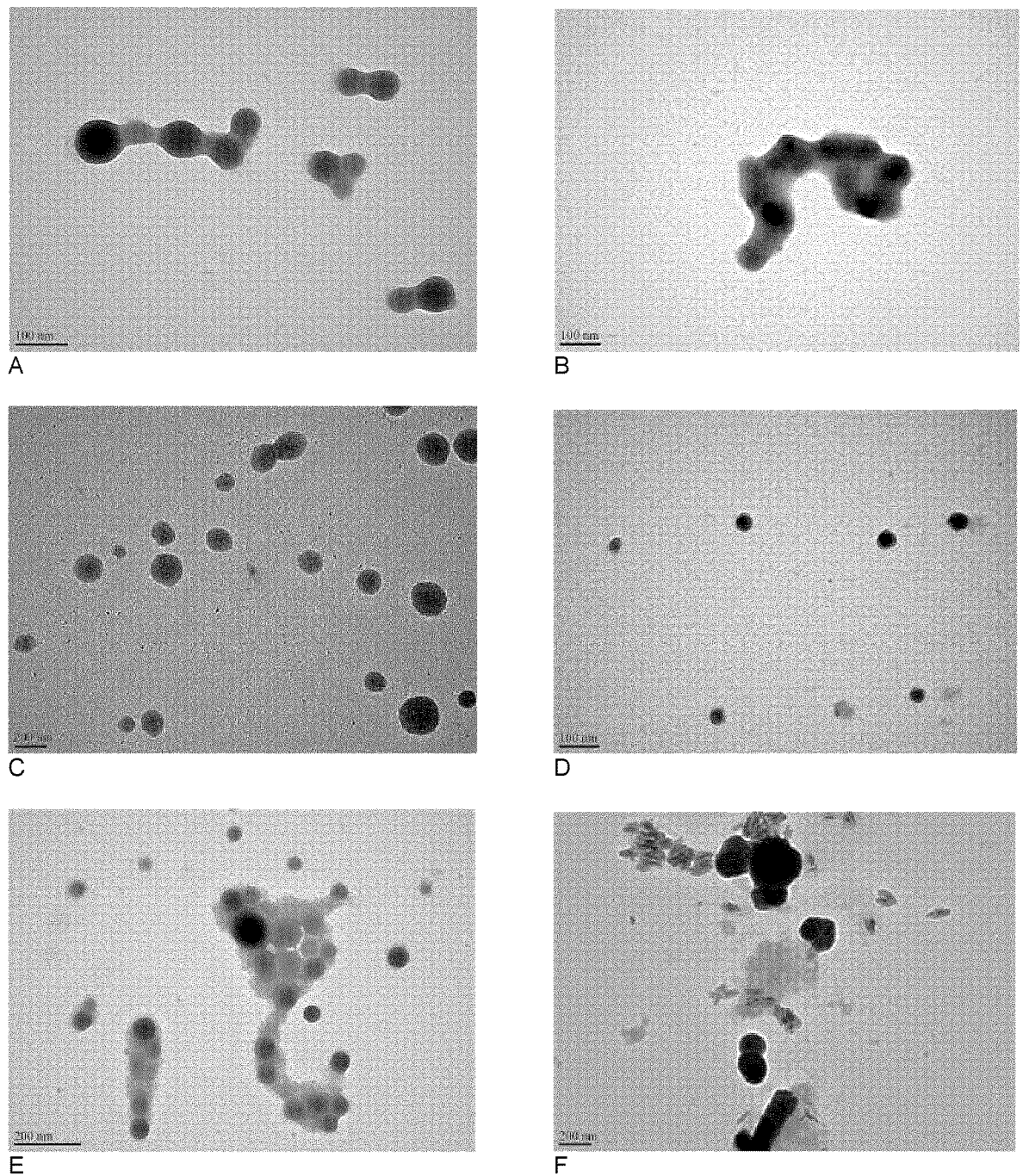
Figure 20:
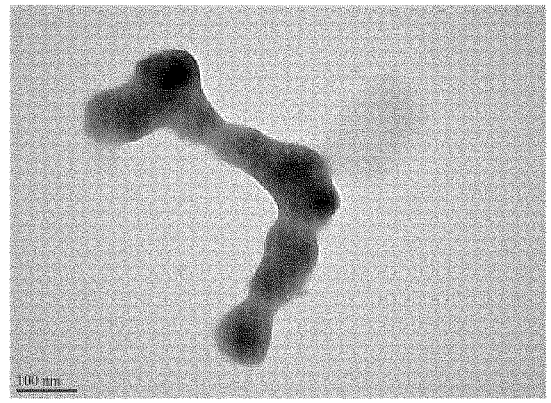
Figure 20:
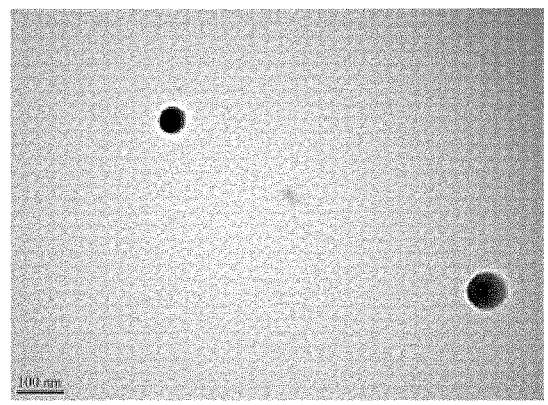
Figure 20:
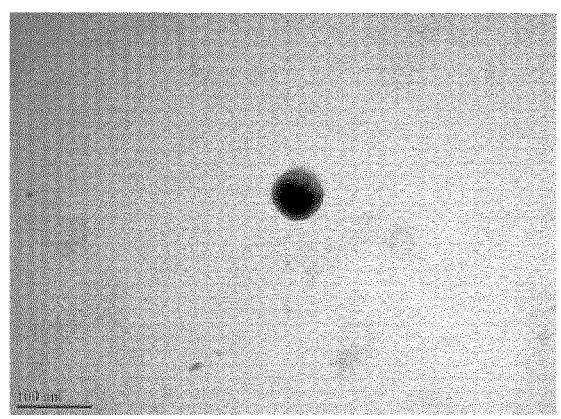
Figure 20:
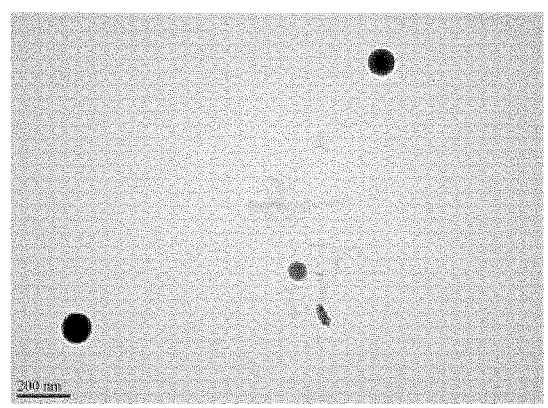
Figure 20:
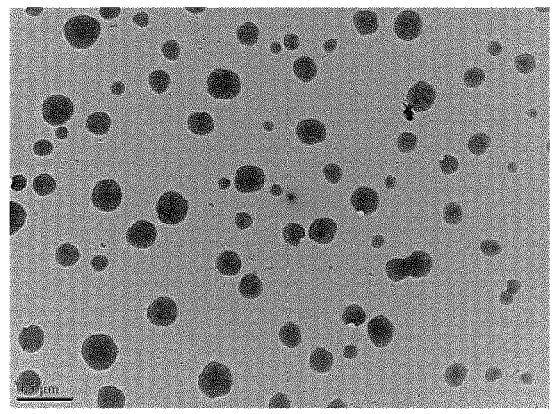

FIG. 20 shows the TEM images of composite particles comprising different dye: 1,3,5,7-tetramethyl-8-(4-hydroxyphenyl)BODIPY (A); 1,7-(di-4,N,N-dimethylaminophenyl)-3,5-(di-4-bromophenyl)AZABODIPY (B); 2,3,7,8,12,13,17,18-(octabromo)-5,10,15,20-(tetraphenyl)porphyrin (C); Zinc(II) 2,9,16,23-(tetra-nitro)phthalocyanine (D); Coumarin 153 (E); Vitamin E (F); β-Carotene (G); Perylene (H); P-Quaterphenyl (I); and Vanadyl 2, 3-naphthalocyanine (J); 2-[3-(2H-Benzotriazol-2yl)-4-hydroxy-phenyl]ethyl methacrylate (NORBLOC™) (K).

Figure 21:
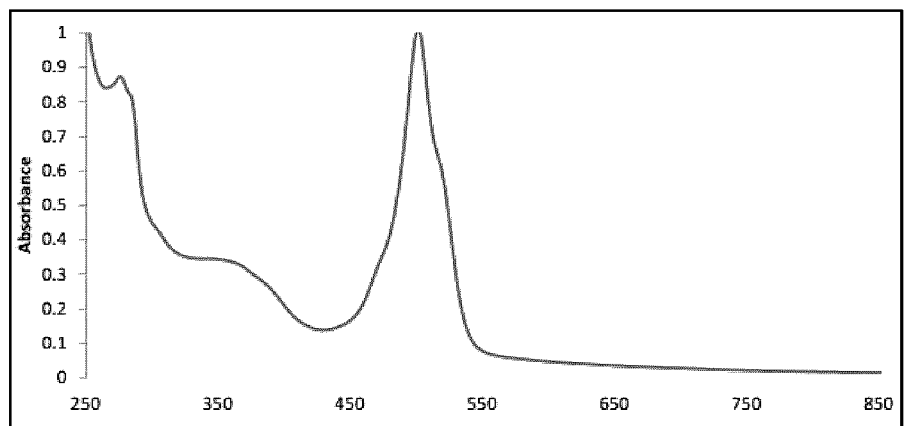
Figure 21:
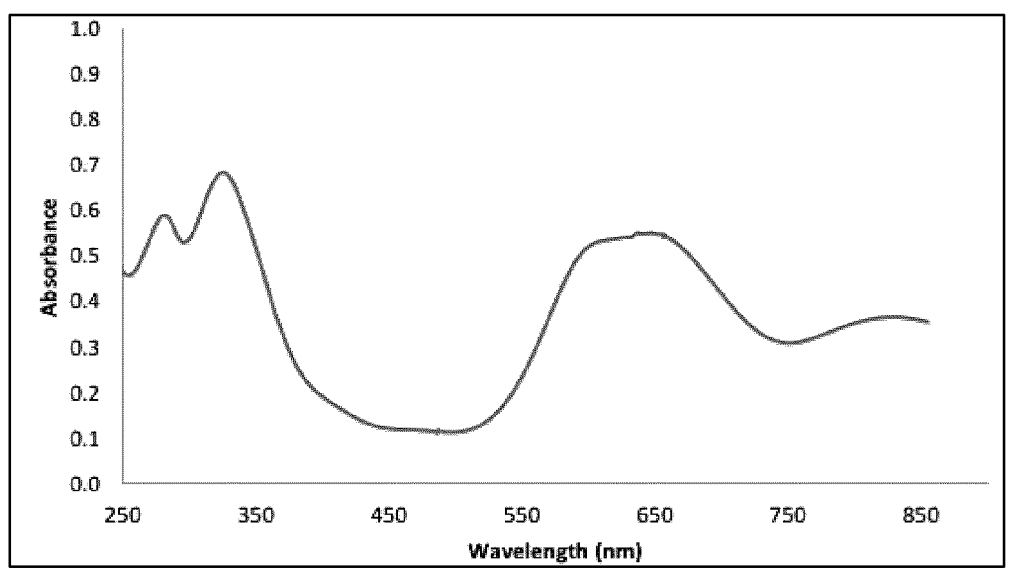
Figure 21:
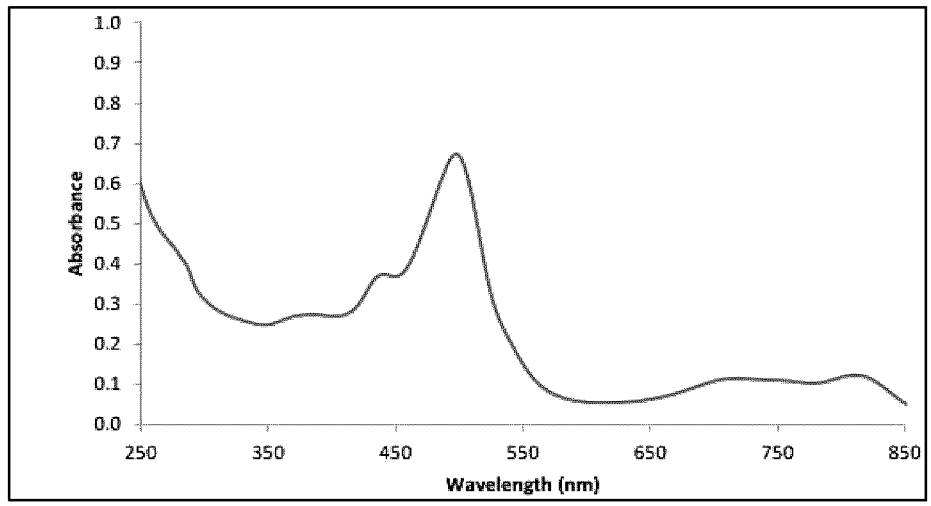
Figure 21:
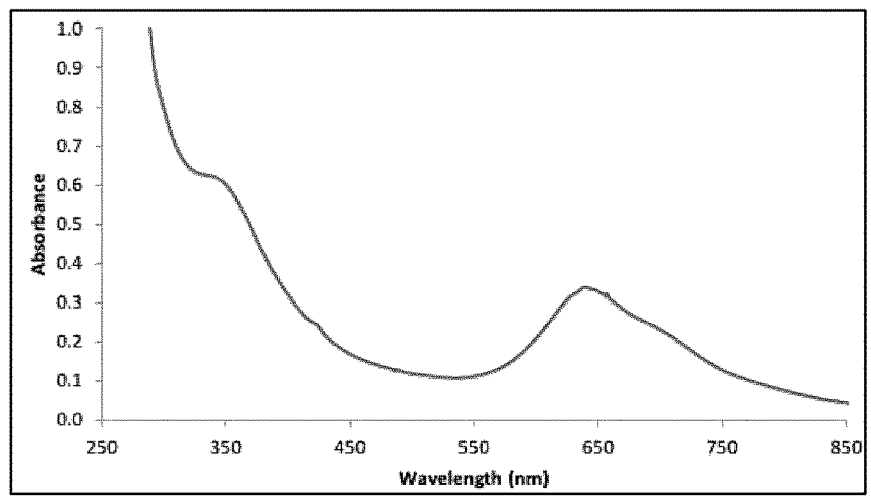
Figure 21:
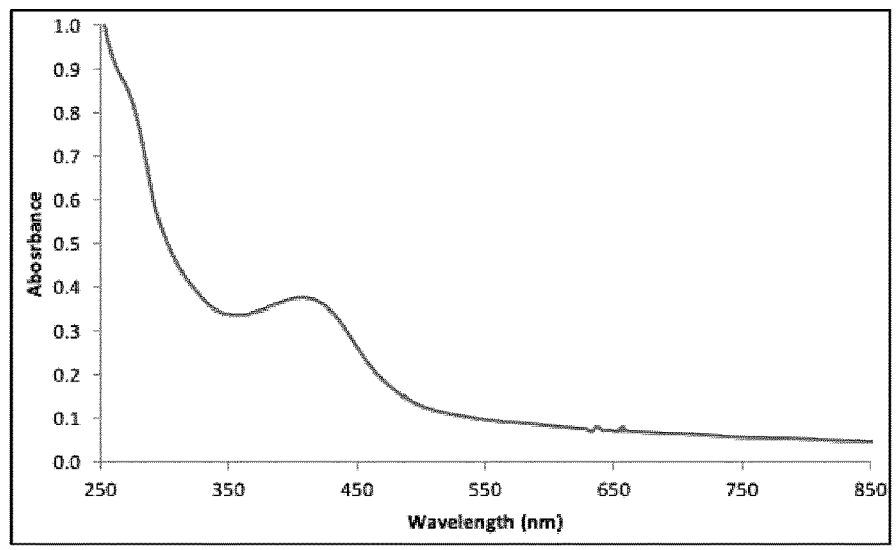
Figure 21:
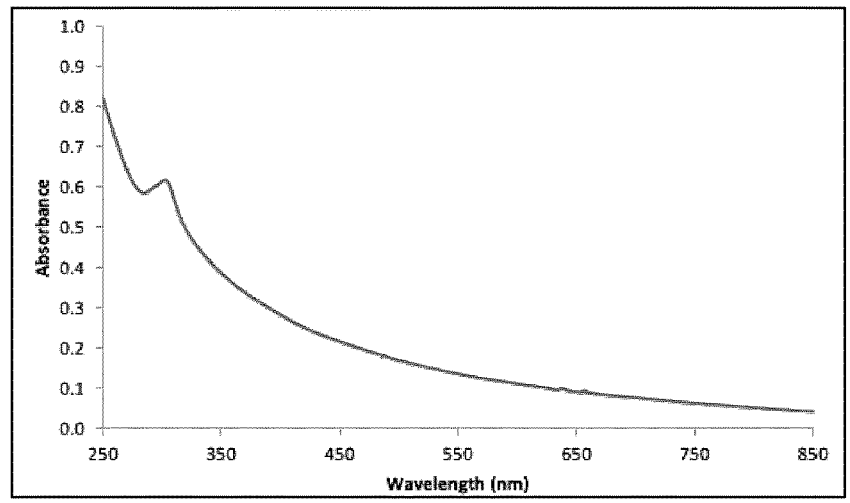
Figure 21:
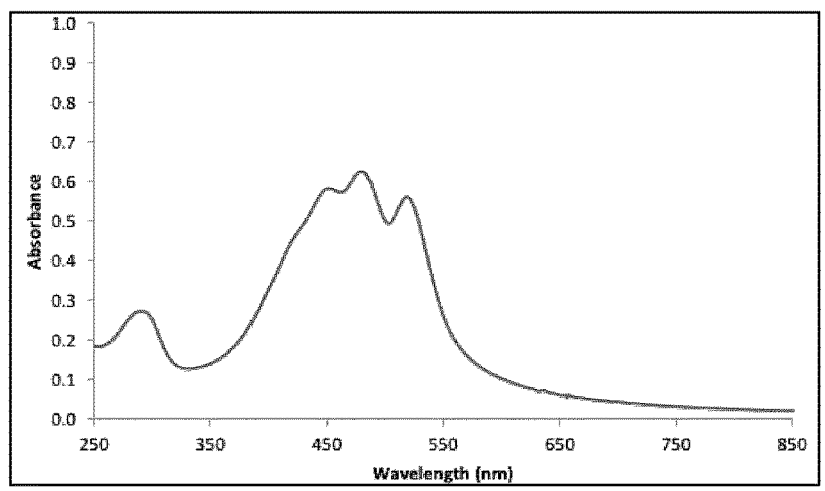
Figure 21:
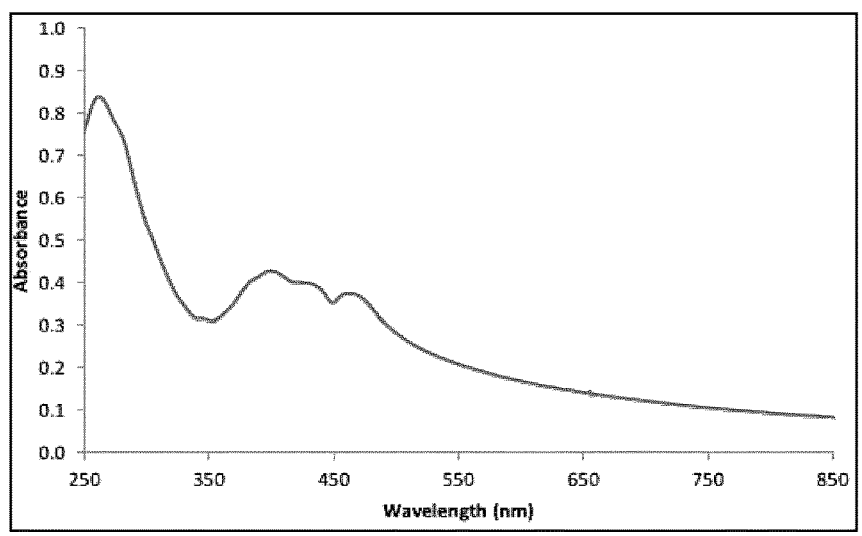
Figure 21:
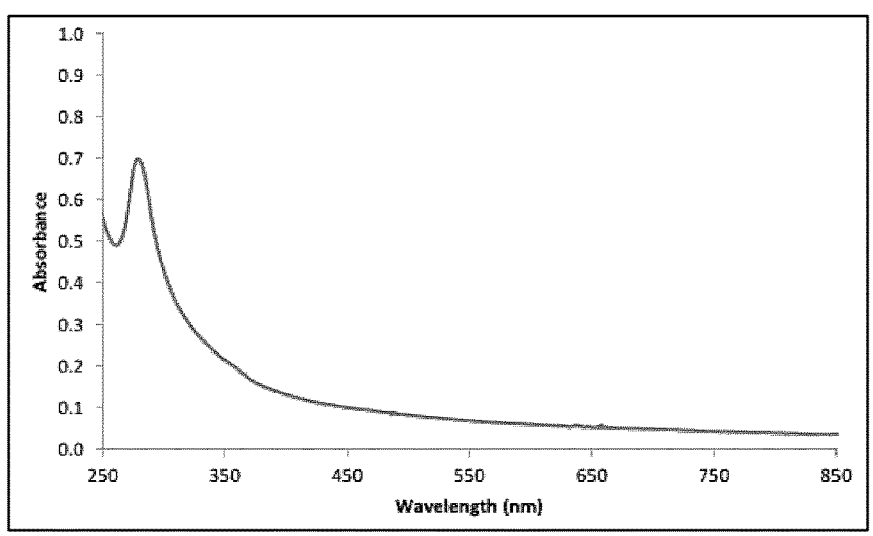
Figure 21:
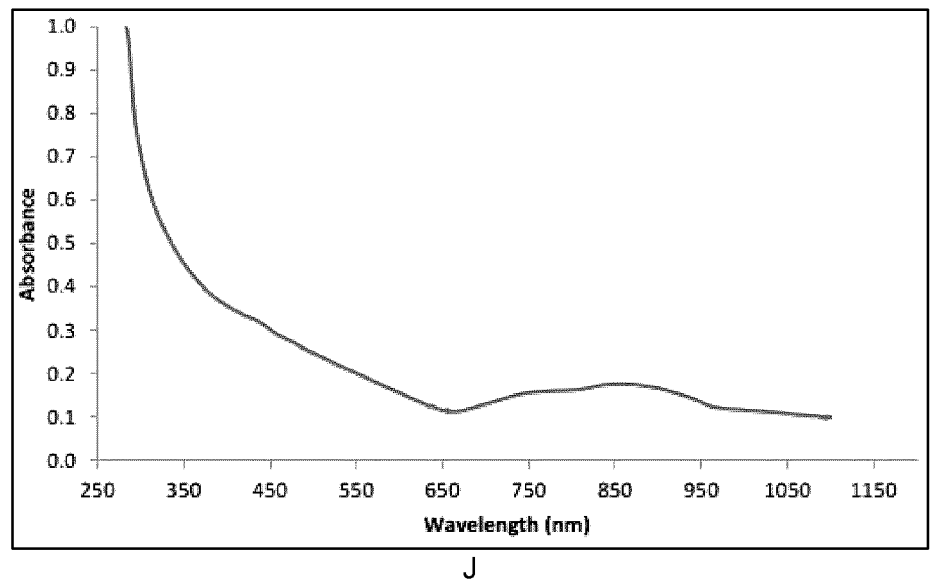
Figure 21:
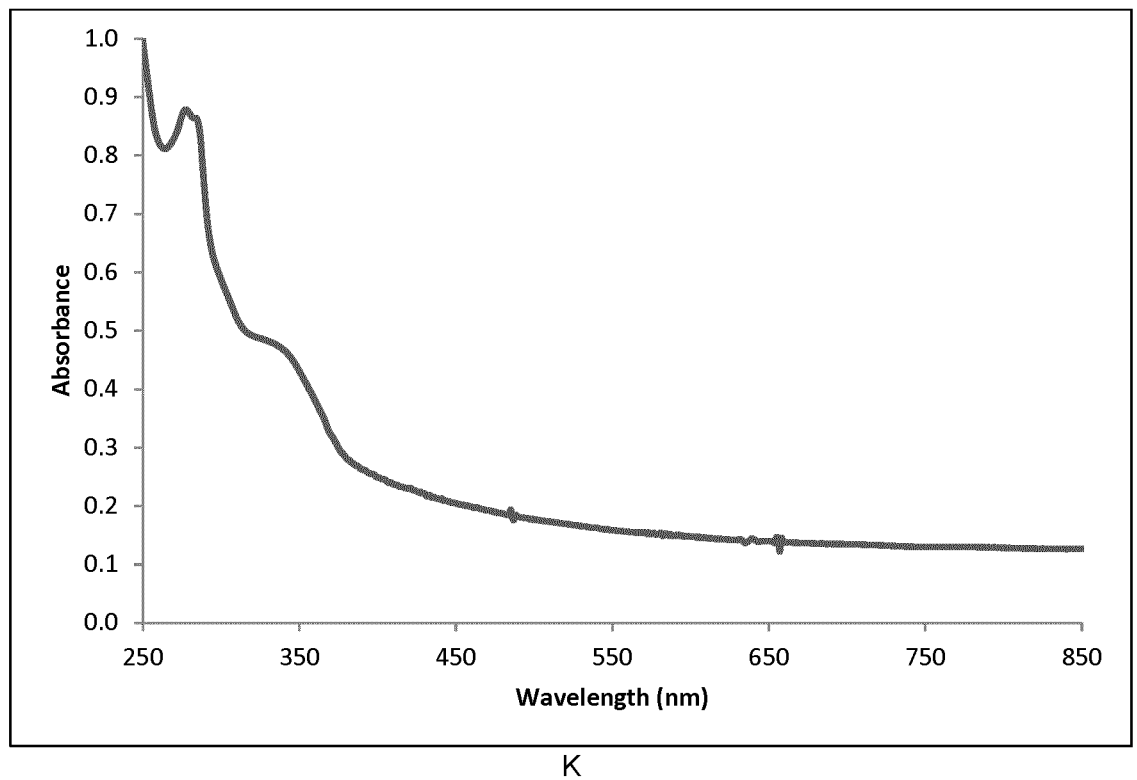

FIG. 21 shows UV-Vis absorbance of composite particles comprising different dye: 1,3,5,7-tetramethyl-8-(4-hydroxyphenyl)BODIPY (A); 1,7-(di-4,N,N-dimethylaminophenyl)-3,5-(di-4-bromophenyl)AZABODIPY (B); 2,3,7,8,12,13,17,18-(octabromo)-5,10,15,20-(tetraphenyl)porphyrin (C); Zinc(II) 2,9,16,23-(tetra-nitro)phthalocyanine (D); Coumarin 153 (E); Vitamin E (F); β-Carotene (G); Perylene (H); P-Quaterphenyl (I); and Vanadyl 2, 3-naphthalocyanine (J); 2-[3-(2H-Benzotriazol-2yl)-4-hydroxy-phenyl]ethyl methacrylate (NORBLOC™) (K).

Figure 22:
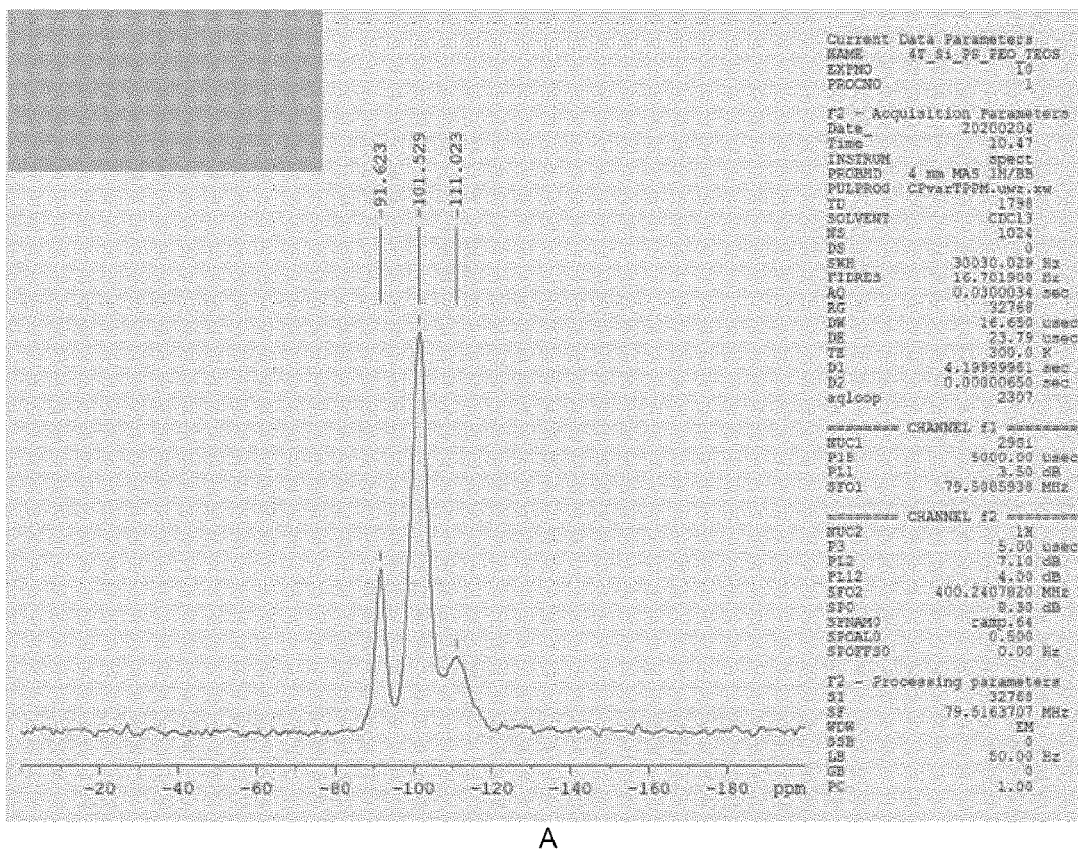
Figure 22:
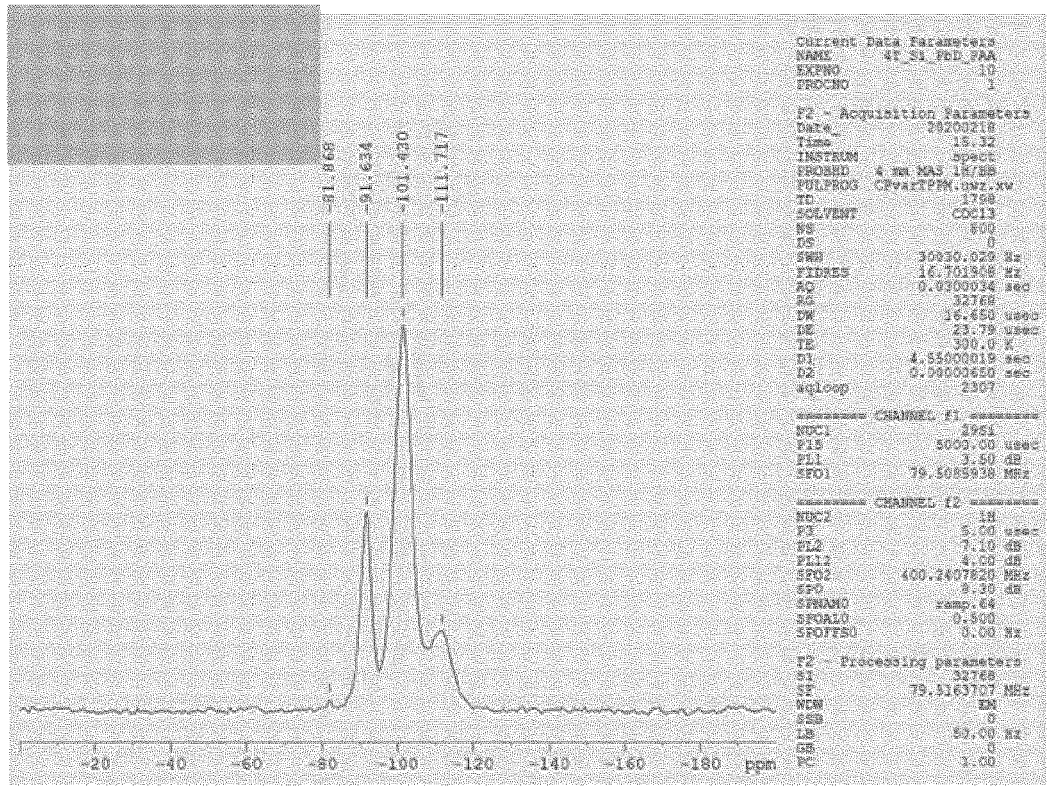
Figure 22:
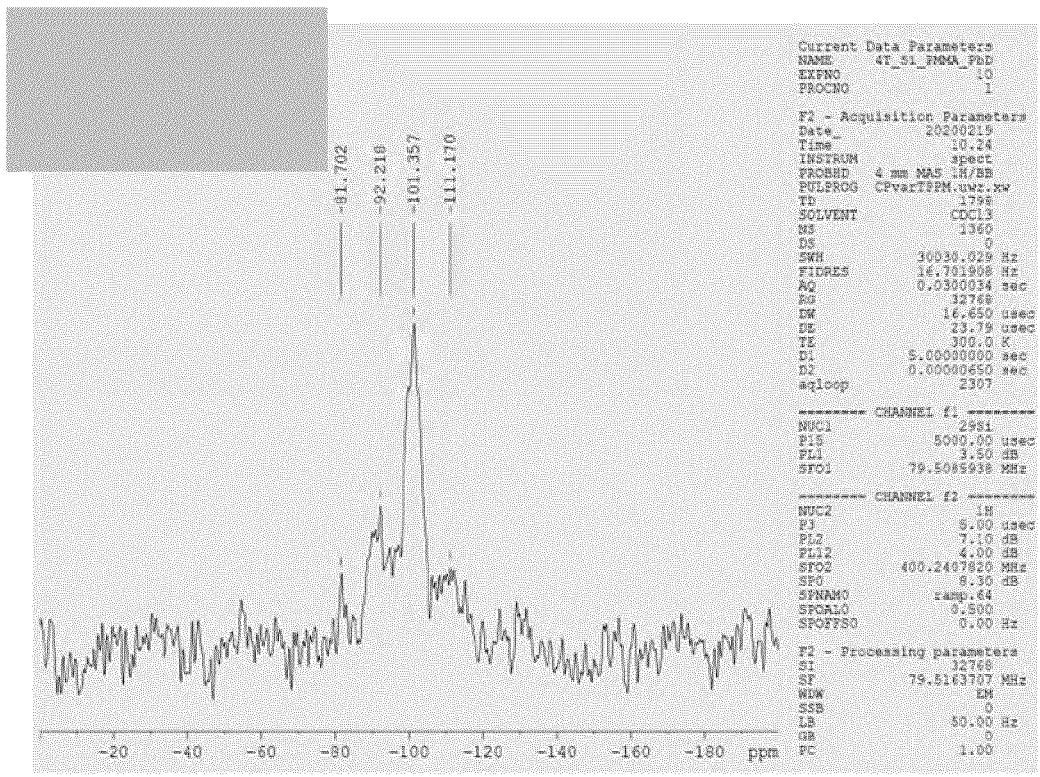
Figure 22:
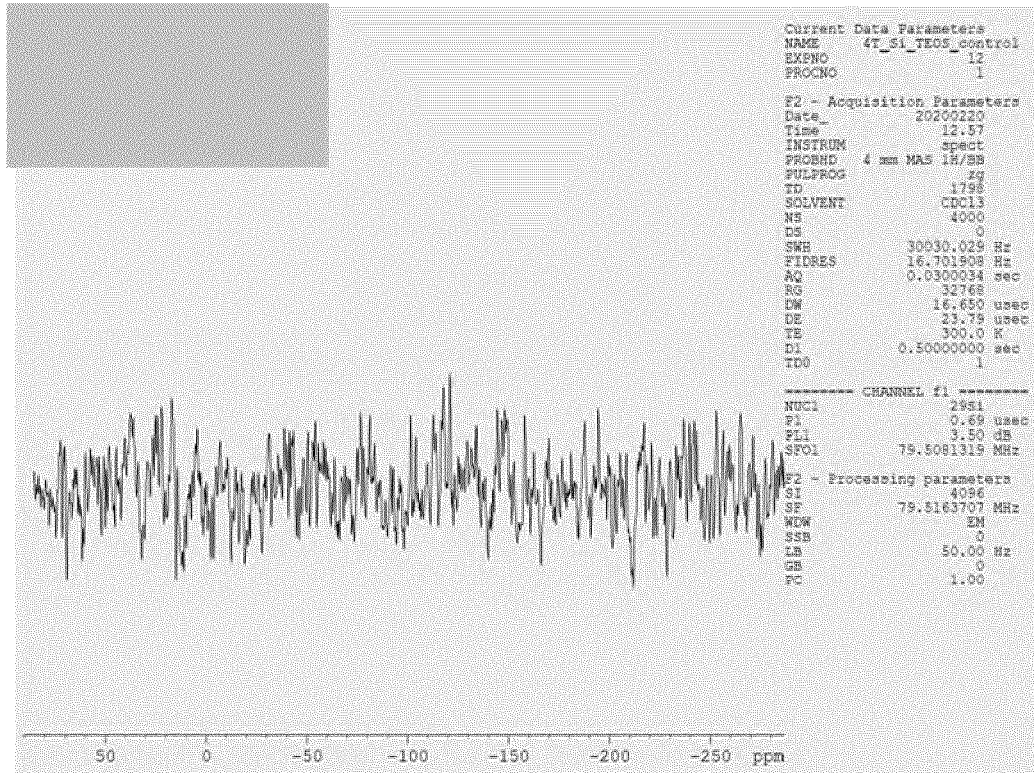

FIG. 22 shows the 29Si solid state NMR spectra of TEOS crosslinked composite particles containing Zinc (II) 5,10,15,20-(tetraphenyl) porphyrin. Panel A shows the spectrum of poly(styrene)$_{1300}$-b-poly(ethylene oxide)$_{5600}$ crosslinked with TEOS. Panel B shows the spectrum of poly(1,2-butadiene)$_{15000}$-b-poly(acrylic acid)$_{6500}$ crosslinked with TEOS. Panel C shows the spectrum of poly(1,2-butadiene)$_{31500}$-b-poly(methyl methacrylate)$_{21000}$ crosslinked with TEOS. Panel D shows the spectrum of the control sample.

Figure 23:
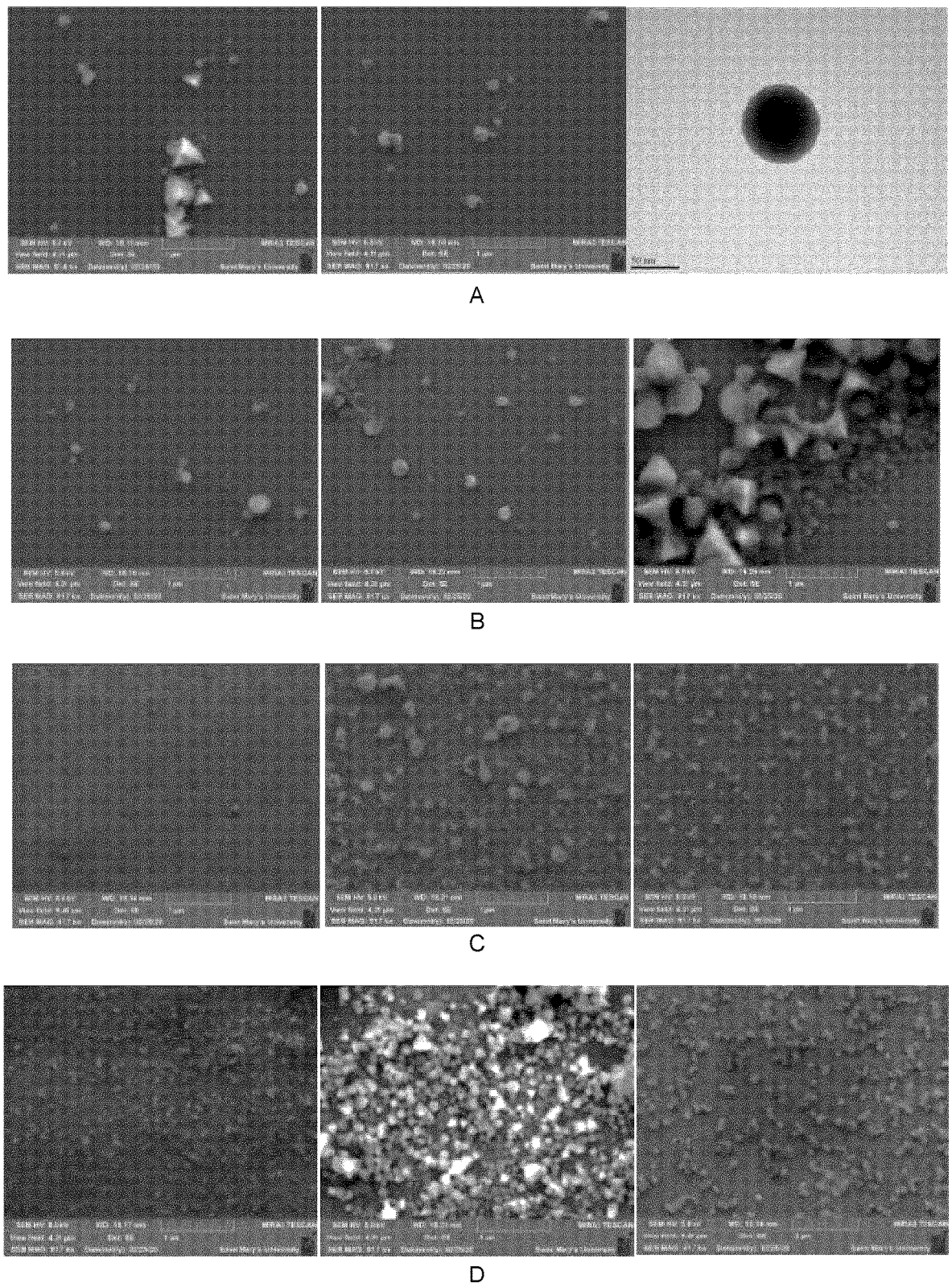

FIG. 23 shows the SEM and TEM images of TEOS crosslinked composite particles: poly(1,2-butadiene)$_{15000}$-b-poly(acrylic acid)$_{6500}$ crosslinked with 1×, 2×, or 5×TEOS by weight compared to the weight of the hydrophilic polymer block (left to right in Panel A); poly(1,2-butadiene)$_{31500}$-b-poly(methyl methacrylate)$_{21000}$ crosslinked with 1×, 2×, or 5×TEOS be weight compared to the weight of the hydrophilic polymer block (left to right in Panel B); poly(styrene)$_{1300}$-b-poly(ethylene oxide)$_{5600}$ crosslinked with 1×, 2×, or 5×TEOS by weight compared to the weight of the hydrophilic polymer block (left to right in Panel C); and poly(vinyl alcohol)$_{2300}$-b-poly(methyl methacrylate)$_{25000}$ crosslinked with 1×, 2×, or 5×TEOS by weight compared to the weight of the hydrophilic polymer block (left to right in Panel D).

Figure 24:
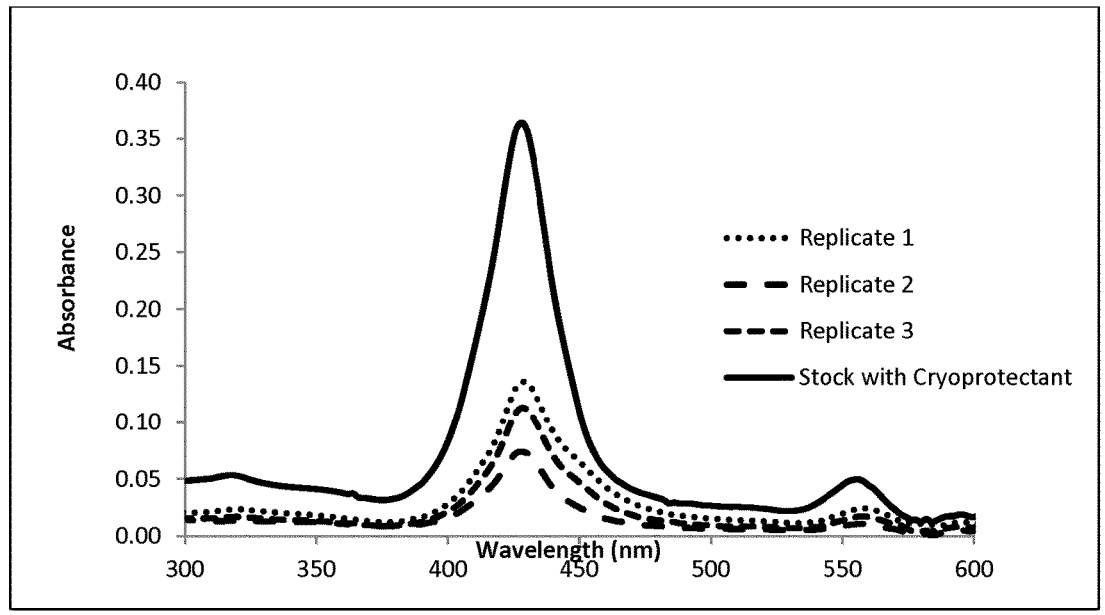

FIG. 24 shows the UV-Vis absorbance of composite particle Poly(1,2-butadiene)$_{31500}$-b-PMMA21000 with Zinc (II) 5,10,15,20-(tetraphenyl) porphyrin freeze dried with cryoprotectant PEG 4000.

Figure 25:
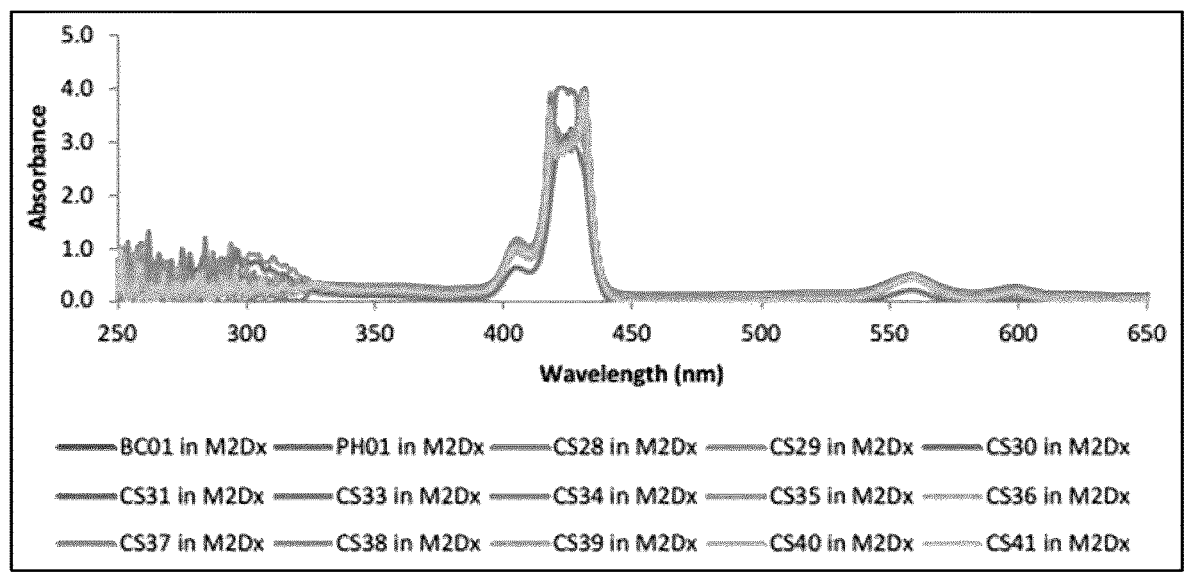

FIG. 25 shows the UV-Vis absorbance spectra of various composite particles in M2Dx prepolymer solution.

Figure 26:
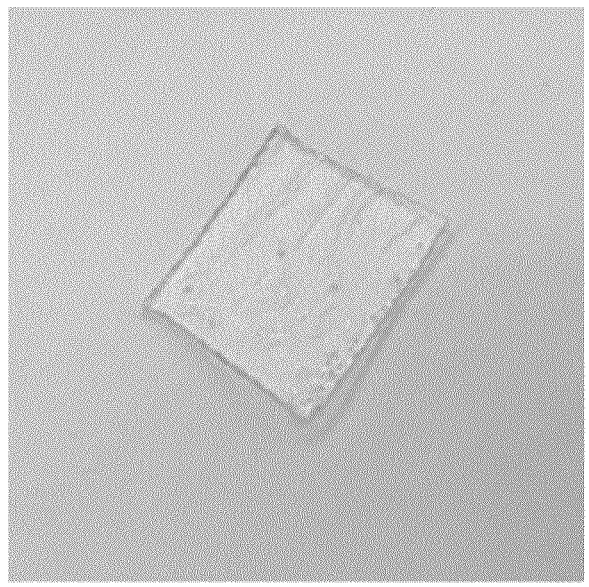

FIG. 26 shows a representative photo of a polymerized M2Dx gel containing composite particles of the present disclosure.

Figure 27:
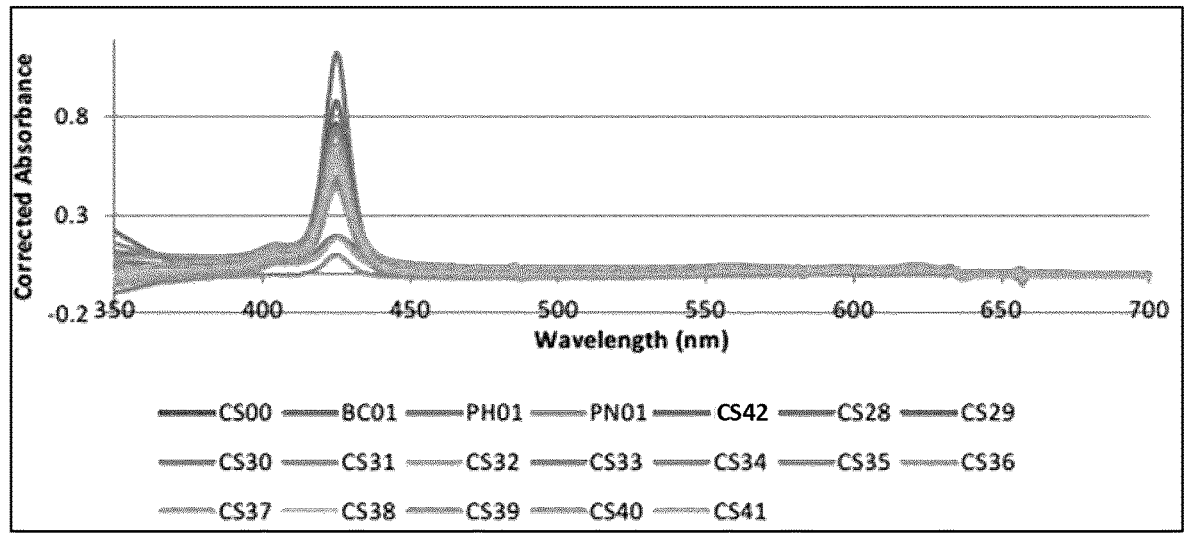
Figure 27:
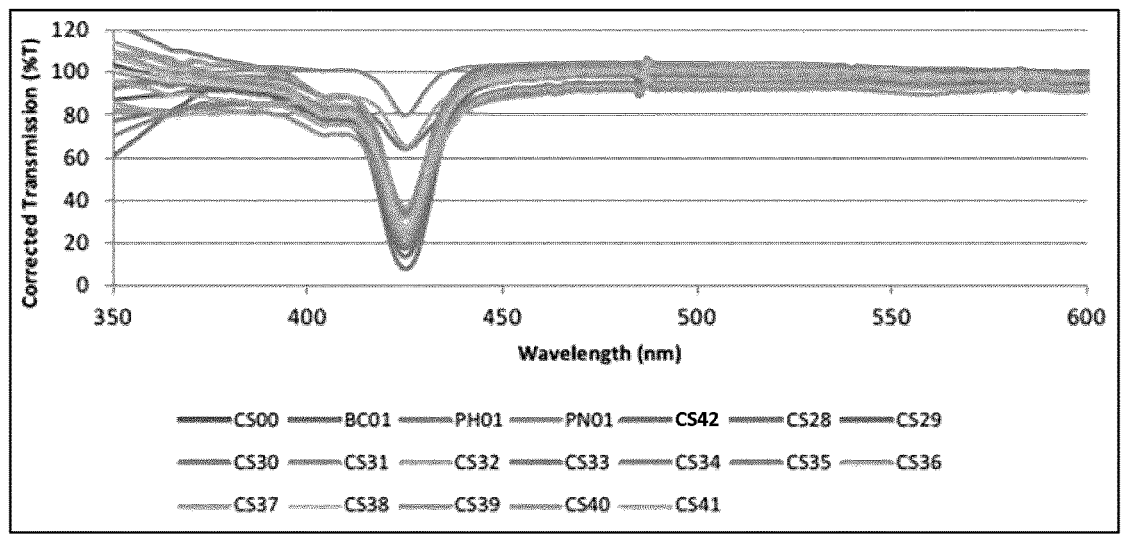

FIG. 27 shows the UV-Vis absorbance of M2Dx polymer gel containing different composite particles (CS28 to 42), comparative particles (BC01, PH01, PN01) and control particles (CS00).

Figure 28:
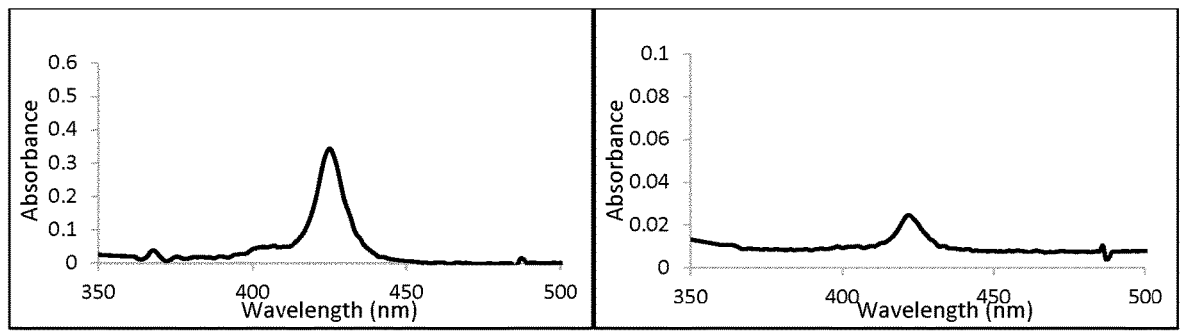
Figure 28:
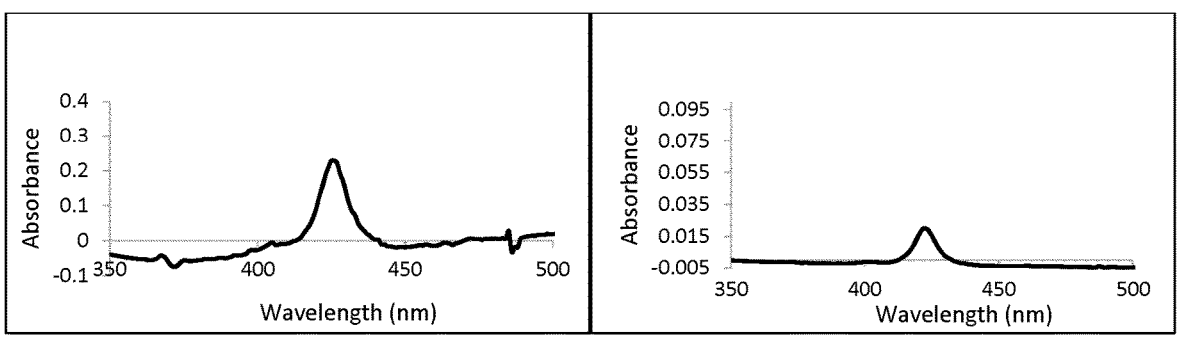
Figure 28:
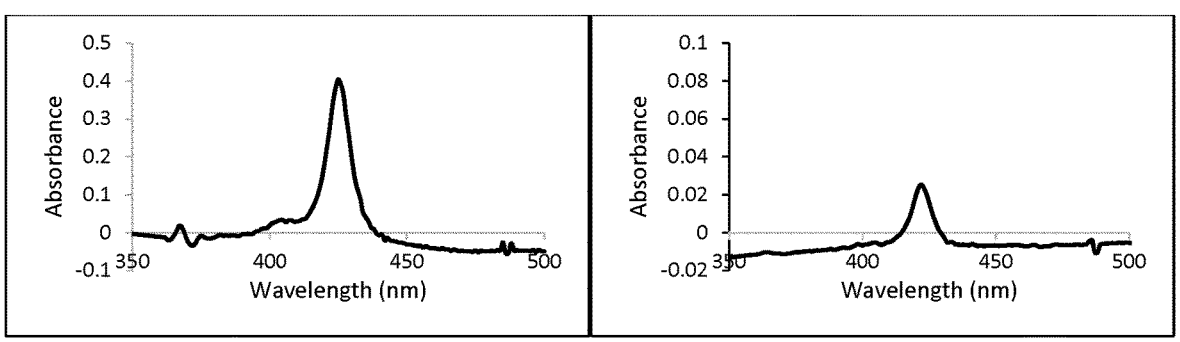
Figure 28:
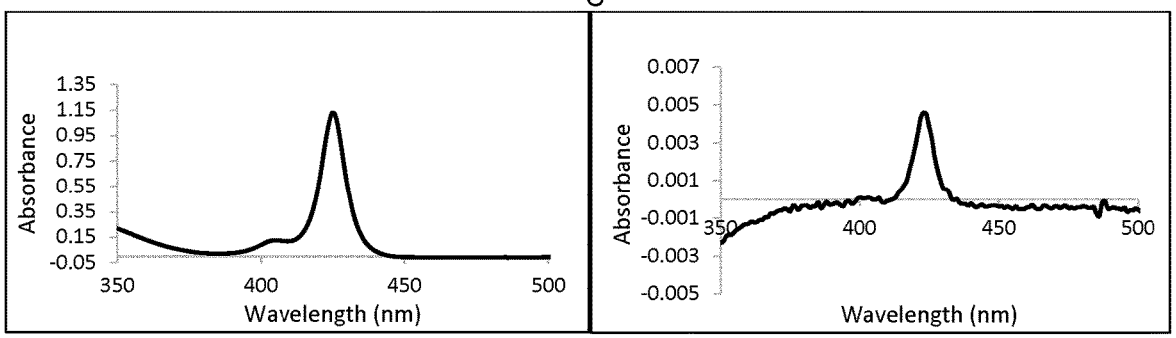

FIG. 28 shows on the left of each panel, the UV-Vis absorbance of M2Dx polymer gel containing CS34 (A), CS37 (B), CS41 (C) or CS42 (D) composite particle after 95% ethanol extraction and on the right of each panel, the UV-Vis absorbance spectrum of the corresponding 95% ethanol wash.

Figure 29:
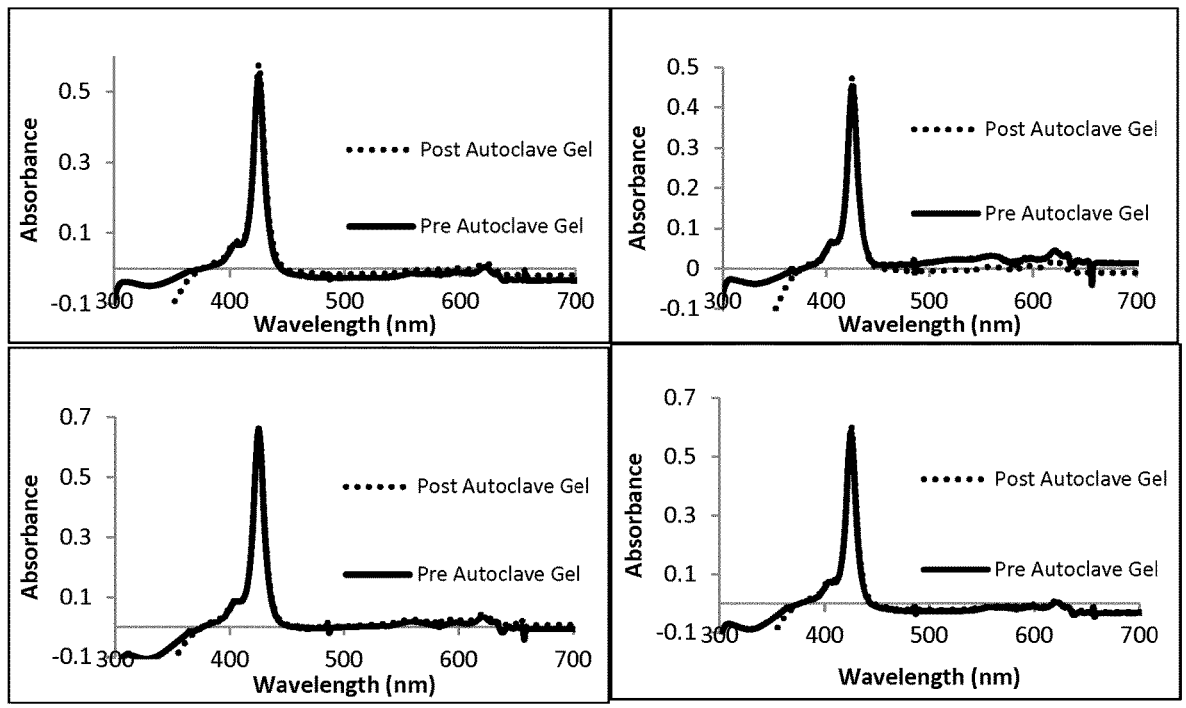

FIG. 29 shows representative UV-Vis absorbance spectra of autoclaved M2Dx polymer gel containing different composite particles. CS38, CS39, CS40 and CS41 containing gels are shown as examples.

Figure 30:
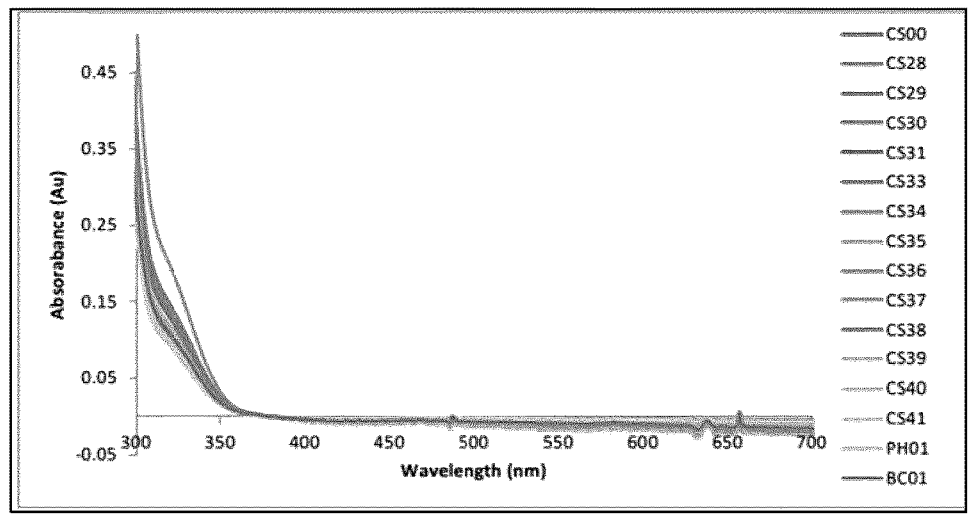

FIG. 30 shows post-autoclave UV-Vis absorbance of the saline solution that the M2Dx polymer gels containing different composite particles were autoclaved in.

Figure 31:
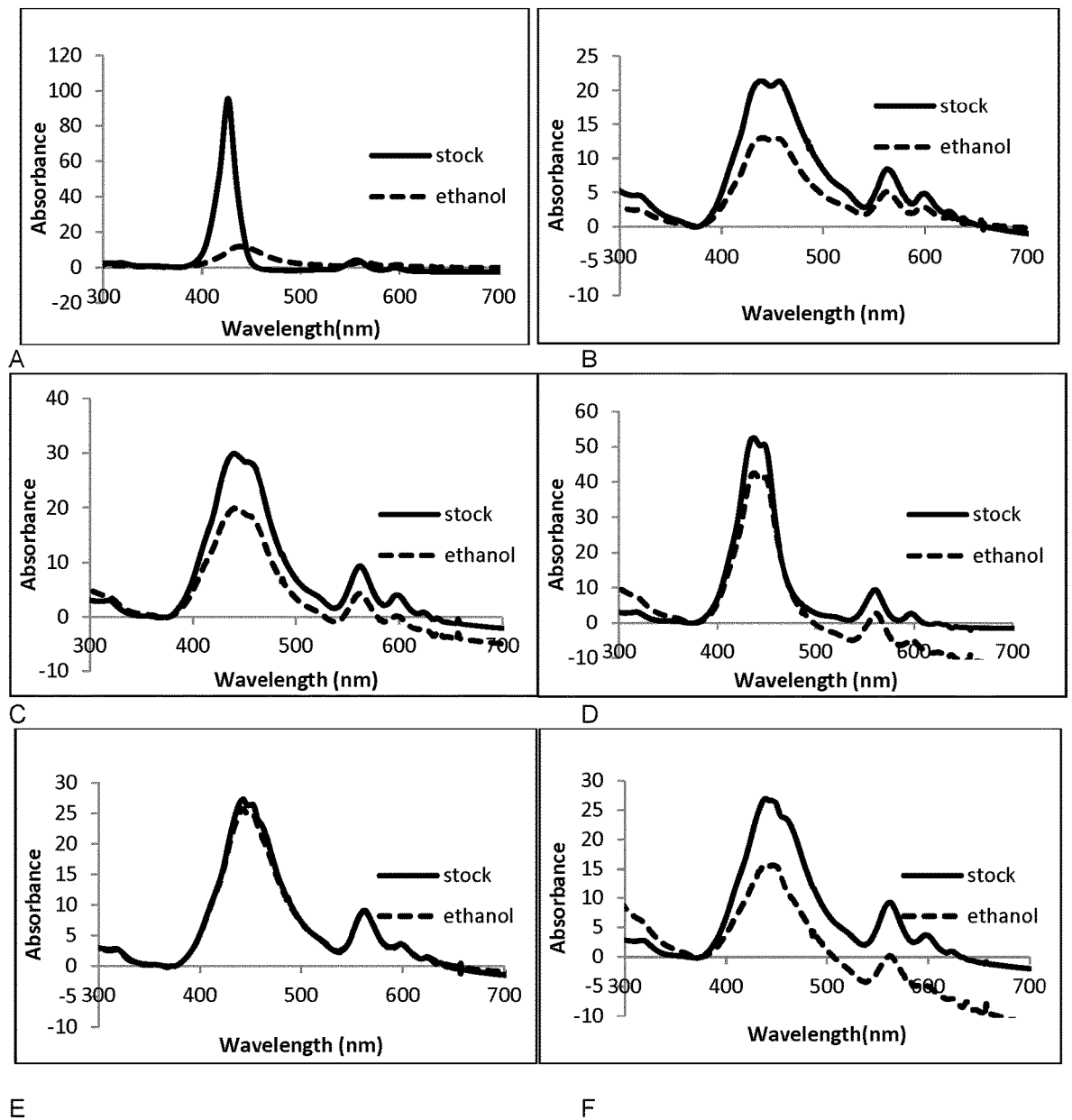
Figure 31:
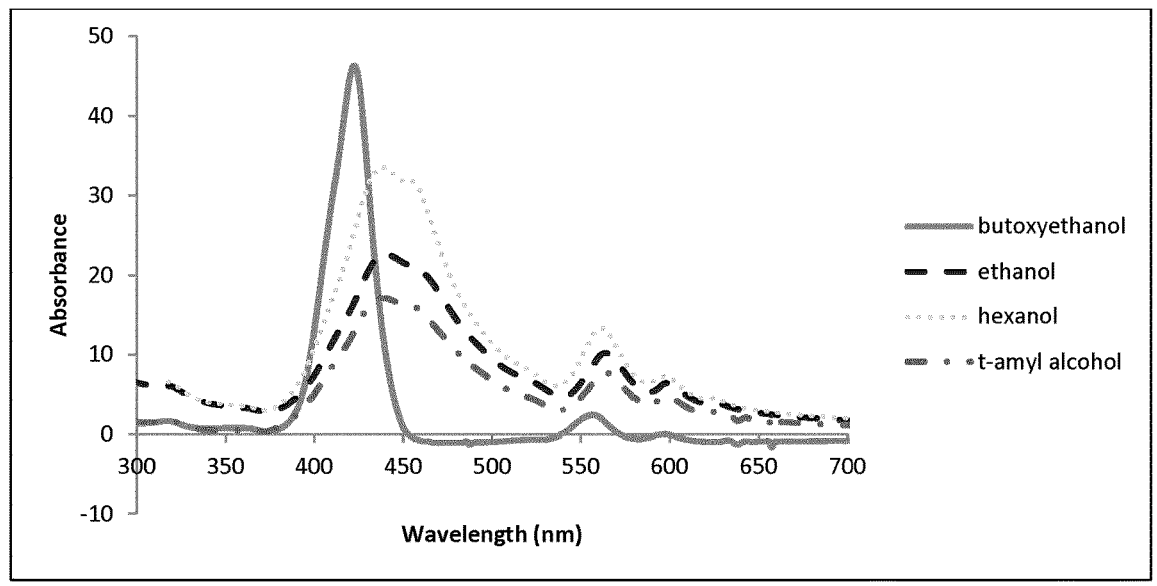
Figure 31:
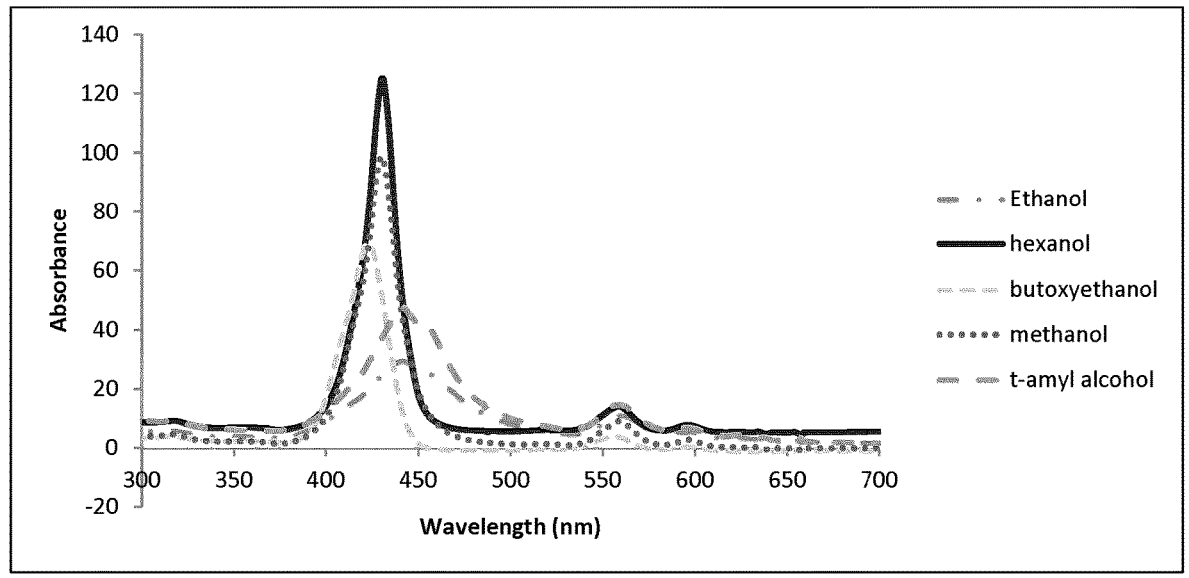
Figure 31:
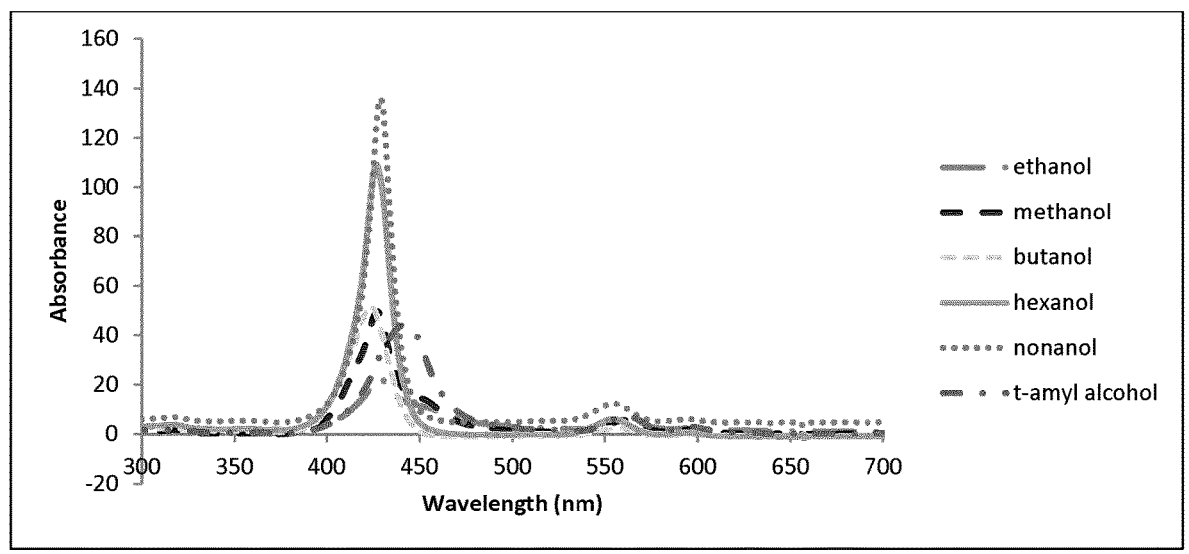

FIG. 31 shows UV-Vis of composite particles after exposure to different solvents. Panels A to F shows the composite particles PN01, CS19, CS29, CS31, CS33, and CS34 after ethanol exposure. Panels G to I shows the UV-Vis absorbance spectra of composite particle CS20, CS22, and CS04 respectively after exposure to different solvents.

Figure 32:
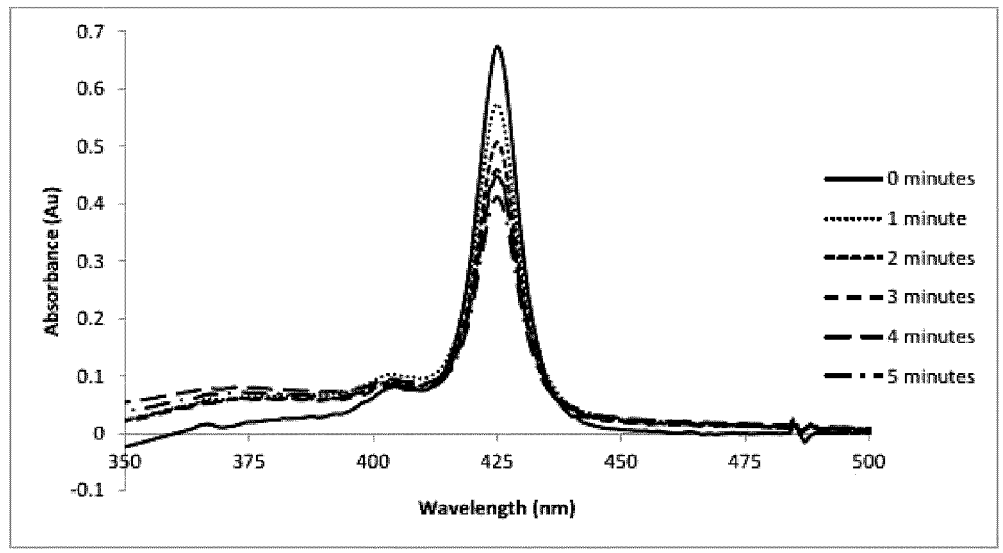

FIG. 32 shows representative UV-Vis absorbance of M2Dx polymer gel containing composite particle CS35 after 1 min, 2 min, 3 min, 4 min or 5 min of photobleaching.

Figure 33:
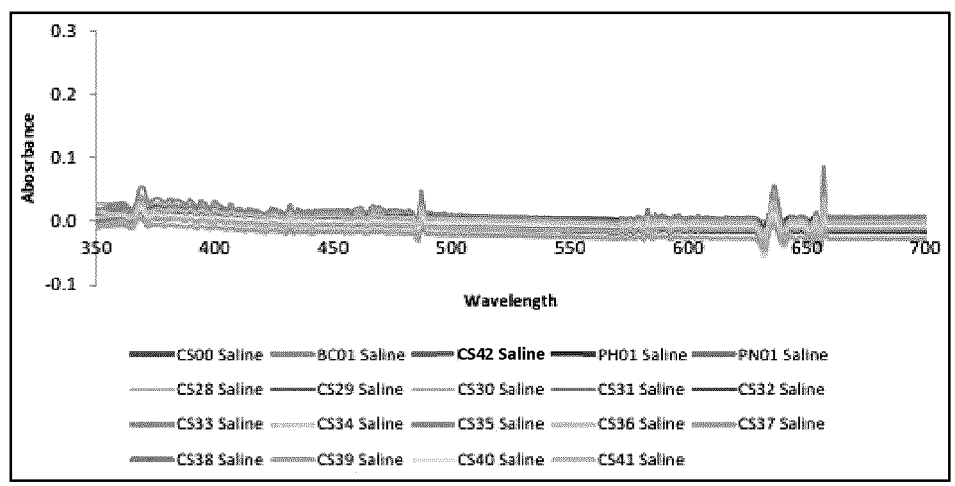

FIG. 33 shows the UV-Vis absorbance spectrum of the saline solution after photoaging of M2Dx polymer gel containing different composite particles in the saline solution

DESCRIPTION OF VARIOUS EMBODIMENTS

I. Definitions

Unless otherwise indicated, the definitions and embodiments described in this and other sections are intended to be applicable to all embodiments and aspects of the present disclosure herein described for which they are suitable as would be understood by a person skilled in the art.

As used in the present disclosure, the singular forms "a", "an" and "the" include plural references unless the content clearly dictates otherwise.

The terms "about", "substantially" and "approximately" as used herein mean a reasonable amount of deviation of the modified term such that the end result is not significantly changed. These terms of degree should be construed as including a deviation of at least ±5% of the modified term if this deviation would not negate the meaning of the word it modifies or unless the context suggests otherwise to a person skilled in the art.

The present description refers to a number of chemical terms and abbreviations used by those skilled in the art. Nevertheless, definitions of selected terms are provided for clarity and consistency.

The term "hydrophobic" as used herein, for example in "a hydrophobic dye", refers to the property of a molecule or portion thereof of not being attracted to water molecules. For example, it includes repelling or tending not to combine with, or incapable of being entirely dissolved in water. For example, when referring to a hydrophobic dye, the term hydrophobic could mean the dye is substantially insoluble in water, but can be soluble in a water-miscible organic solvent.

The term "hydrophilic" as used herein, refers to the property of a molecule or a portion thereof that is attracted to water molecules.

The term "optionally substituted" as used herein refers to groups, structures, or molecules that are either unsubstituted or are substituted with one or more substituents.

The term "amphiphilic copolymers" as used herein refer to copolymers comprising subunits or monomers that have different hydrophobic and hydrophilic characteristics. For example, when the subunits or monomers of the same characteristic exist in blocks in the same copolymer chain, the copolymer is referred to as a block copolymer. For example, amphiphilic block copolymers comprise blocks where one or more blocks comprise one or more types of hydrophilic subunits or monomers while other block comprises one or more types of hydrophobic subunits or monomers, such that each block is substantially hydrophilic or hydrophobic. It is possible for the one or more types of hydrophilic or hydrophobic subunits or monomers to be dispersed throughout the copolymer, yet still yielding blocks that are substantially overall hydrophilic or hydrophobic.

The term "hydrogel" as used herein refers to a gel in which the swelling agent is water. In some embodiments, it refers to a gel comprising a polymeric network material that has an equilibrium water content of at least 10% w/w. A hydrogel comprising a silicone component, is referred to herein as a "silicone hydrogel".

The term "blue light" as used herein refers to the high-energy blue portion of the spectrum. For example, it can refer to the portion of the spectrum ranging from about 380 nm to 500 nm.

The term "selectively block light" or "selectively blocking light" or the like as used herein refers to providing a transmission minimum at a selected portion of the spectrum.

II. Composite Particles, Compositions and Uses Thereof

In one aspect, the present disclosure includes a composite particle comprising:
a hydrophobic dye; and
an amphiphilic block copolymer encapsulating the hydrophobic dye,
wherein the hydrophobic dye has an absorbance in the range of from the ultraviolet region to the infrared region of the electromagnetic spectrum.

In some embodiments, the amphiphilic block copolymer is crosslinked. For example, the crosslinking is by one or more crosslinking agents.

In some embodiments, the composite particle is a synthetic polymer micelle.

The hydrophobic dye is any suitable hydrophobic dye that has an absorbance in the range of from the ultraviolet region to the infrared region of the electromagnetic spectrum. In some embodiments, the hydrophobic dye is a laser dye or an absorber dye. In an embodiment, the hydrophobic dye is a laser dye. The person skilled in the art would appreciate that laser dye solutions absorb at shorter wavelengths and emit at longer wavelengths. In another embodiment of the present disclosure, the hydrophobic dye is an absorber dye.

In some embodiments, the hydrophobic dye is selected from coumarins, fluoresceins, rhodamines, pyrromethenes, cyanines, carbocyanines, flavins, oxazines, carbazines, stilbenes, diphenylstilbenes, oxazols, diphenyls, terphenyls, quaterphenyls, polyphenyls, phenyloxazones, phenoxazoniums, pyridines, pyridiniums, carotenoids, retinoids, porphyrins, phthalocyanines, benzophenones, metal oxides, benzotriazoles, tocopherols, tocotrienols, anthracenes, perylenes, polycyclic aromatic hydrocarbons (PAH), polyenes, corrins, chlorins, corphins, indolenines, chlorophylls, azo dyes, polymethines, diarylmethanes, triarylmethanes, polyenes, anthracinediones, pyrazolones, anthraquinones, pyrans, phenothiazines, triazines, oxalanilides, acridines, benzanthrones, and combinations thereof. In some embodiments, the hydrophobic dye is selected from BODIPY, Aza-BODIPY, tetraphenylporphorins, phthalocyanines, naphthalocyanines, coumarins, benzotriazoles, tocopherols, tocotrienols, carotenoids, anthracenes, perylenes, metal oxides, and combinations thereof. In some embodiments, the hydrophobic dye is selected from 1,3,5,7-tetramethyl-8-(4-hydroxyphenyl)BODIPY, 1,7-(di-4-N,N-dimethylaminophenyl)-3,5-(di-4-bromophenyl)AZABODIPY, 2,3,7,8,12,13,17,18-(octabromo)-5,10,15,20-(tetraphenyl)porphyrin, Zn (II) 5,10,15,20-Tetraphenyl-21H,23H-porphyrin (Zn (II) TPP), Zn (II) 2,9,16,23-(tetra-nitro)phthalocyanine, Coumarin 153, 2-(2'hydroxy-5'-methacryloxyethylphenyl)-2H-benzotriazole, vitamin E, 3-carotene, 9,10-Diphenylanthracene, perylene, chromium (III) oxide, P-Quaterphenyl, Vanadyl 2,3-naphthalocyanine, and combinations thereof. In some embodiments, the hydrophobic dye is Zn (II) 5,10,15, 20-Tetraphenyl-21H,23H-porphyrin (Zn (II) TPP).

The amphiphilic block copolymer is any suitable amphiphilic block copolymer that encapsulates the hydrophobic dye. In some embodiments, the amphiphilic block copolymer is a poly(alkyl acrylate)-based copolymer, a poly(alkyl methacrylate)-based copolymer, a poly(acrylic acid)-based copolymer, a poly(methacrylic acid)-based copolymer, a poly(diene)-based copolymer, a poly(N-isopropylacrylamide)-based copolymer, a poly(ethylene glycol)-based copolymer, a poly(methylene indane)-based copolymer, a poly(siloxane)-based copolymer, a poly(styrene)-based copolymer, a substituted poly(styrene)-based copolymer, a poly(vinyl pyridine)-based copolymer, a poly(vinyl alcohol) based copolymer, a poly(alkylacrylic acid)-based copolymer, a poly(alkylene oxide)-based copolymer, a poly(dialkyl siloxane)-based copolymer, a poly(olefin)-based copolymer, a poly(alkylene oxide diacrylate)-based copolymer, a poly(butanediol diacrylate)-based copolymer, or combinations thereof. In some embodiments, the amphiphilic block copolymer is a poly(alkyl acrylate)-based copolymer, a poly(alkyl methacrylate)-based copolymer, a poly(acrylic acid)-based copolymer, a poly(methacrylic acid)-based copolymer, a poly(diene)-based copolymer, a poly(olefin)-based copolymer, a poly(ethylene glycol)-based copolymer, a poly(siloxane)-based copolymer, a poly(styrene)-based copolymer, a poly(vinyl alcohol) based copolymer, a poly(dialkyl siloxane)-based copolymer, or combinations thereof. In some embodiments, the amphiphilic block copolymer is a poly(methyl acrylate)-based copolymer, a poly(n-butyl acrylate)-base copolymer, a poly(methyl methacrylate)-based copolymer, a poly(tert-butyl methacrylate)-based copolymer, a poly(acrylic acid)-based copolymer, a poly(methacrylic acid)-based copolymer, a poly(1,2-butadiene)-based copolymer, a poly(1,4-butadiene)-based copolymer, a poly(styrene)-based copolymer, a poly(dimethyl siloxane)-based copolymer, a poly(vinyl alcohol) based copolymer, a poly(propylene oxide)-based copolymer, or combinations thereof.

In some embodiments, the amphiphilic block copolymer is a diblock copolymer or a triblock copolymer, or a combination thereof. In some embodiments, the amphiphilic block copolymer is a diblock copolymer. In some embodiments, the amphiphilic block copolymer is a poly(ethylene glycol)-b-poly(styrene), a poly(n-butyl acrylate)-b-poly(acrylic acid) or a poly(methyl methacrylate)-b-poly(methacrylic acid). In some embodiments, the amphiphilic block copolymer is selected from poly(1,2-butadiene)-b-poly(acrylic acid), poly(1,2-butadiene)-b-poly(ethylene oxide), poly(1,2-butadiene)-b-poly(methacrylic acid), poly(1,2-butadiene)-b-poly(methyl methacrylate), poly(1,2-butadiene)-b-poly(vinyl alcohol), poly(1,2-butadiene-co-1,4-butadiene)-b-poly(acrylic acid), poly(1,2-butadiene-co-1,4-butadiene)-b-poly(ethylene oxide), poly(1,2-butadiene-co-1,4-butadiene)-b-poly(methacrylic acid), poly(1,2-butadiene-co-1,4-butadiene)-b-poly(vinyl alcohol), poly(1,4-butadiene)-b-poly(acrylic acid), poly(1,4-butadiene)-b-poly(ethylene oxide), poly(1,4-butadiene)-b-poly(methacrylic acid), poly(1,4-butadiene)-b-poly(vinyl alcohol), poly(dimethylsiloxane)-b-poly(acrylic acid), poly(dimethylsiloxane)-b-poly(ethylene oxide), poly(dimethylsiloxane)-b-poly(methacrylic acid), poly(dimethylsiloxane)-b-poly(n-butyl acrylate), poly(ethylene oxide)-b-poly(butadiene), poly(ethylene oxide)-b-poly(dimethylsiloxane), poly(ethylene oxide)-b-poly(methyl methacrylate), poly(ethylene oxide)-b-poly(n-butyl acrylate), poly(ethylene oxide)-b-poly(styrene), poly(ethylene oxide)-b-poly(tert-butyl methacrylate), poly(methyl methacrylate)-b-poly(acrylic acid), poly(methyl methacrylate)-b-poly(dimethylsiloxane), poly(methyl methacrylate)-b-poly(ethylene oxide), poly(methyl methacrylate)-b-poly(methacrylic acid), poly(methyl methacrylate)-b-poly(styrene), poly(n-butyl acrylate)-b-poly(acrylic acid), poly(propylene oxide)-b-poly(butadiene), poly(propylene oxide)-b-poly(dimethylsiloxane), poly(propylene oxide)-b-poly(methyl methacrylate), poly(propylene oxide)-b-poly(n-butyl acrylate), poly(propylene oxide)-b-poly(styrene), poly(propylene oxide)-b-poly(tert-butyl methacrylate), poly(vinyl alcohol)-b-poly(butadiene), poly(vinyl alcohol)-b-poly(dimethylsiloxane), poly(vinyl alcohol)-b-poly(methyl methacrylate), poly(vinyl alcohol)-b-poly(n-butyl acrylate), poly(vinyl alcohol)-b-poly(styrene), poly(vinyl alcohol)-b-poly(tert-butyl methacrylate), poly(1,2-butadiene)$_{15000}$-b-poly(acrylic acid)$_{6500}$, poly(1,4-butadiene)$_{9000}$-b-poly(acrylic acid)$_{3500}$, poly(dimethylsiloxane)$_{5000}$-b-poly(ethylene oxide)$_{2100}$, poly(dimethylsiloxane)$_{8000}$-b-poly(acrylic acid)$_{8000}$, poly(methyl methacrylate)$_{3000}$-b-poly(ethylene oxide)$_{3000}$, poly(methyl methacrylate)$_{7400}$-b-poly(acrylic acid)$_{24300}$, poly(n-butyl acrylate)$_{7500}$-b-poly(acrylic acid)$_{5500}$, poly(styrene)$_{1300}$-b-poly(ethylene oxide)$_{5600}$, poly(vinyl alcohol)$_{2300}$-b-poly(methyl methacrylate)$_{25000}$, poly(vinyl alcohol)$_{2500}$-b-poly(styrene)$_{12500}$, and combinations thereof.

In some embodiments, the amphiphilic block copolymer is selected from a poly(1,2-butadiene)-based copolymer, a poly(1,2-butadiene-co-1,4-butadiene)-based copolymer, a poly(1,2-isoprene)-based copolymer, a poly(1,2-isoprene-co-1,4-isoprene)-based copolymer, a poly(1,4-butadiene)-based copolymer, a poly(1,4-butanediol diacrylate)-based copolymer, a poly(1,4-butanediol dimethacrylate)-based copolymer, a poly(1,4-isoprene)-based copolymer, a poly(2-acrylamido-2-methylpropanesulfonic acid sodium salt)-based copolymer, a poly(2-acrylamido-2-methylpropanesulfonic acid)-based copolymer, a poly(2-ethyl oxazoline)-based copolymer, a poly(2-ethylhexyl acrylate)-based copolymer, a poly(2-hydroxyethyl methacrylate)-based copolymer, a poly(2-methoxyethyl acrylate)-based copolymer, a poly(2-methyl oxazoline)-based copolymer, a poly(2-vinyl naphthalene)-based copolymer, a poly(2-vinyl pyridine)-based copolymer, a poly(4-chloromethyl styrene)-based copolymer, a poly(4-hydroxystyrene)-based copolymer, a poly(4-styrene sulfonic acid sodium salt)-based copolymer, a poly(4-styrene sulfonic acid)-based copolymer, a poly(4-vinyl biphenyl)-based copolymer, a poly(4-vinyl pyridine)-based copolymer, a poly(4-vinylbenzoic acid)-based copolymer, a poly(4-vinylpyridine decyliodide)-based copolymer, a poly(acrylamide)-based copolymer, a poly(acrylate)-based copolymer, a poly(acrylic acid sodium salt)-based copolymer, a poly(acrylic acid)-based copolymer, a poly(acrylonitrile)-based copolymer, a poly(adipic anhydride)-based copolymer, a poly(alkyl acrylate)-based copolymer, a poly(alkyl methacrylate)-based copolymer, a poly(alkyl siloxane)-based copolymer, a poly(alkylacrylic acid)-based copolymer, a poly(alkylene oxide)-based copolymer, a poly(butylene oxide)-based copolymer, a poly(cyclohexyl ethylene)-based copolymer, a poly(dialkyl siloxane)-based copolymer, a poly(diene)-based copolymer, a poly(dimethylsiloxane)-based copolymer, a poly(dimethylsiloxane, ω-silanol-terminated)-based copolymer, a poly(ethylene oxide diacrylate)-based copolymer, a poly(ethylene oxide dimethacrylate)-based copolymer, a poly(ethylene oxide)-based copolymer, a poly(ethylene propylene)-based copolymer, a poly(ethylene)-based copolymer, a poly(ethylene-co-butylenes)-based copolymer, a poly(glycerol diacrylate)-based copolymer, a poly(glycerol dimethacrylate)-based copolymer, a poly(glycolide)-based copolymer, a poly(isobutylene)-based copolymer, a poly(lactide)-based copolymer, a poly(methacrylate)-based copolymer, a poly(methacrylic acid sodium salt)-based copolymer, a poly (methacrylic acid)-based copolymer, a poly(methyl acrylate)-based copolymer, a poly(methyl methacrylate)-based copolymer, a poly(methylene indane)-based copolymer, a poly(N,N-dimethyl acrylamide)-based copolymer, a poly(N,N-dimethylaminoethyl methacrylate)-based copolymer, a poly(n-butyl acrylate)-base copolymer, a poly(neopentyl 4-styrene sulfonate)-based copolymer, a poly(neopentyl methacrylate)-based copolymer, a poly(N-isopropylacrylamide)-based copolymer, a poly(nitrobenzyl methacrylate)-based copolymer, a poly(N-methyl 2-vinyl pyridinium iodide)-based copolymer, a poly(N-vinyl imidazole)-based copolymer, a poly(N-vinyl pyrrolidone)-based copolymer, a poly(olefin)-based copolymer, a poly(propylene oxide diacrylate)-based copolymer, a poly(propylene oxide dimethacrylate)-based copolymer, a poly(propylene oxide)-based copolymer, a poly(p-vinylbenzenesulfonic acid)-based copolymer, a poly(siloxane)-based copolymer, a poly(sodium styrene sulfonate)-based copolymer, a poly(styrene)-based copolymer, a poly(styrene-co-4-styrene sulfonic acid sodium salt)-based copolymer, a poly(styrene-co-4-styrene sulfonic acid)-based copolymer, a poly(sulfonated glycidyl methacrylate)-based copolymer, a poly(tert-butyl 4-vinylbenzoate)-based copolymer, a poly(tert-butyl acrylate)-based copolymer, a poly(tert-butyl methacrylate)-based copolymer, a poly(tert-butyl methacrylate-co-n-butyl methacrylate)-based copolymer, a poly(tetrahydrofurfuryl methacrylate)-based copolymer, a poly(trimethylsiloxy-2-ethyl methacrylate)-based copolymer, a poly(vinyl alcohol)-based copolymer, a poly(vinyl pyridine)-based copolymer, a poly (α-methoxy-terminated)-based copolymer, a poly(α-propylacrylic acid)-based copolymer, a poly(ε-caprolactone)-based copolymer, a substituted poly(styrene)-based copolymer, a poly(methyl hydrogen siloxane)-based copolymer, and combinations thereof.

In some embodiments, the amphiphilic block copolymer is terminally functionalized, optionally, the amphiphilic block copolymer is acrylate-terminated, alkylacrylate-terminated, methacrylate-terminated, alkyl methacrylate-terminated, or combinations thereof.

In some embodiments, the number average molecular weight ($M_n$) of each block of the amphiphilic block copolymer is independently from about 1300 to about 32500, from about 250 to about 10000, or from about 2000 to about 8000.

In some embodiments, the ratio of the $M_n$ of a hydrophobic block to the $M_n$ of a hydrophilic block of the amphiphilic block copolymer is about 0.02 to about 128, about 0.05 to about 20, about 0.23 to about 10.9, or from about 0.33 to about 3.

In some embodiments, the amphiphilic block copolymer is a poly(ethylene glycol)-b-poly(styrene). In some embodiments, the number average molecular weight ($M_n$) of the poly(styrene) block in the poly(ethylene glycol)-b-poly(styrene) is from about 500 to about 2000. In some embodiments, the $M_n$ of the poly(ethylene glycol) block in the poly(ethylene glycol)-b-poly(styrene) is from about 2500 to about 10000.

In some embodiments, the ratio of the $M_n$ of the poly(styrene) block to the poly(ethylene glycol) block in the poly(ethylene glycol)-b-poly(styrene) is from about 2 to about 5, optionally from about 2.5 to about 4.5 or about 3 to about 4.

In some embodiments, the amphiphilic block copolymer is selected from PS(1500)-PEO(6200), PEG5000-PS1600, PS(1300)-PEO(5600) and combinations thereof. It will be appreciated by the person skilled in the art that the term "polyethylene oxide" and the abbreviation "PEO" refer to a polyether compound having the same general chemical structure as polyethylene glycol (PEG).

In some embodiments, the amphiphilic block copolymer comprised in the composite particle is crosslinked. In some embodiments, amphiphilic block copolymer is crosslinked using a crosslinking method selected from dialdehyde crosslinking, diamine crosslinking, diol crosslinking, ester crosslinking, free radical initiated alkene polymerization, Q-ammonium crosslinking, silane crosslinking, trialdehyde crosslinking, triamine crosslinking, triol crosslinking, urethane crosslinking, and combinations thereof.

In some embodiments, the silane crosslinking is done with silanes selected from monoalkyl silicates, dialkyl silicate, trialkyl silicates, tetraalkoxy orthosilicates, fumed silica, and combinations thereof. In some embodiments, the tetraalkoxy silicates are selected from tetramethyl orthosilicate (TMOS), tetraethyl orthosilicate (TEOS), and combinations thereof.

In some embodiments, the free radical initiated alkene polymerization is initiated with thermally activated and/or photoactivated free radical initiator, optionally the free radical initiator is selected from nitrile-based initiators, peroxide-based initiators and combinations thereof. In some embodiments, the free radical initiator is selected from azobisisobutyronitrile (AIBN), diisopropyl peroxydicarbonate (IPP), benzoyl peroxide (BPO), 1-hydroxycyclohexyl phenyl ketone, 2-Hydroxy-2-methylpropiophenone, trimethylpropane tri(3-mercaptopropionate), and combinations thereof.

In some embodiments, the amphiphilic block copolymer comprised in the composite particle of the present disclosure can be crosslinked using more than one crosslinking methods. In some embodiments, the amphiphilic block copolymer is crosslinked using silane crosslinking and free radical initiated alkene polymerization crosslinking. In some embodiments, the amphiphilic block copolymer is crosslinked using TEOS and AIBN.

In some embodiments, the amphiphilic block copolymer is selected from poly(1,2-butadiene)-b-poly(acrylic acid) crosslinked with AIBN, poly(1,2-butadiene)-b-poly(acrylic acid) crosslinked with fumed silica, poly(1,2-butadiene)-b-poly(acrylic acid) crosslinked with TEOS, poly(1,2-butadiene)-b-poly(acrylic acid) crosslinked with TEOS and AIBN, poly(1,4-butadiene)-b-poly(acrylic acid) crosslinked with AIBN, poly(1,4-butadiene)-b-poly(acrylic acid) crosslinked with TEOS, poly(1,4-butadiene)-b-poly(acrylic acid) crosslinked with TEOS and AIBN, poly(dimethylsiloxane)-b-poly(acrylic acid) crosslinked with TEOS, poly(dimethylsiloxane)-b-poly(ethylene oxide) crosslinked with TEOS, poly(methyl methacrylate)-b-poly(acrylic acid) crosslinked with TEOS, poly(methyl methacrylate)-b-poly(ethylene oxide) crosslinked with TEOS, poly(methyl methacrylate)-b-poly(ethylene oxide) uncrosslinked, poly(n-butyl acrylate)-b-poly(acrylic acid) crosslinked with TEOS, poly(styrene)-b-poly(ethylene oxide) crosslinked with TEOS, poly(vinyl alcohol)-b-poly(methyl methacrylate) with TEOS, poly(vinyl alcohol)-b-poly(styrene) crosslinked with TEOS, poly(1,2-butadiene)$_{15000}$-b-poly(acrylic acid)$_{6500}$ crosslinked with AIBN, poly(1,2-butadiene)$_{15000}$-b-poly(acrylic acid)$_{6500}$ crosslinked with fumed silica, poly(1,2-butadiene)$_{15000}$-b-poly(acrylic acid)$_{6500}$ crosslinked with TEOS, poly(1,2-butadiene)$_{15000}$-b-poly(acrylic acid)$_{6500}$ crosslinked with TEOS and AIBN, poly(1,4-butadiene)$_{9000}$-b-poly(acrylic acid)$_{3500}$ crosslinked with AIBN, poly(1,4-butadiene)$_{9000}$-b-poly(acrylic acid)$_{3500}$ crosslinked with TEOS, poly(1,4-butadiene)$_{9000}$-b-poly(acrylic acid)$_{3500}$ crosslinked with TEOS and AIBN, poly (dimethylsiloxane)$_{5000}$-b-poly(ethylene oxide)$_{2100}$ crosslinked with TEOS, poly(dimethylsiloxane)$_{8000}$-b-poly(acrylic acid)$_{8000}$ crosslinked with TEOS, poly(methyl methacrylate)$_{3000}$-b-poly(ethylene oxide)$_{3000}$ crosslinked with TEOS, poly(methyl methacrylate)$_{3000}$-b-poly(ethylene oxide)$_{3000}$ uncrosslinked, poly(methyl methacrylate)$_{7400}$-b-poly(acrylic acid)$_{24300}$ crosslinked with TEOS, poly(n-butyl acrylate)$_{7500}$-b-poly(acrylic acid)$_{5500}$ crosslinked with TEOS, poly(styrene)$_{1300}$-b-poly(ethylene oxide)$_{5600}$ crosslinked with TEOS, poly(vinyl alcohol)$_{2300}$-b-poly(methyl methacrylate)$_{25000}$ with TEOS, poly(vinyl alcohol)$_{2500}$-b-poly(styrene)$_{12500}$ crosslinked with TEOS, and combinations thereof.

In some embodiments, the amphiphilic block copolymer is selected from uncrosslinked poly(methyl methacrylate)-b-poly(ethylene oxide), poly(dimethylsiloxane)-b-poly(poly(acrylic acid) crosslinked with TEOS, poly(methyl methacrylate)-b-poly(acrylic acid) crosslinked with TEOS, poly(1,2-butadiene)-b-poly(acrylic acid) crosslinked with TEOS, poly(1,4-butadiene)-b-poly(acrylic acid) crosslinked with TEOS, poly(dimethylsiloxane)-b-poly(ethylene oxide) crosslinked with TEOS, poly(vinyl alcohol)-b-poly(ethylene oxide) crosslinked with TEOS, poly(styrene)-b-poly(ethylene oxide) crosslinked with TEOS, poly(n-butyl acrylate)-b-poly(acrylic acid) crosslinked with TEOS, poly(1,2-butadiene)-b-poly(acrylic acid) crosslinked with AIBN, poly(1,4-butadiene)-b-poly(acrylic acid) crosslinked with AIBN, poly(1,2-butadiene)-b-poly(acrylic acid) crosslinked with TEOS and AIBN, poly(1,4-butadiene)-b-poly(acrylic acid) crosslinked with TEOS and AIBN, and combinations thereof, optionally, the amphiphilic block copolymer is selected from uncrosslinked poly(methyl methacrylate)$_{3000}$-b-poly(ethylene oxide)$_{3000}$, poly(methyl methacrylate)$_{3000}$-b-poly(ethylene oxide)$_{3000}$ crosslinked with TEOS, poly(dimethylsiloxane)$_{8000}$-b-poly(acrylic acid)$_{8000}$ crosslinked with TEOS, poly(methyl methacrylate)$_{7400}$-b-poly(acrylic acid)$_{24300}$ crosslinked with TEOS, poly(1,2-butadiene)$_{15000}$-b-poly(acrylic acid)$_{6500}$ crosslinked with TEOS, poly(1,4-butadiene)$_{9000}$-b-poly(acrylic acid)$_{3500}$ crosslinked with TEOS, poly(dimethylsiloxane)$_{5000}$-b-poly(ethylene oxide)$_{2100}$ crosslinked with TEOS, poly(vinyl alcohol)$_{2300}$-b-poly(ethylene oxide)$_{2100}$ crosslinked with TEOS, poly(styrene)$_{1300}$-b-poly(ethylene oxide)$_{5600}$ crosslinked with TEOS, poly(n-butyl acrylate)$_{7500}$-b-poly(acrylic acid)$_{5500}$ crosslinked with TEOS, poly(1,2-butadiene)$_{15000}$-b-poly(acrylic acid)$_{6500}$ crosslinked with AIBN, poly(1,4-butadiene)$_{9000}$-b-poly(acrylic acid)$_{3500}$ crosslinked with AIBN, poly(1,2-butadiene)$_{15000}$-b-poly(acrylic acid)$_{6500}$ crosslinked with TEOS and AIBN, poly(1,4-butadiene)$_{9000}$-b-poly(acrylic acid)$_{3500}$ crosslinked with TEOS and AIBN, and combinations thereof.

When the composite particle is for use in a contact lens, the amphiphilic block copolymer can be a biocompatible amphiphilic block copolymer. Such amphiphilic block copolymers are known to a person skilled in the art. For example, such amphiphilic block copolymers are suitable to come into contact with a subject's eye.

In some embodiments, the composite particle has a diameter that is in the nanometer to micrometer range. In an embodiment, the composite particle has a diameter that is in the micrometer range. In another embodiment, the composite particle has a diameter that is in the nanometer range. In some embodiments, the composite particle has a diameter of about 1 nm to about 600 nm. In some embodiments, the composite particle has a diameter of about 30 nm to about 100 nm. In some embodiments, the composite particle has a diameter of about 40 nm to about 60 nm. In some embodiments, the composite particle has a diameter of about 50 nm. In some embodiments, the composite particle of the present disclosure has a diameter of about 50 to about 400 nanometers. In some embodiments, the diameter of the composite particle is from about 90 to about 200 nanometers.

In some embodiments, the composite particle of the present disclosure comprises more than one hydrophobic dye. In some embodiments, the composite particle of the present disclosure comprises more than one amphiphilic block copolymer.

In some embodiments, the amphiphilic block copolymer encapsulates the dye in a micelle formation.

In some embodiments, the composite particle is substantially solvent free.

It is shown that the composite particles of the present disclosure are capable to withstanding certain conditions used in the manufacture of hydrogels, silicone hydrogels, and/or contact lenses.

In some embodiments, the composite particle has an ultraviolet-visible (UV-Vis) absorbance spectrum that is substantially unchanged after 30 min of UV exposure at 12.8 mW/cm$^2$.

In some embodiments, the maximum UV-Vis absorbance of the composite particle after 30 min of UV exposure at 12.8 mW/cm$^2$ is at least 50%, 60%, 70%, 80%, or 90% of the maximum UV-Vis absorbance before the UV exposure at 12.8 mW/cm$^2$.

In some embodiments, the UV-Vis spectrum of the composite particle is substantially unchanged after photobleaching after about 1 min, about 3 min, about 5 min, about 10 min, or about 15 min of UV exposure at 250 nm at 12.8 mW/cm$^2$.

In some embodiments, the maximum UV-Vis absorbance of the composite particle after photobleaching by UV at 1 min, about 3 min, about 5 min, about 10 min, or about 15 min is at least 50%, 60%, 70%, 80%, or 90% of the maximum UV-Vis absorbance before the UV exposure at 250 nm at 12.8 mW/cm$^2$.

In some embodiments, the change in the UV-Vis transmittance spectrum of the composite particle is less than 80%, less than 70%, less than 60%, less than 50%, or less than 40% after photobleaching by UV exposure at 250 nm at 12.8 mW/cm$^2$ for 1 min, about 3 min, about 5 min, about 10 min, or about 15 min.

In some embodiments, the maximum UV-Vis absorbance of the composite particle in water, THF or mixtures thereof after heating at about 60° C., about 70° C., about 80° C., about 90° C. or about 100° C. for about 1 hour, about 3 hours, about 5 hours, about 8 hours, about 10 hours, about 12 hours, about 18 hours, about 24 hours, or about 30 hours is at least 50%, 60%, 70%, 80%, or 90% of the maximum UV-Vis absorbance before the heating.

In some embodiments, the UV-Vis absorbance spectrum of the composite particle is substantially unchanged after being autoclaved at about 121° C. at 108 kPa in an aqueous solution.

In some embodiments, the maximum UV-Vis absorbance of the composite particle after being autoclaved at about 121° C. at 108 kPa in an aqueous solution is at least 50%, 60%, 70%, 80%, or 90% of the maximum UV-Vis absorbance before the autoclaving.

In some embodiments, the UV-Vis absorbance spectrum of the composite particle after ethanol wash with about 25% v/v, about 50% v/v, about 75% v/v or about 95% v/v ethanol in water for about one hour is substantially unchanged.

In some embodiments, the maximum UV-Vis absorbance of the composite particle after ethanol wash with about 25% v/v, about 50% v/v, about 75% v/v or about 95% v/v ethanol in water for about one hour is at least 50%, 60%, 70%, 80%, or 90% of the maximum UV-Vis absorbance before the ethanol wash.

In some embodiments, the composite particle is storage stable in a saline solution at 50° C. for at least one day, at least three days, at least four days, at least five days, at least 125 hours, at least 130 hours, or at least 136 hours.

In some embodiments, the UV-Vis absorbance spectrum of the composite particle after storage in a saline solution at 50° C. for at least one day, at least three days, at least four days, at least five days, at least 125 hours, at least 130 hours, or at least 136 hours is substantially unchanged.

In some embodiments, the maximum UV-Vis absorbance of the composite particle after storage in a saline solution at 50° C. for at least one day, at least three days, at least four days, at least five days, at least 125 hours, at least 130 hours, or at least 136 hours is at least 50%, 60%, 70%, 80%, or 90% of the maximum UV-Vis absorbance before the storage.

In some embodiments, the change in the maximum UV-Vis absorbance of the composite particle after photobleaching at UV exposure at 250 nm at 12.8 mW/cm$^2$ after about 1 min, about 3 min, about 5 min, about 10 min, or about 15 min is smaller than the change in the maximum UV-Vis absorbance of the hydrophobic dye alone after photobleaching at UV exposure at 250 nm after about 1 min, about 3 min, about 5 min, about 10 min, or about 15 min.

In some embodiments, the change in the maximum UV-Vis transmittance of the composite particle after photobleaching at UV exposure at 250 nm at 12.8 mW/cm$^2$ after about 1 min, about 3 min, about 5 min, about 10 min, or about 15 min is smaller than the change in the maximum UV-Vis transmittance of the hydrophobic dye alone after photobleaching at UV exposure at 250 nm after about 1 min, about 3 min, about 5 min, about 10 min, or about 15 min respectively.

In some embodiments, the change in the maximum UV-Vis absorbance of the composite particle after heating at about 60° C., about 70° C., about 80° C., about 90° C. or about 100° C. for about 1 hour, about 3 hours, about 5 hours, about 8 hours, about 10 hours, about 12 hours, or about 18 hours is smaller than the change in the maximum UV-Vis absorbance of the hydrophobic dye after heating at about 60° C., about 70° C., about 80° C., about 90° C. or about 100° C. for about 1 hour, about 3 hours, about 5 hours, about 8 hours, about 10 hours, about 12 hours, or about 18 hours respectively.

In some embodiments, the change in the maximum UV-Vis absorbance of the composite particle after being autoclaved at about 121° C. at 108 kPa in an aqueous solution is smaller than the change in the maximum UV-Vis absorbance of the hydrophobic dye after being autoclaved at about 121° C. at 108 kPa in an aqueous solution.

In some embodiments, the change in the maximum UV-Vis absorbance of the composite particle after storage in a saline solution at 50° C. for at least one day, at least three days, at least four days, at least five days, at least 125 hours, at least 130 hours, or at least 136 hours is smaller than the change in the maximum UV-Vis absorbance of the hydrophobic dye after storage in a saline solution at 50° C. for at least one day, at least three days, at least four days, at least five days, at least 125 hours, at least 130 hours, or at least 136 hours respectively.

In some embodiments, the hydrophobic dye has an absorbance in a region selected from the ultraviolet region, the visible region, and combinations thereof. In an embodiment, the hydrophobic dye has an absorbance in the ultraviolet region. In another embodiment, the hydrophobic dye has an absorbance in the visible region. In another embodiment, the hydrophobic dye has an absorbance in the ultraviolet region and in the visible region.

In another aspect, the present disclosure includes a composition comprising one or more composite particles of the present disclosure in solvent selected from an aqueous solvent, an organic solvent, and mixtures thereof. The present disclosure also includes a composition comprising:

a composite particle in an aqueous medium, the composite particle comprising:

a hydrophobic dye; and an amphiphilic block copolymer encapsulating the hydrophobic dye, wherein the hydrophobic dye has an absorbance in the range of from the ultraviolet region to the infrared region of the electromagnetic spectrum.

It will be appreciated by a person skilled in the art that the composite particles in the compositions of the present disclosure can be varied as in the embodiments for the composite particles of the present disclosure.

In some embodiments, the solvent is the aqueous solvent. In some embodiments, the solvent is water.

In some embodiments, the organic solvent is water-miscible. In some embodiments, the organic solvent is selected from alcohols, ethers, ketones, amides, amines, thiols, aldehydes, carboxylic acids, butanediols, ethanolamines, dimethoxyethanes, dimethyl sulfoxides, dioxanes, alkylamines, pyrrolidones, propanediols, pyridines, and combinations thereof.

In some embodiments, the organic solvent is selected from ethanol, methanol, propanol, butanol, butoxyethanol, THF, tetrahydropyran (THP), dioxane, DMF, acetone, acetonitrile, N,N-dimethylformamide, dioxane, methyl ethyl ketone, acetaldehyde, 1,2-butanediol, 1,3-butanediol, 1,4-butanediol, diethanolamine, diethylenetriamine, dimethoxyethane, ethylamine, methylamine, N-methyl-2-pyrrolidone, 1-propanol, 1,3-propanediol, pyridine, and combinations thereof.

In some embodiments, the composition of the present disclosure has an ultra-violet (UV-Vis) absorbance spectrum that is substantially unchanged after 30 min of UV exposure at 12.8 mW/cm$^2$.

In some embodiments, the composition of the present disclosure is stable in tetrahydrofuran (THF), water or mixtures thereof for at least: one day, one week, three weeks, seven weeks, 11 weeks, three months, or six months. In some embodiments, the composition of the present disclosure is stable in THF for at least one day, at least one week, at least three weeks, at least seven weeks, or at least 11 weeks. In some embodiments, the composition of the present disclosure is stable in THF for at least at least six months.

In some embodiments, the maximum UV-Vis absorbance of the composition of the present disclosure after heating at about 60° C., about 70° C., about 80° C., about 90° C. or about 100° C. in water, aqueous THF or mixtures thereof for 15 minutes is at least 50%, 60%, 70%, 80%, or 90% of the maximum UV-Vis absorbance before the heating. In some embodiments, the UV-Vis absorbance of the composite particle composition of the present disclosure is substantially unchanged over three months storage at standard room temperature.

In some embodiments, the maximum UV-Vis absorbance of the composition after 30 min of UV exposure at 12.8 mW/cm$^2$ is at least 50%, 60%, 70%, 80%, or 90% of the maximum UV-Vis absorbance before the UV exposure at 12.8 mW/cm$^2$.

In some embodiments, the UV-Vis spectrum of the composite particle is substantially unchanged after photobleaching after 1 min, about 3 min, about 5 min, about 10 min, or about 15 min of UV exposure at 250 nm at 12.8 mW/cm$^2$.

In some embodiments, the maximum UV-Vis absorbance of the composition after photobleaching by UV exposure at 250 nm for about 1 min, about 3 min, about 5 min, about 10 min, or about 15 min is at least 50%, 60%, 70%, 80%, or 90% of the maximum UV-Vis absorbance before the UV exposure at 250 nm at 12.8 mW/cm$^2$.

In some embodiments, the change in the UV-Vis transmittance spectrum of the composition is less than 80%, less than 70%, less than 60%, less than 50%, or less than 40% after photobleaching by UV exposure at 250 nm at 12.8 mW/cm$^2$ for about 1 min, about 3 min, about 5 min, about 10 min, or about 15 min.

In some embodiments, the maximum UV-Vis absorbance of the composition in water, THF or mixtures thereof after heating at about 60° C., about 70° C., about 80° C., about 90° C. or about 100° C. for about 1 hour, about 3 hours, about 5 hours, about 8 hours, about 10 hours, about 12 hours, about 18 hours, about 24 hours, or about 30 hours is at least 50%, 60%, 70%, 80%, or 90% of the maximum UV-Vis absorbance before the heating.

In some embodiments, the UV-Vis absorbance spectrum of the composition is substantially unchanged after being autoclaved at about 121° C. at 108 kPa in an aqueous solution.

In some embodiments, the maximum UV-Vis absorbance of the composition after being autoclaved at about 121° C. at 108 kPa in an aqueous solution is at least 50%, 60%, 70%, 80%, or 90% of the maximum UV-Vis absorbance before the autoclaving.

In some embodiments, the UV-Vis absorbance spectrum of the composition after ethanol wash with about 25% v/v, about 50% v/v, about 75% v/v or about 95% v/v ethanol in water for about one hour is substantially unchanged.

In some embodiments, the maximum UV-Vis absorbance of the composition after ethanol wash with about 25% v/v, about 50% v/v, about 75% v/v or about 95% v/v ethanol in water for about one hour is at least 50%, 60%, 70%, 80%, or 90% of the maximum UV-Vis absorbance before the ethanol wash.

In some embodiments, the composition is storage stable in a saline solution at 50° C. for at least one day, at least three days, at least four days, at least five days, at least 125 hours, at least 130 hours, or at least 136 hours.

In some embodiments, the UV-Vis absorbance spectrum of the composition after storage in a saline solution at 50° C. for at least one day, at least three days, at least four days, at least five days, at least 125 hours, at least 130 hours, or at least 136 hours is substantially unchanged.

In some embodiments, the maximum UV-Vis absorbance of the composition after storage in a saline solution at 50° C. for at least one day, at least three days, at least four days, at least five days, at least 125 hours, at least 130 hours, or at least 136 hours is at least 50%, 60%, 70%, 80%, or 90% of the maximum UV-Vis absorbance before the storage.

In some embodiments, the composition is stable in aqueous tetrahydrofuran (THF), water or mixtures thereof for at least one day, at least one week, at least three weeks, at least seven weeks, at least 11 weeks, at least three months, or at least six months.

In some embodiments, the composition is stable in aqueous THF for at least one day, one week, three weeks, seven weeks, or 11 weeks, optionally wherein the composition is stable in THF for at least six months.

In some embodiments, the composition of the present disclosure has an FWHM that is less than 150 nm. In some embodiments, the FWHM of the composition is less than double of the FWHM of the dye.

In some embodiments, the composition of the present disclosure is prepared by a method comprising preparing a dye/polymer solution comprising the hydrophobic dye and the amphiphilic block copolymer in an organic solvent, and adding the dye/polymer solution to water to obtain the composition as an aqueous micelle solution. In some embodiments, the addition of the dye/polymer solution to the water or the combining of the dye/polymer solution and the water is made by using a process comprising flash nanoprecipitation (or a comparable encapsulation technique), microfluidics mixing, ultrasonication, sonication, mechanical agitation, a syringe pump or a Pasteur pipette. In another embodiment, the process comprises flash nanoprecipitation. In some embodiments, the water is stirred or mixed during the addition. In some embodiments, the process further comprises centrifuging the aqueous micelle solution to contain a supernatant comprising the composition.

In some embodiments, the composition of the present disclosure is prepared by a method comprising preparing a dye/polymer solution comprising the hydrophobic dye and the amphiphilic block copolymer in an organic solvent, combining the dye/polymer solution with water, and mixing the dye/polymer solution and the water to obtain the composition as an aqueous micelle solution. In some embodiments, the combining of the dye/polymer solution and the water and the mixing of the dye/polymer solution and the water is made by using a process comprising flash nanoprecipitation (or a comparable encapsulation technique), microfluidics mixing, ultrasonication, sonication, mechanical agitation, a syringe pump or a Pasteur pipette. In another embodiment, the process comprises flash nanoprecipitation. In some embodiments, the process further comprises centrifuging the aqueous micelle solution to contain a supernatant comprising the composition.

Accordingly, in another aspect, the present disclosure also includes a method of preparing a composition of the present disclosure comprising preparing a dye/polymer solution comprising the hydrophobic dye and the amphiphilic block copolymer in an organic solvent, and adding the dye/polymer solution to water to obtain the composition as an aqueous micelle solution. In some embodiments, the addition of the dye/polymer solution to the water is made by using a process comprising flash nanoprecipitation (or a comparable encapsulation technique), microfluidics mixing, ultrasonication, sonication, mechanical agitation, a syringe pump or a Pasteur pipette. In another embodiment, the process comprises flash nanoprecipitation. In some embodiments, the water is stirred or mixed during the addition. In some embodiments, the method further comprises centrifuging the aqueous micelle solution to obtain a supernatant comprising the composition.

In another aspect, the present disclosure also includes a method of preparing a composition of the present disclosure comprising preparing a dye/polymer solution comprising the hydrophobic dye and the amphiphilic block copolymer in an organic solvent, and combining the dye/polymer solution and water, and mixing the dye/polymer solution and the water to obtain the composition as an aqueous micelle solution. In some embodiments, the combining and the mixing of the dye/polymer solution and the water is made by using a process comprising flash nanoprecipitation (or a comparable encapsulation technique), microfluidics mixing, ultrasonication, sonication, mechanical agitation, a syringe pump or a Pasteur pipette. In another embodiment, the process comprises flash nanoprecipitation. In some embodiments, the method further comprises centrifuging the aqueous micelle solution to obtain a supernatant comprising the composition.

Further, the present disclosure includes a method of preparing a composite particle of the present disclosure comprising preparing a dye/polymer solution comprising the hydrophobic dye and the amphiphilic block copolymer in an organic solvent; adding the dye/polymer solution to water, while mixing, to obtain the composite particle in an aqueous solution; and optionally obtaining the composite particle from the aqueous solution by filtration.

In another aspect, the present disclosure includes a method of preparing a composite particle of the present disclosure comprising preparing a dye/polymer solution comprising the hydrophobic dye and the amphiphilic block copolymer in an organic solvent; combining the dye/polymer solution and water, and mixing the dye/polymer solution and the water to obtain the composite particle in an aqueous solution; and optionally obtaining the composite particle from the aqueous solution by filtration.

In some embodiments, the composite particle of the present disclosure comprises amphiphilic block copolymers that are crosslinked using one or more crosslinking agents. It can be appreciated by a person skilled in the art that crosslinking of amphiphilic polymers can be done using any suitable methods known in the art. In one aspect, the present disclosure also includes a method of preparing a composition comprising a composite particle of the present disclosure comprising preparing a dye/polymer/crosslinking agent solution comprising the hydrophobic dye, the amphiphilic block copolymer and one or more crosslinking agents in an organic solvent; and adding the dye/polymer/crosslinking agent solution to water, while mixing, to obtain an aqueous micelle solution.

In another aspect, the present disclosure also includes a method of preparing a composition comprising a composite particle of the present disclosure comprising preparing a dye/polymer/crosslinking agent solution comprising the hydrophobic dye, the amphiphilic block copolymer and one or more crosslinking agents in an organic solvent; and combining the dye/polymer/crosslinking agent solution and water, and mixing the dye/polymer/crosslinking agent solution and the water to obtain an aqueous micelle solution.

In another aspect, the present disclosure includes a method of preparing a composite particle of the present disclosure comprising preparing a dye/polymer/crosslinking agent solution comprising the hydrophobic dye, the amphiphilic block copolymer, and a crosslinking agent in an organic solvent; adding the dye/polymer/crosslinking agent solution to water, while mixing, to obtain an aqueous solution; and optionally obtaining the composite particle from the aqueous solution by filtration.

In another aspect, the present disclosure includes a method of preparing a composite particle of the present disclosure comprising preparing a dye/polymer/crosslinking agent solution comprising the hydrophobic dye, the amphiphilic block copolymer, and a crosslinking agent in an organic solvent; combining the dye/polymer/crosslinking agent solution and water, and mixing the dye/polymer/crosslinking agent solution and the water to obtain an aqueous solution; and optionally obtaining the composite particle from the aqueous solution by filtration.

In some embodiments, the crosslinking agent is selected from silanes as defined above, thermal activated and/or photoactivated free radical initiators as defined above, and combinations thereof. In some embodiments, the crosslinking agent is selected from silanes as described above and combinations thereof and the method comprises optionally heating the aqueous micelle solution or the aqueous solution. In some embodiments, the heating initiates the crosslinking. In some embodiments, the crosslinking agent is selected from thermal activated and/or photoactivated free radical initiators, and the method comprises heating and/or UV irradiating the aqueous micelle solution or the aqueous solution. In some embodiments, the crosslinking agent is one or more silanes and one or more free radical initiators as defined above, and the method comprises heating and/or UV irradiating the aqueous micelle solution or the aqueous solution. In some embodiments, the heating and/or UV irradiating initiated the free radical process that leads to alkene polymerization crosslinking.

In some embodiments, the composite particle of the present disclosure further comprises a cryoprotectant. In some embodiments, the cryoprotectant is PEG 4000. In some embodiments, the method of preparing the composition or the composite particle of the present disclosure further comprises adding a cryoprotectant to the aqueous solution or the aqueous micelle solution and drying the aqueous solution or the aqueous micelle solution to obtain dried composite particle. For example, the drying can be done by lyophilization or suction filtration.

In some embodiments, the organic solvent used in the method of preparation of the compositions of the present disclosure is selected from THF, dichloromethane, chloroform, N,N-dimethylformamide, dioxane, methanol, ethanol, propanol or other suitable alcohols, ethylene glycol, glycerol, diethyl ether, diisopropyl ether, methyl ethyl ketone, dichlorooxyethane, xylene, acetone, benzene, toluene, and combinations thereof. In some embodiments, the organic solvent is THF.

Since in some embodiments, the composition of the present disclosure shows stability in organic solvents such as THF and in aqueous solvent such as water, and at various elevated temperatures, the composition of the present disclosure can be amenable to manufacture processes involving different conditions such as different solvents and different temperatures. Accordingly, in some embodiments, the composite particles and/or compositions of the present disclosure can be for use as an optical filter in hydrogels such as silicone hydrogels. For example, for use as an optical filter in contact lenses optionally wherein the contact lenses are hydrogel or silicone hydrogel based.

Accordingly, in another aspect, the present disclosure includes a contact lens comprising one or more composite particles or one or more compositions of the present disclosure.

In some embodiments, the contact lens is hydrogel or silicone hydrogel based.

In some embodiments, the hydrogel or silicone hydrogel is biocompatible and/or suitable for use in an animal subject; optionally, the animal subject is a mammal; optionally, the mammal is a human.

In some embodiments, the maximum UV-Vis absorbance of the contact lens after photobleaching by UV exposure of 250 nm at 12.8 mW/cm$^2$ for about 1 min, about 3 min, about 5 min, about 10 min, or about 15 min is at least 50%, 60%, 70%, 80%, or 90% of the maximum UV-Vis absorbance before the UV exposure at 250 nm at 12.8 mW/cm$^2$.

In some embodiments, the change in the UV-Vis transmittance spectrum of the contact lens is less than 80%, less than 70%, less than 60%, less than 50%, or less than 40% after photobleaching by UV exposure of 250 nm at 12.8 mW/cm² for about 1 min, about 3 min, about 5 min, about 10 min, or about 15 min.

In some embodiments, the UV-Vis absorbance spectrum of the contact lens is substantially unchanged after being autoclaved at about 121° C. at 108 kPa in an aqueous solution.

In some embodiments, the UV-Vis absorbance spectrum of the contact lens after ethanol wash with about 25% v/v, about 50% v/v, about 75% v/v or about 95% v/v ethanol in water for about one hour is substantially unchanged.

In some embodiments, the maximum UV-Vis absorbance of the contact lens after ethanol wash with about 25% v/v, about 50% v/v, about 75% v/v or about 95% v/v ethanol in water for about one hour is at least 50%, 60%, 70%, 80%, or 90% of the maximum UV-Vis absorbance before the ethanol wash.

In some embodiments, the contact lens is storage stable in a saline solution at 50° C. for at least one day, at least three days, at least four days, at least five days, at least 125 hours, at least 130 hours, or at least 136 hours.

In some embodiments, the UV-Vis absorbance spectrum of the contact lens after storage in a saline solution at 50° C. for at least one day, at least three days, at least four days, at least five days, at least 125 hours, at least 130 hours, or at least 136 hours is substantially unchanged.

In some embodiments, the maximum UV-Vis absorbance of the contact lens after storage in a saline solution at 50° C. for at least one day, at least three days, at least four days, at least five days, at least 125 hours, at least 130 hours, or at least 136 hours is at least 50%, 60%, 70%, 80%, or 90% of the maximum UV-Vis absorbance before the storage In some embodiments, the hydrophobic dye is non-reactive toward the hydrogel or the silicone hydrogel. For example, the term "non-reactive" as used herein can mean that the dye is free of functional groups that can participate in the polymerization/crosslinking process that creates the hydrogel. For example, a non-reactive dye optionally is free of vinyl groups or methacrylate groups.

Any suitable hydrogel polymeric material may be used in the contact lenses of the present disclosure. For example, some common hydrogel materials can be prepared from suitable hydrophilic monomers, hydrophobic monomers, siloxane monomers, or combinations thereof and optionally suitable crosslinking agents. In some embodiments, it is appreciated by a person skilled in the art that the contact lens is prepared with material that is biocompatible or suitable for use in a subject's eye. In some embodiments, the subject is an animal subject, for example a human subject.

For example, hydrophilic monomers include methyl acrylate, ethyl acrylate, acrylic acid, methyl methacrylate, ethyl methacrylate, 2-hydroxyethyl methacrylate, methacrylic acid, 2,2,2-trifluoroethyl methacrylate, 2,2,3,3,3-pentafluoropropyl methacrylate, hexafluoroisopropyl methacrylate, 1,1,2,2-tetrafluoroethoxy 2-hydroxypropyl methacrylate, ethylene glycol dimethacrylate, tetraethylene glycol dimethacrylate, diethylene glycol dimethacrylate, polyethylene glycol dimethacrylate, trimethylolpropane trimethacrylate, pentaerythritol tetramethacrylate, bisphenol A dimethacrylate, vinyl methacrylatetriallyl trimelitate, and allylmethacrylate2-methacryloylcarbamoyloxyethyl methacrylate, 2-2(2-methacryloxy carbamoyloxy)ethyl acrylate, 2-(2-methacryloxyethylcarbamoyloxy)propyl methacrylate, 2-methacryloxyethylcarbamoyloxytetraethylene glycol methacrylate, methacryloyloxyethyl isocyanate, trifluoroethyl methacrylate, 1,1,2,2-tetraethoxy-2-hydroxypropyl methacrylate, 3-(1,1,2,2-tetrafluoroethoxy)-2-hydroxypropyl methacrylate, hydroxyethyl methacrylate, N-methyl-N-vinylacetamide, hydroxybuyl methacrylate, glycerol monomethacrylate, glycerol dimethacrylate, N-vinylformamide, N-vinyl-N-ethylformamide, N-vinylacetamide, N-vinylisopropylamide, N-vinyl-N-methylacetamide, N-vinyl-N-ethylacetamide, N-vinylpyrrolidone, N-vinylcaprolactam, N-vinyllactam, 1-vinylazonan-2-one, 2-hydroxypropyl methacrylate, 2-hydroxybutyl acrylate, 4-hydroxybutyl acrylate, glycerol methacrylate, itaconic acid, fumaric acid, maleic acid, dimethylaminoethyl methacrylate, diethylaminoethyl methacrylate, N,N-dimethylacrylamide, N,N-diethylacrylamide, N-methylacrylamide, methylenebisacrylamide, diacetoneacrylamide, methoxyethylene glycol monomethacrylate, methoxypropylene glycol monoacrylate, acrylic acid fluoroalkyl ester, tetrafluoroethyl methacrylate, tetrafluoropropyl methacrylate, pentafluoropropyl methacrylate, trifluoroethyl acrylate, tetrafluoroethyl acrylate, tetrafluoropropyl acrylate, pentafluoropropyl acrylate, hexafluorobutyl acrylate, hexafluoroisopropyl acrylate, polyethylene glycol, ethoxylated alkyl glucoside, methacrylic anhydride, methacryloyl chloride, vinylbenzoyl chloride, and N-isopropyl acrylamide.

For example, hydrophobic monomers include isobornyl methacrylate, methyl methacrylate, triallyl isocyanurate, allyl methacrylate, styrene, tert-butylstyrene, α-methylstyrene, t-butyl methacrylate, cyclohexyl methacrylate, alkyl methacrylate, fluorinated alkyl methacrylates, long-chain acrylamides (e.g. octylacrylamide), cyclopentyl methacrylate, and perfluorocyclohexylmethacrylate.

For example, silicone hydrogels may be prepared from any one or more of the monomers mentioned above, and also include one or more silicone components such as fluorosilicone acrylate and/or polyorganosiloxanes such as polydimethylsiloxane (PDMS). For example, other siloxane monomers include tris(trimethylsiloxy)silylpropyl methacrylate, bis(trimethylsiloxy)methylsilylpropyl methacrylate, pentamethyldisiloxanepropyl methacrylate, tris(trimethylsiloxy)silylpropyloxyethyl methacrylate, tris(polydimethylsiloxy)silylpropyl methacrylate, tri(dimethyltrifluorpropylsiloxy) silylpropyl methacrylate, tetramethyldisiloxanebis(propyl methacrylate), 2-methacryloylcarbamoyloxyethyl methacrylate, 2-2(2-methacryloxy carbamoyloxy)ethyl acrylate, 2-(2-methacryloxyethylcarbamoyloxy)propyl methacrylate, 2-methacryloxyethylcarbamoyloxytetraethylene glycol methacrylatemethacryloyloxyethyl isocyanate, poly(hydroxyethyl methacrylate), polydimethylsiloxane (PDMS), 1,3-bis(3-methacryloxypropyl)tetramethyldisiloxane, octamethylcyclotetrasiloxane, 1,3,5-trimethyltrifluoropropyl-cyclotrisiloxane, 1,3,5,7-tetramethyl-cyclotetrasiloxane, 1,3-bis(3-(2-hydroxyethoxy)propyl)tetramethyldisiloxane, alpha-butyl-omega-3-(2-hydroxy ethoxy)propyl)polydimethylsiloxane, tris(dimethyltrifluoropropylsiloxy)silylpropyl methacrylate, pentamethyldisiloxanyl methyl methacrylate, tris(trimethylsiloxy)methacryloxy propylsilane, phenyltretramethyl-disiloxanyl ethyl acrylate, methyl di(trimethylsiloxy)methacryloxymethyl silane, 3-tris(trimethylsiloxy)silylpropyl vinyl carbamate, 3-tris(trimethylsiloxy)silylpropyl allyl carbamate, 3-tris(trimethylsiloxy)silylpropyl vinyl carbonate, methacryloxypropyl tris(trimethylsiloxy)silane, 3-methacryloxypropylbis(trimethylsiloxy)methylsilane, and methacryloxypropylpentamethyldisiloxane.

The preparation of hydrogel materials may also comprise the use of suitable crosslinking agents, photopolymerization initiators, thermal initiators, catalysts, and/or polymerization inhibitors.

For example, crosslinking agents can include ethylene glycol dimethacrylate, diethylene glycol dimethacrylate, triethylene glycol dimethacrylate, polyethylene glycol dimethacrylate, trimethylolpropane trimethacrylate, pentaerythritol tetramethacrylate, bisphenol A dimethacrylate, vinyl methacrylate, allyl methacrylate, ethylene glycol diacrylate, diethylene glycol diacrylate, triethylene glycol diacrylate, polyethylene glycol diacrylate, trimethylolpropane triacrylate, pentaerythritol tetra-acrylate, bisphenol A diacrylate, vinyl acrylate, and allyl acrylate.

For example, photoinitiators can include benzoinethylether, benzyldimethylketal, α,α-diethoxyacetophenone, and 2,4,6-trimethyl benzoyldiphenylphosphineoxide.

For example, thermal initiators can include benzoyl peroxide, t-butyl peroxide, azobisisobutyronitrile, and azobisdimethylvaleronitrile.

For example, catalysts can include triflic acid, sulfuric acid, and acid clay.

For example, polymerization inhibitors can include hydroquinone, 2,6-di-ternbutyl-4-methylphenol, and para-methoxyphenol.

Since in some embodiments, the composite particles and/or the compositions of the present disclosure can be used to filter or block a range of wavelength of light radiation, by incorporating different dyes of different absorption properties, and/or by using more than one composite particle or composition of the present disclosure, different wavelengths can be blocked selectively. Accordingly, in another aspect, the present disclosure includes a method of optical filtration comprising selectively blocking light radiation using one or more composite particles or compositions of the present disclosure.

In another aspect, the present disclosure includes a use of one or more composite particles or compositions of the present disclosure as an optical filter. In some embodiments, the use of one or more composite particles or compositions of the present disclosure as an optical filter is in contact lenses. In some embodiments, the use of one or more composite particles or compositions of the present disclosure as an optical filter is in a hydrogel. In some embodiments, the optical filter is to selectively block light radiation.

In some embodiments, the light radiation that is selectively blocked is selected from infrared light, UV light, visible light, blue light, and combinations thereof. In some embodiments, the light radiation selectively blocked is UV light or blue light. In an embodiment, the light radiation that is selectively blocked is infrared light. In another embodiment, the light radiation selectively blocked is UV light. In a further embodiment, the light radiation selectively blocked is visible light, such as red light, blue light, or green light. In another embodiment, the light radiation selectively blocked is blue light. In a further embodiment of the present disclosure, the light radiation selectively blocked is a combination of infrared light, UV light, visible light and/or blue light.

The following non-limiting examples are illustrative of the present disclosure:

EXAMPLES

Example 1 General Methods and Materials

The dyes Exciton™ ABS 456 and 594 were purchased from Luxottica/Exciton (product numbers 04560, 05940). The block copolymer PS(1500)-PEO(6200) was purchased from Polymer Source Inc., sample #P11112-SEO. Tetrahydrofuran (THF) used was purchased from Fisher Scientific (T397-4).

Spectrophotometer quartz cuvettes (VWR® Spectrosil Spectrophotometer Cells, Standard Rectangular) were purchased from VWR, catalog #414004-064. Micropipettes used were Fisherbrand™ Finnpipette™ II Adjustable-Volume Pipettes, 100-1000 µL, Mandel PSR #14440. UV-Vis spectra were taken on an Agilent Cary™ 60 Spectrophotometer. UV bleaching experiments were conducted using UV reactor Rayonet Photochemical Reactor, model RPR-100, with ten 253.7 nm lamps and four 350 nm lamps, with intensity reading 12,800 µW/cm². Dynamic Light Scattering (DLS) experiments were conducted with DLS instrument BI-200SM Research Goniometer System, Serial no. 80615, DLS detector BI-APDx DLS (Brookhaven Instruments), serial no. 29244. DLS instrument and detector were mounted onto a TMC vibration control clean top (AMETEK Ultra Precision Technologies). Round bottom flask reaction block used was Optitherm™ by Chemglass, Radleys Discovery Technologies, RR98072. Condenser used was KIMBLE® 21800 KIMAX®.

Example 2 Encapsulation Process

Figure 1:
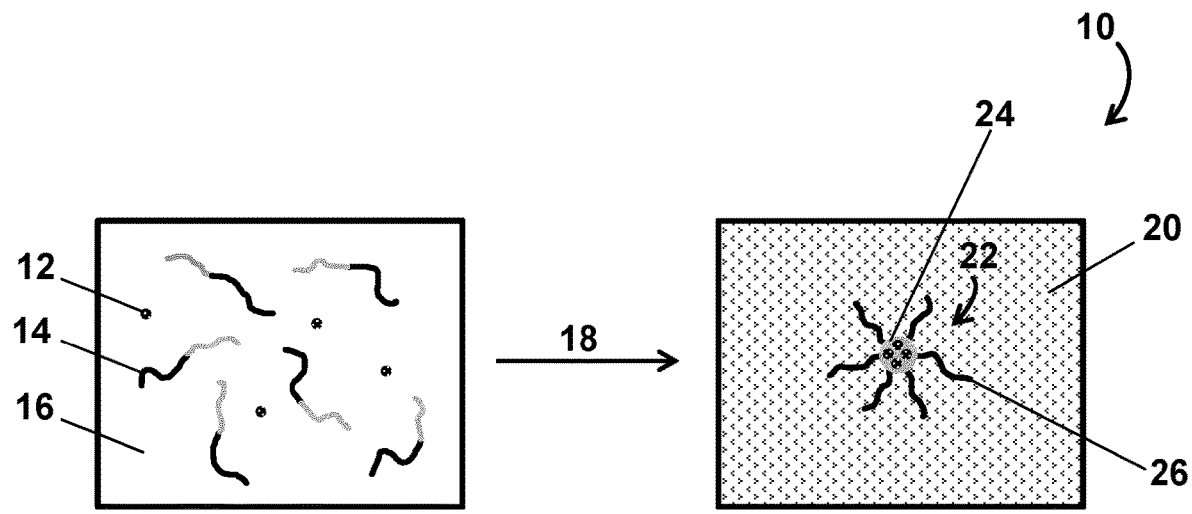
FIG. 1 shows an illustrative representation of the encapsulation process according to an embodiment of the present disclosure.

An illustrative representation of an embodiment of the dye encapsulation process 10 is shown in FIG. 1. In general terms, the exemplary method shown in FIG. 1 comprises dissolving dye 12 and amphiphilic block copolymer 14 in an organic solvent 16 such as THF to form a mixture, then adding 18 the mixture to water 20 under conditions suitable for encapsulation, to form the composite particle 22. As shown in FIG. 1, the amphiphilic block copolymer 14 encapsulates the dye 12 and comprises a hydrophobic core 24 and a hydrophilic shell 26. Three different general procedures for making the micelles were used:

General Encapsulation Procedure 1

In an embodiment, about 50 mg of dye and 50 mg of block copolymer were dissolved in 10 mL of THF. Gentle heat can optionally be applied to aid dissolution of the block copolymer. 90 mL of MilliQ™ water was rapidly stirred in a beaker at 1200 rpm. The solution of dye and block copolymer was added to the stirring water over the course of 3.5 min at room temperature using a Pasteur pipette.

General Encapsulation Procedure 2

About 100 mg of a dye and 100 mg of block copolymer were dissolved in 20 mL of THF. Gentle heat can optionally be applied to aid dissolution of the copolymer in THF. 10 mL of the resulting dye/copolymer solution was taken up using a syringe and placed on the syringe pump. The dye/copolymer solution in the syringe was added at a rate of 2.115 mL/min to 90 mL of ultrapure water while stirring at 1200 rpm.

Optionally, the resulting aqueous micelle solution containing the composite particle composition was centrifuged at 14,000 rpm for 30 min and the supernatant containing the composite particle composition was kept.

General Encapsulation Procedure 3

About 100 mg of a dye and 100 mg of block copolymer were dissolved in 20 mL of THF. Gentle heat can optionally be applied to aid dissolution of the copolymer in THF. 10 mL of the resulting dye/copolymer solution was taken up in a syringe equipped with a needle. 10 mL ultrapure water was taken up with a separate syringe equipped with a needle. The syringe with the dye/copolymer solution and the syringe with the ultrapure water were connected to each arm of the confined impinging jet (CIJ) mixer. The contents were mixed in the CIJ to perform flash nanoprecipitation (FNP). The resulting mixture was dropped into 80 mL of ultrapure water stirring at 1200 rpm.

Optionally, the resulting aqueous micelle solution containing the composite particle was centrifuged at 14,000 rpm for 30 min and the supernatant containing the composite particle composition was kept.

Example 3 Composite Particles of Exciton ABS 594, 456 and Epolight 5843 Epolight 5843

Figure 2:
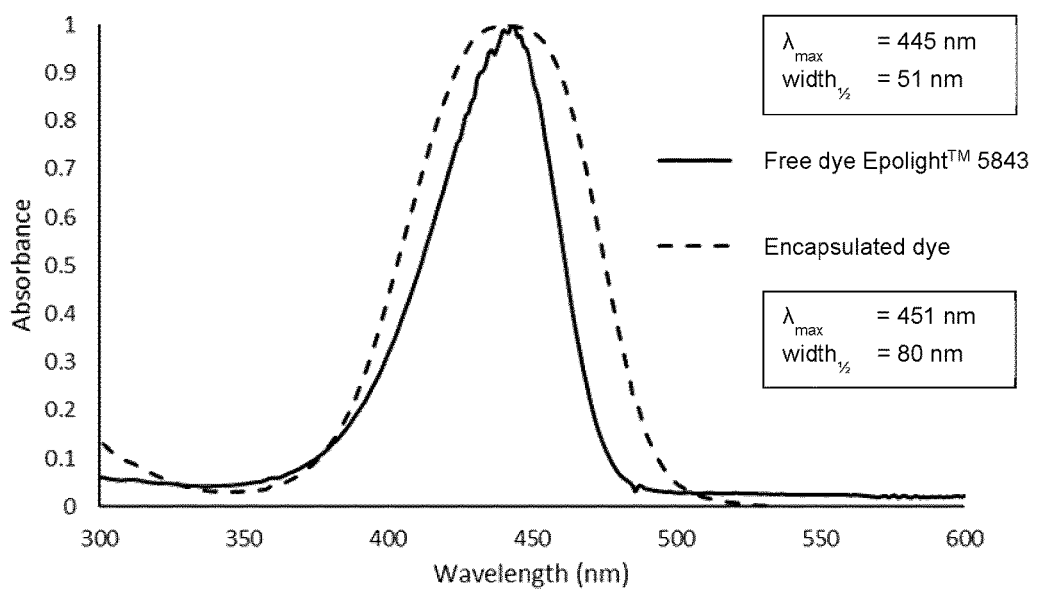
FIG. 2 shows a comparison between the ultraviolet-visible (UV-Vis) absorption spectrum of the dye Epolight™ 5843 without and with encapsulation.

The dye Epolight™ 5843 was encapsulated using General Encapsulation Procedure 1 with diblock copolymer PEG5000-PS1600. FIG. 2 shows a comparison of UV-Vis spectrum of the dye before and after encapsulation. The UV-Vis spectrum taken in THF shows that the unencapsulated dye Epolight 5843 has a maximum absorbance peak at 445 nm and FWHM of 51 nm. Upon encapsulation, a small spectral shift is observed for the dye and the resulting wavelength of maximum absorbance was observed to be 451 nm with FWHM equal to 80 nm. The peak broadening and shift shown in FIG. 2 are indicative of composite particle formation. Without wishing to be bound by theory, the changes in the immediate environment of the dye molecules upon encapsulation (e.g. different solvent interaction, different packing of the dye molecules inside a composite particle) could lead to changes in absorbance spectrum. However, the peak shift is small and the broadening is minimal, such that the composite particle composition would retain the ability to selectively block certain narrow ranges of wavelength as an optical filter.

FIG. 3 shows the physical appearance of the dye in water and THF, and of the encapsulated dye in aqueous environment. The dye is hydrophobic and insoluble in water. Within a high water content environment, the unencapsulated dye was not soluble and settled as a pellet in the bottle. The encapsulated dye composite particle composition was evenly dispersed in aqueous medium.

Exciton™ ABS 594 and 456

Figure 4A:
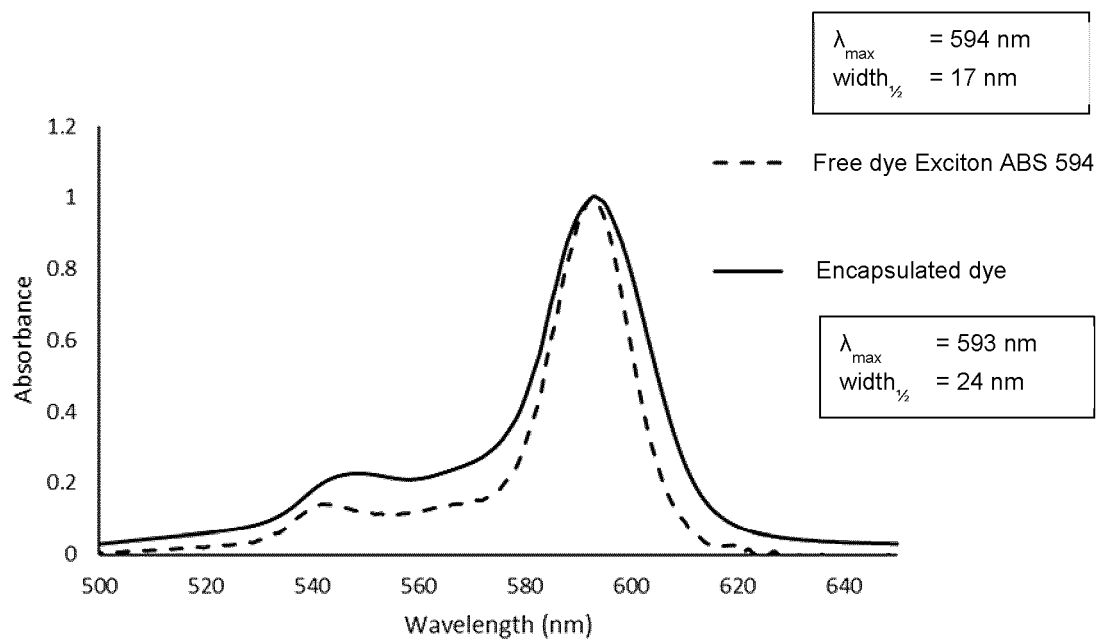

The dyes Exciton ABS 594 and 456 were individually formulated into composite particles according to General Encapsulation Procedure 1 with block copolymer PEG5000-PS1600. A comparison between the UV-Vis spectrum of the dye with and without encapsulation is shown in FIGS. 4 and 5. FIG. 4A shows a comparison for the dye Exciton ABS 594, while FIG. 5A shows a comparison spectrum for the dye Exciton ABS 456. Similar results were observed compared to Epolight 5843.

Figure 4B:
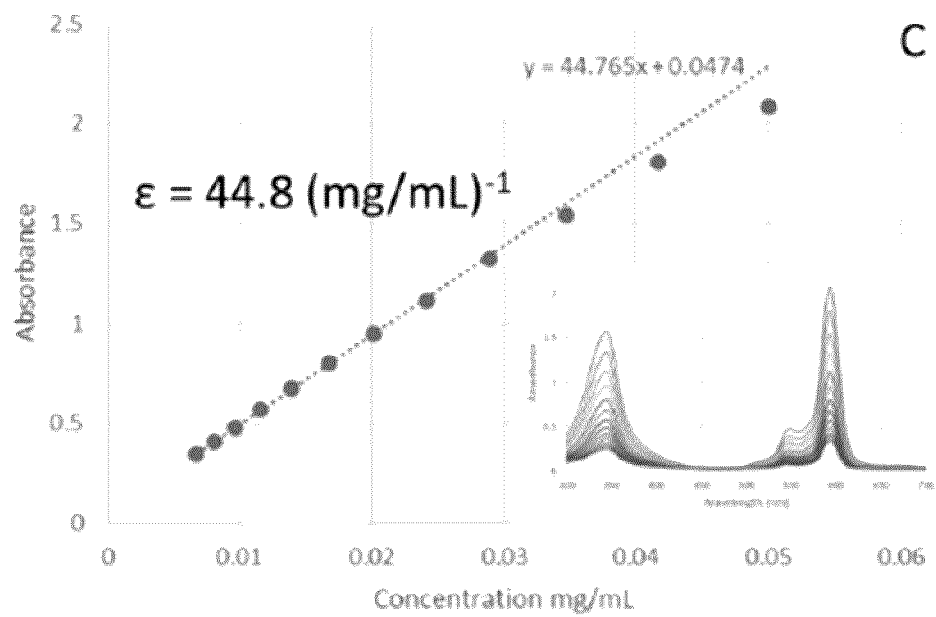
Figure 5A:
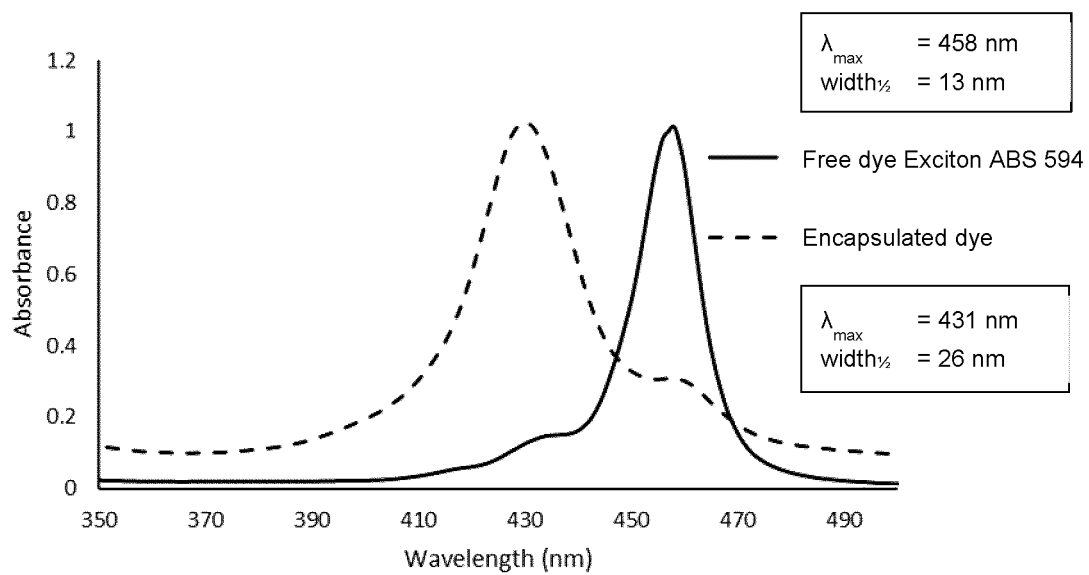
Figure 5B:
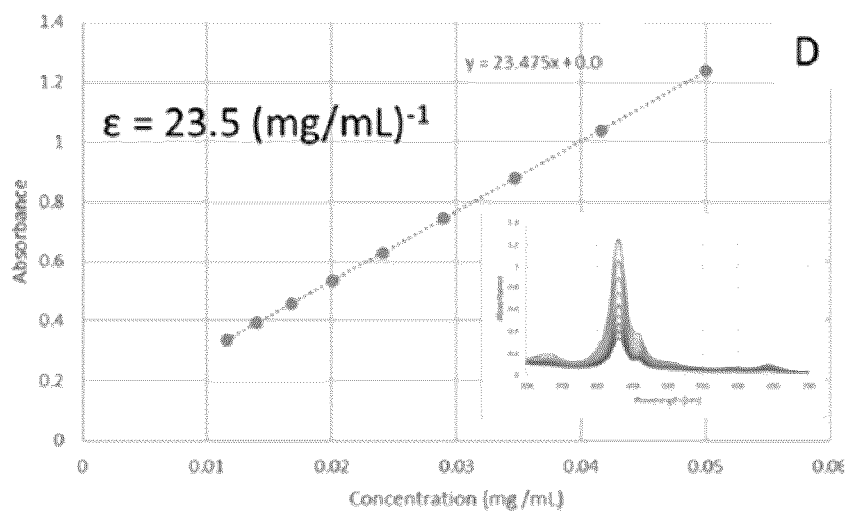

FIGS. 4B and 5B show calibration curves of encapsulated dyes Exciton ABS 594 and 456 respectively in 10% THF and 90% water showing the extinction coefficient for each of the composite particle compositions. A series of dilutions in 10% THF of the composite particles were generated and the absorbance spectra collected. The absorbance at the wavelength of maximum absorbance for each respective dye were used to generate calibration curves for each encapsulated dye solution. The values for dye concentration were calculated assuming 100% encapsulation efficiency. The resulting extension coefficients demonstrate that the dye Exciton ABS 456 has a lower absorptivity than Exciton ABS 594.

Example 4 Particle Size and Polydispersity of Composite Particle

The composite particle compositions of ABS 594 and ABS 456 prepared according to General Encapsulation Procedure 1 with block copolymer PEG5000-PS1600 were further characterized by tunneling electron microscopy (TEM) and dynamic light scattering (DLS). Representative TEM images for ABS 594 and ABS 456 encapsulated particles are presented in FIGS. 6A and 7A respectively. The resulting particle size characterization by DLS is provided in FIGS. 6B and 7B.

The TEM results indicate a poly-disperse particle size of 50 to 170 nm diameter. The ABS 594 particles qualitatively appeared to aggregate more than the ABS 456. The DLS characterization found particles to range in size from approximately 120 to 350 nm.

Example 5 Notch Filtration

A mixture of Exciton ABS 594 and 456 composite particles was prepared according to General Encapsulation Procedure 1 with block copolymer PEG5000-PS1600 and an UV-Vis absorbance spectrum was taken and shown in FIG. 8. The proportion of the two dyes can, for example, be varied and controlled according to calibration curves such as those provided in FIGS. 4 and 5. The absorbance spectrum of the mixed encapsulated dyes demonstrated that the spectral characteristics of each individual encapsulated dye are maintained once mixed. The characteristic peaks at 432 nm and 596 nm are attributed to ABS 456 and ABS 594 respectively. The mixing process did not lead to further significant peak broadening.

Example 6 Comparison Between General Encapsulation Procedures 1 to 3

100 mg Exciton ABS 456 dye was formulated into composite particle with 100 mg block copolymer PS(1500)-PEO(6200) using General Encapsulation Procedures 1 to 3 in order to compare the efficiency of the three procedures. For each method, 0.5 mL of the composite particle composition solution was pipetted using a volumetric pipette and added to 50 mL of ultrapure water. The blank used was ultrapure water. UV-Vis absorbance was measured using a UV-Vis spectrometer (Agilent Cary 60 Spectrophotometer).

Figure 9A:
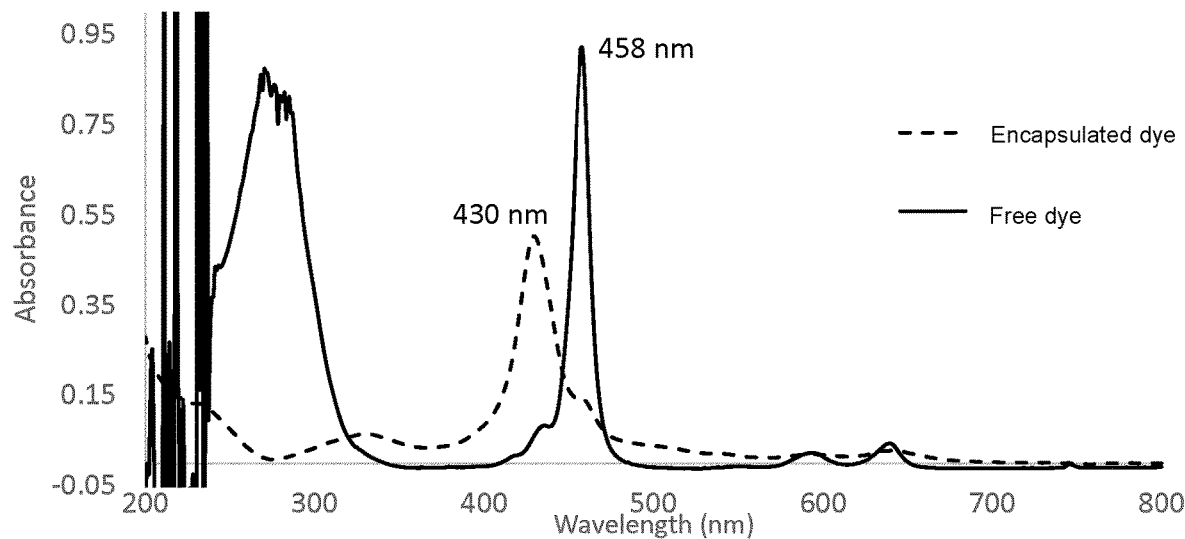
Figure 9B:
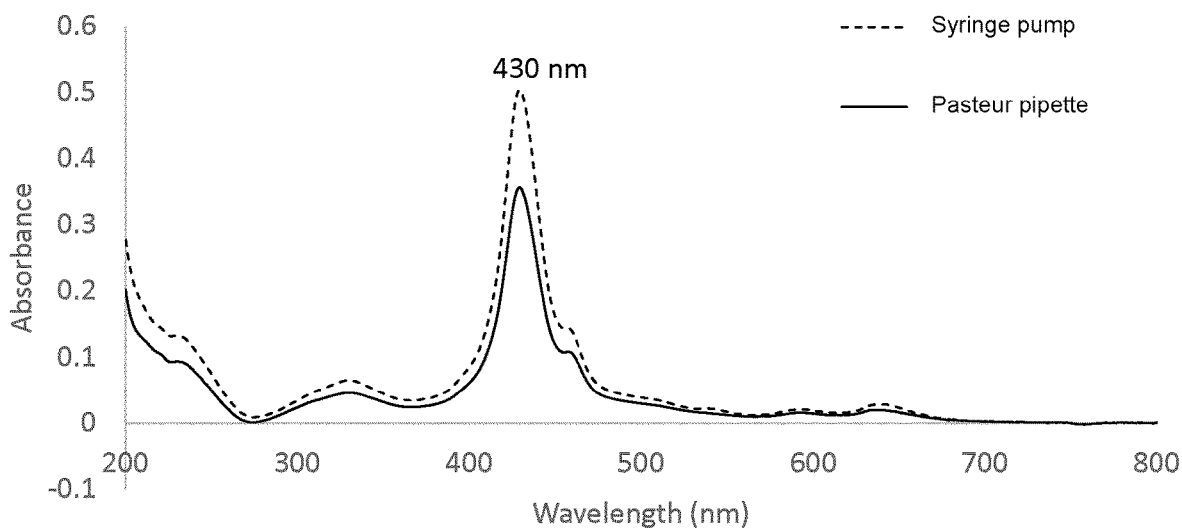
Figure 9C:
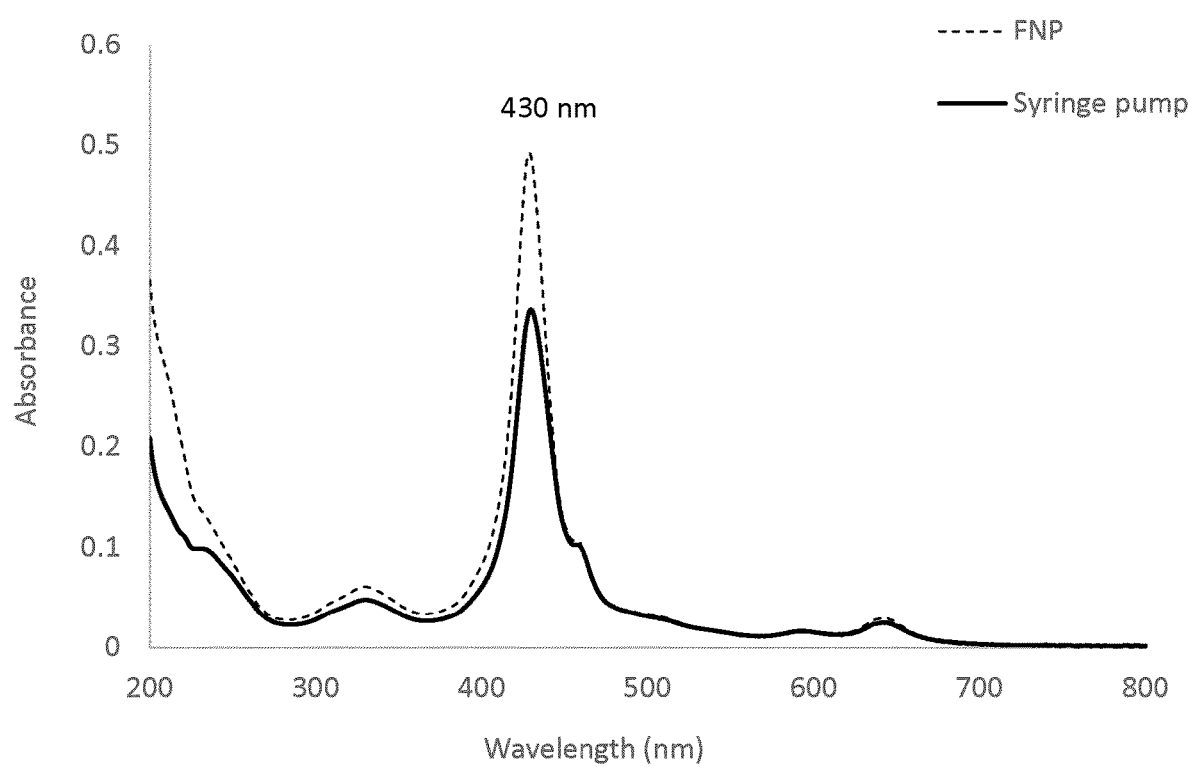

FIG. 9A shows the UV-Vis absorbance of free Exciton ABS 456 dye in THF and the encapsulated dye composite particle in aqueous solution prepared using General Encapsulation Procedure 2 with a syringe pump. FIG. 9B shows an overlay of the UV-Vis absorbance spectra of the centrifuged encapsulated dye composite particle in aqueous solution prepared with a syringe pump (General Encapsulation Procedure 2) or with a Pasteur pipette (General Encapsulation Procedure 1). FIG. 9C shows an overlay of the UV-Vis absorbance spectra of the centrifuged encapsulated dye composite particle in aqueous solution prepared with a syringe pump (General Encapsulation Procedure 2) or by FNP (General Encapsulation Procedure 3).

Since the same concentration of micelles was used to measure the UV-Vis absorbance and the absorbance of the micelles made using the syringe pump is higher than those made using the Pasteur pipette, encapsulation using the syringe pump may be more effective than the Pasteur pipette in certain embodiments. Further, the results indicate that the encapsulation of the dye using FNP may be more effective than using the syringe pump in certain embodiments. Nevertheless, all three methods can be used to prepare the composite particle compositions of the application.

Example 7 Stability of the Composite Particle Composition

Stability over Time

Composite particle composition prepared with the dye Exciton ABS 456 and block copolymer PS(1500)-PEO (6200) using General Encapsulation Procedure 3 was stored in an aqueous solution at room temperature (rt) in the dark for up to 11 weeks. Aliquots were taken after 1 day, 1 week, 3 weeks, 7 weeks and 11 weeks. UV-Vis absorbance spectra were collected to assess stability of the composite particle composition. FIG. 10 shows an overlay of the UV-Vis spectra of the aliquots taken at different time points. The results indicate that the light absorption of the composite particle composition remained substantially unchanged overtime.

Stability to Ultraviolet Bleaching

Exciton ABS 456

Free dye Exciton ABS 456 solution in 90% THF and 10% water was placed in a quartz cuvette. 1 mL of the composite particle composition prepared with the dye Exciton ABS 456 and block copolymer PS(1500)-PEO(6200) using General Encapsulation Procedure 3 as described above was diluted in 50 mL of 10% THF/90% water. The diluted composite particle solution was placed in a separate quartz cuvette. The cuvette containing free dye solution and the one containing composite particle solution were irradiated with UV at 12.8 mW/cm$^2$ for 30 minutes. UV-Vis spectrum was taken before UV exposure, and after 10, 20 and 30 minutes of UV exposure.

Figure 11A:
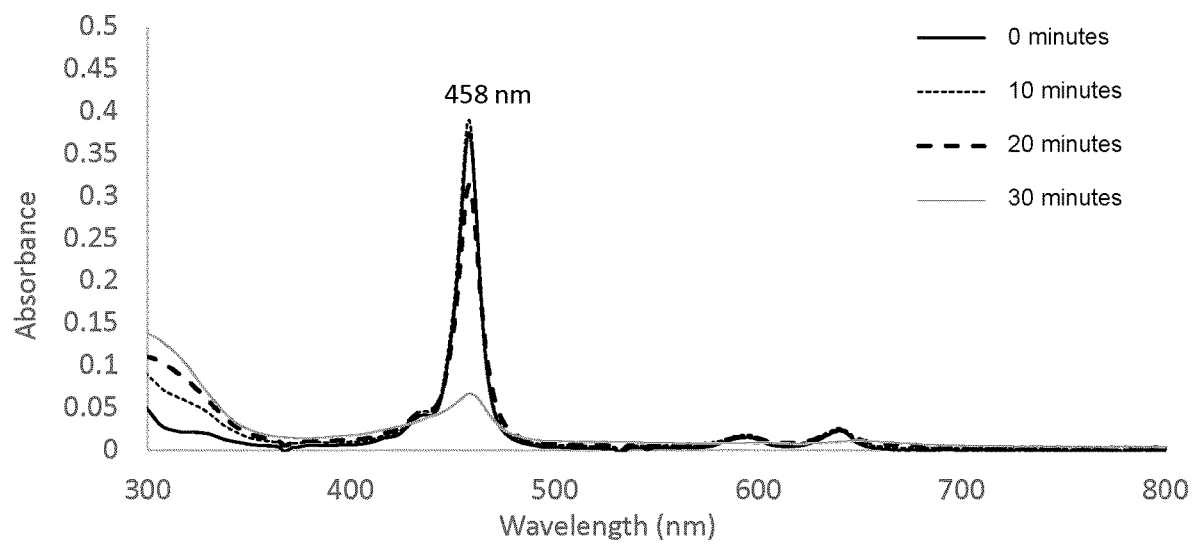

FIG. 11A shows a comparison between the UV-Vis absorbance spectrum of the free dye before and after UV exposure of various lengths of time. There is a decrease in light absorbance at the absorption peak of 458 nm suggesting that the free dye Exciton ABS 456 bleached under UV.

Figure 11B:
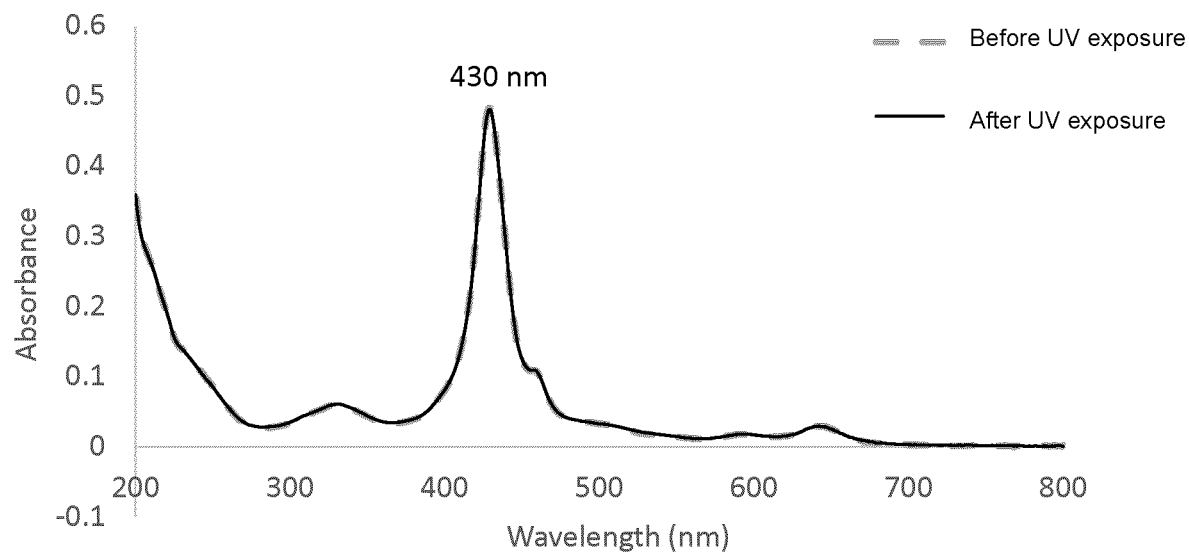
Figure 12A:
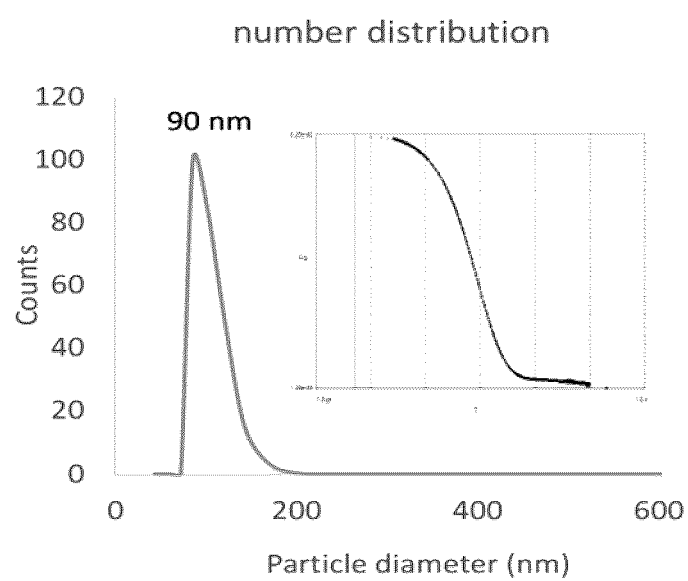
Figure 12B:
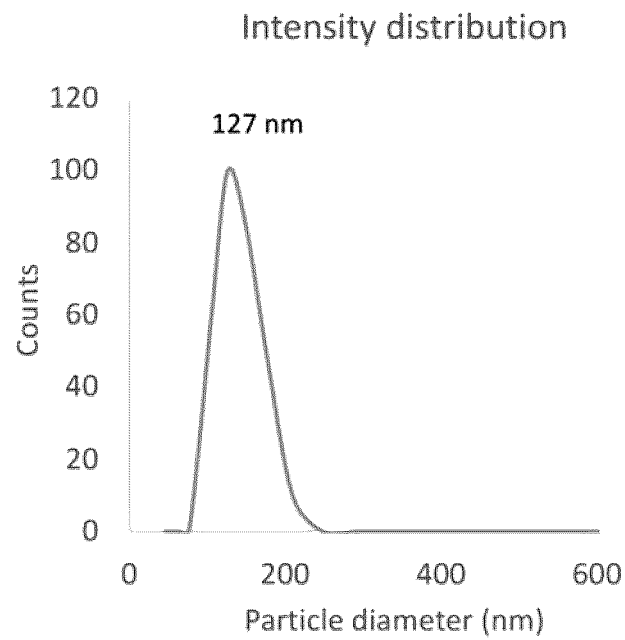
Figure 12C:
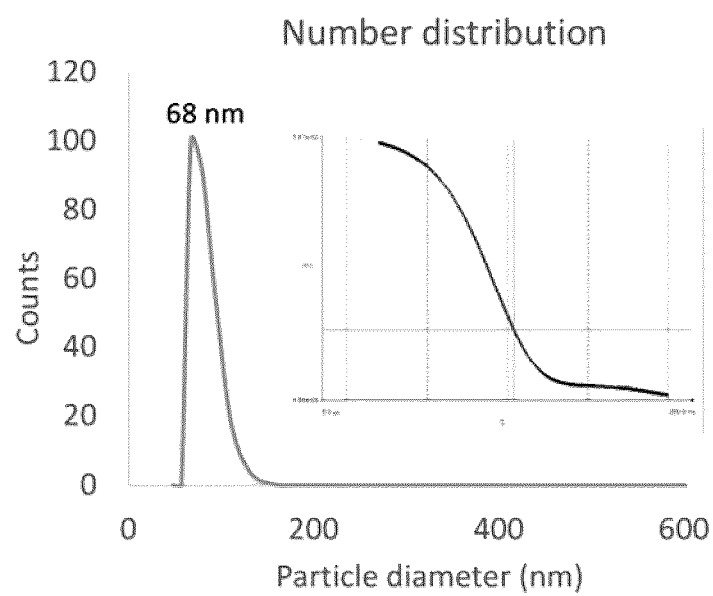
Figure 12D:
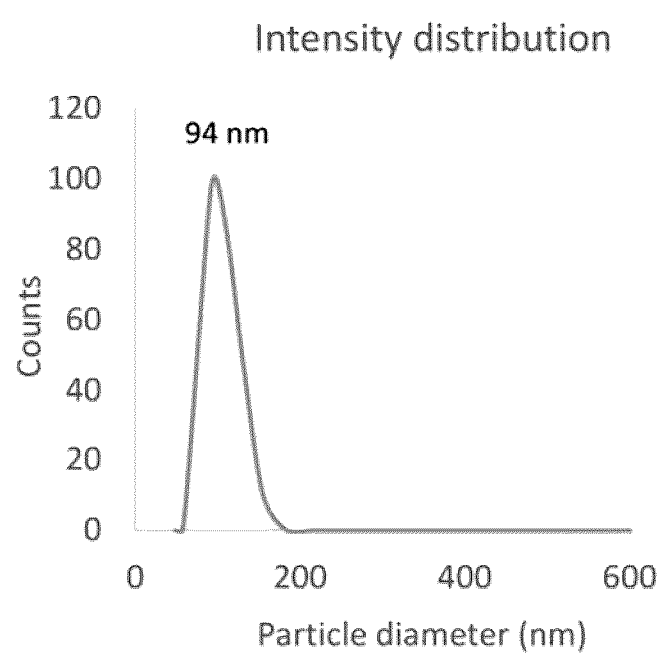
Figure 12E:
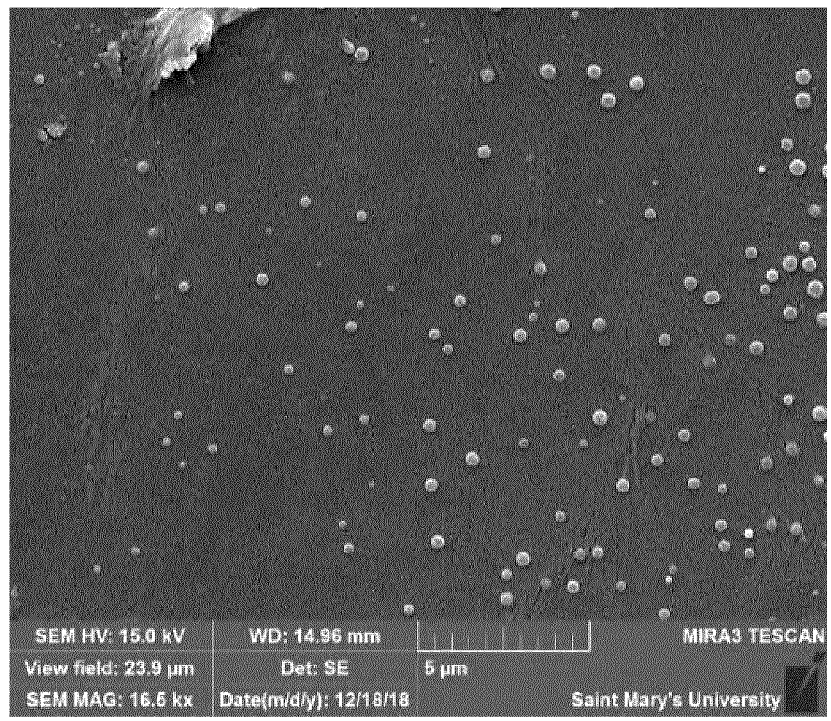
Figure 12F:
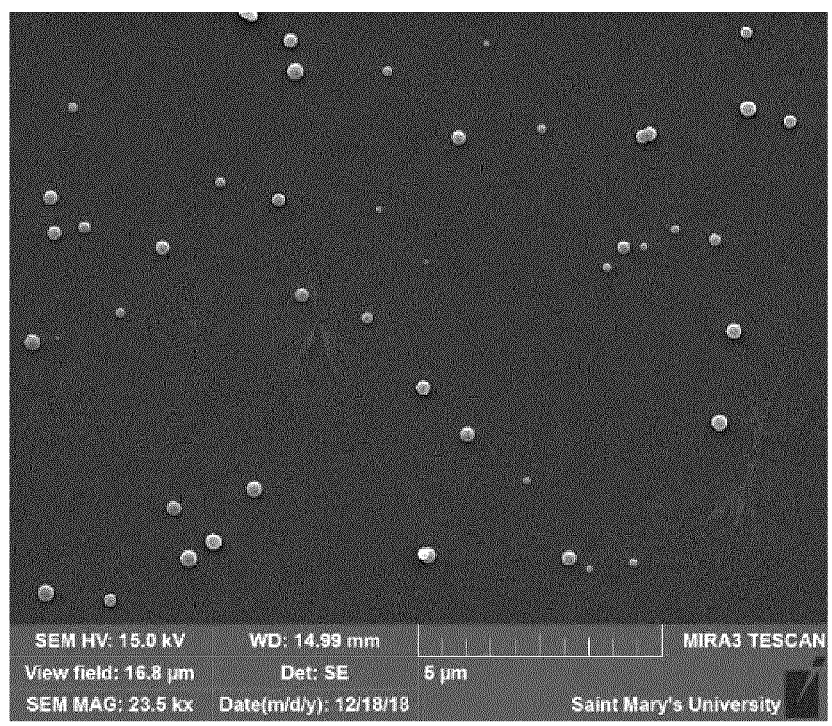

FIG. 11B shows a comparison between the UV-Vis absorbance spectrum of the composite particle before and after UV exposure of various lengths of time. The absorbance spectrum is substantially unchanged suggesting that the composite particle composition is stable under UV.

DLS experiments were conducted on the composite particle composition before and after UV exposure to assess particle size and polydispersity properties. FIG. 12 Panels A and B show the number distribution and the intensity distribution respectively of the composite particle composition before UV exposure. FIG. 12 Panels C and D show the number distribution and the intensity distribution respectively of the composite particle composition after UV exposure. FIG. 12 Panels E and F show scanning electron microscopy images of the composite particle composition before and after UV exposure respectively, confirming the presence of composite particle after UV exposure.

Exciton ABS 594

A similar UV stability test as described above was repeated for the free dye Exciton ABS 594 and the composite particle of Exciton ABS 594 and block copolymer PS(1500)-PEO(6200) prepared according to General Encapsulation Procedure 3. Similar results were observed. The free dye solution in 90% THF/10% water was bleached after 30 min UV exposure at 12.8 mW/cm$^2$, while the composite particle remained substantially unchanged.

The results of the UV stability tests indicated that the structure of the composite particle was more stable to UV exposure than free dye.

Example 8 Thermal Stability 1 mL of the composite particle prepared with the dye Exciton ABS 456 and block copolymer PS(1500)-PEO (6200) using General Encapsulation Procedure 3 as described above was diluted in 50 mL of 10% THF/90% water. The maximum absorbance in the UV-Vis spectrum was determined to be no greater than 1. Ultrapure water is used as blank for spectrometric measurements.

The UV-Vis absorbance of the diluted solution was taken before heating. Approximately, 8 mL of the diluted solution was placed in a round bottom flask. The round bottom flask was placed in a reaction block and equipped with a condenser, with cold water running through. The content of the round bottom flask was heated for 15 minutes after the temperature reached 100° C. After 15 minutes, heating was stopped and the round bottom flask was allowed to cool to room temperature. The UV-Vis absorbance of the heated solution was taken again.

FIG. 13 shows a comparison of UV-Vis absorbance spectra of the composite particle of the dye Exciton ABS 456 before and after heating. The absorbance peak wavelength is not affected despite a slight decrease in maximum UV-Vis absorbance.

Similar thermal stability testing was done using the dye Exciton ABS 594 (free dye and formulated as a composite particle with block copolymer PS(1500)-PEO(6200) using General Encapsulation Procedure 3 as described above) using the above described procedure. The diluted composite particle composition was heated to 90° C. in 10% THF/90% water for 2 hours. FIG. 14 shows that the absorbance spectrum of the composite particle remained substantially unchanged before and after heating.

The thermal stability results show that the composite particles are stable enough to heating in water and THF to high temperatures for various lengths of time to be amenable to manufacturing processes.

Example 9 Stability in Organic Solvent

Composite particles were prepared with the dye Exciton ABS 456 and block copolymer PS(1500)-PEO(6200) using General Encapsulation Procedure 3 as described above. 1 mL of the composite particle solution was diluted in 50 mL of 90% THF/10% water. The maximum absorbance in the UV-Vis spectrum was determined to be no greater than 1.

1 mL of the diluted composite particle solution was added to a quartz cuvette. 2.5 mL of a 50% THF/50% water mixture were added to the cuvette. UV-Vis absorbance spectrum was taken immediately upon addition of THF/Water mixture and after 30 min of incubation at room temperature following the addition.

After 30 min of room temperature incubation, the cuvette was placed in a photochemical chamber reactor and irradiated with UV at 12.8 mW/cm$^2$ for 10 min. The UV-Vis absorbance spectrum was recorded again after UV exposure.

The above procedure was repeated using 10% THF/90% water.

In order to test the stability of the composite particle in 99% THF/1% water, 0.5 mL the composite particle prepared according to General Encapsulation Procedure 3 without dilution was added to 50 mL THF. UV-Vis absorbance spectrum was collected at t=0 min (immediately after addition), at t=30 min (after 30 min incubation at room temperature), and after 10 min UV exposure at 12.8 mW/cm$^2$.

Figure 15A:
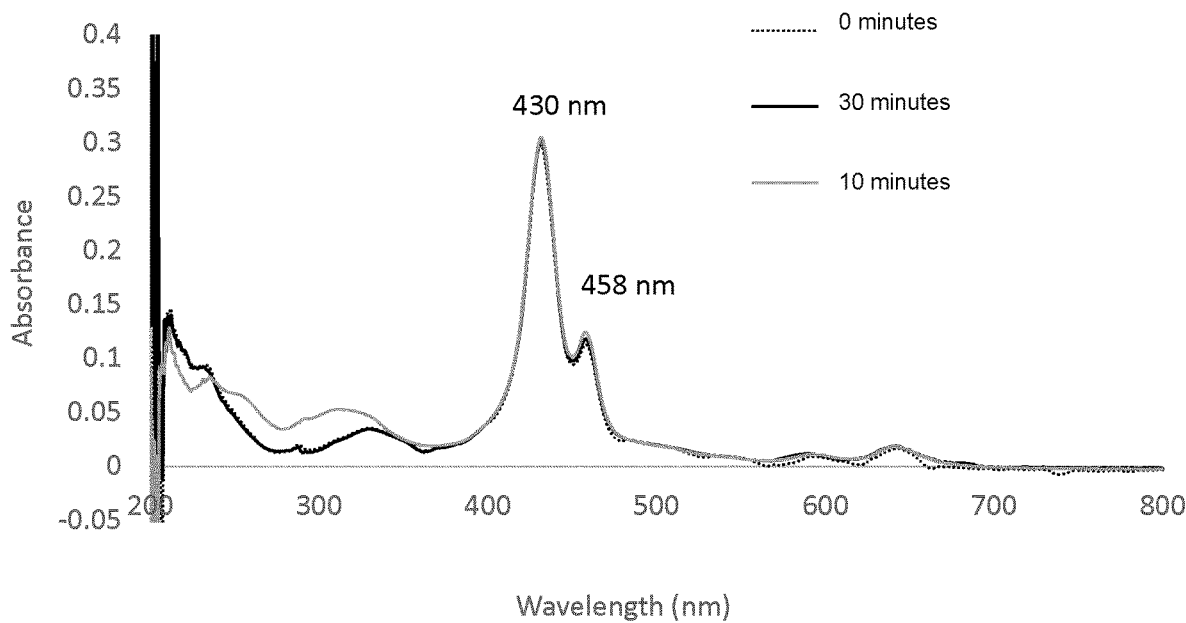

FIG. 15A shows the UV-Vis absorbance spectrum of the composite particle of Exciton ABS 456 in 35% v/v final THF concentration at different time points of the experiment. The absorbance spectrum remained substantially unchanged after 30 min of incubation and after UV bleaching.

Figure 15B:
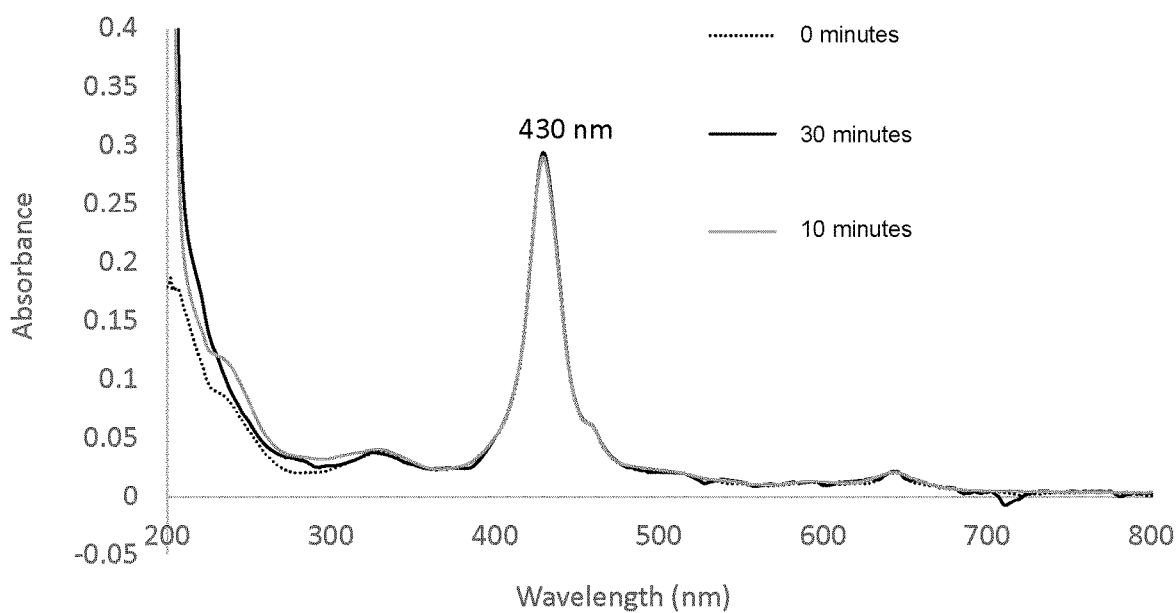

FIG. 15B shows the UV-Vis absorbance spectrum of the composite particle of Exciton ABS 456 in 10% v/v final THF concentration at different time points of the experiment. The absorbance spectrum remained substantially unchanged after 30 min of incubation and after UV bleaching.

Figure 15C:
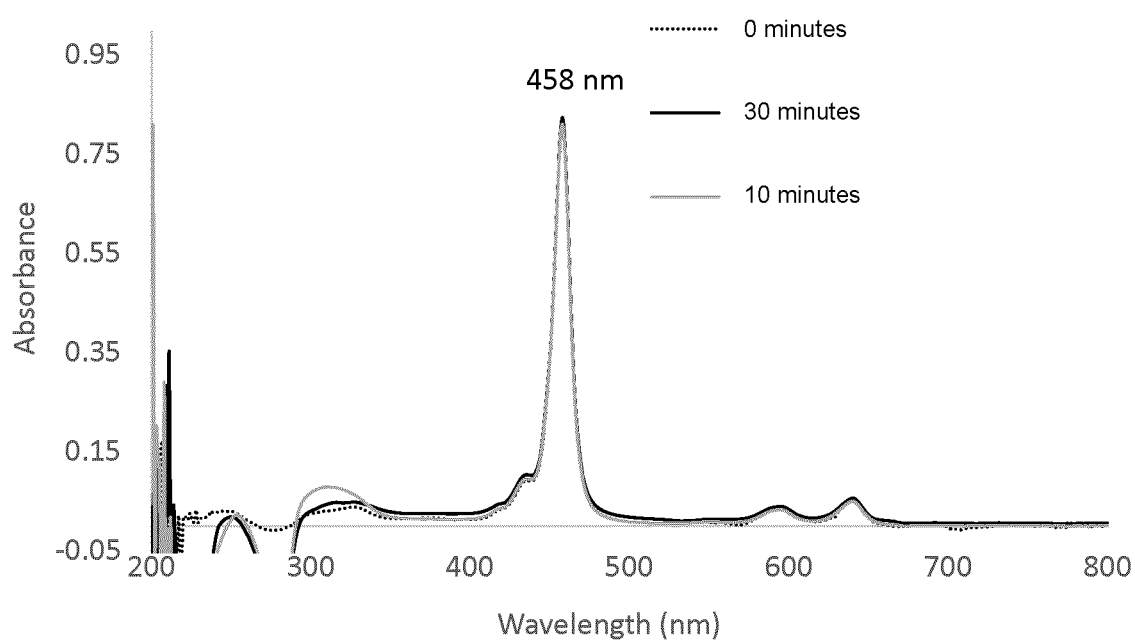

FIG. 15C shows the UV-Vis absorbance spectrum of the composite particle of Exciton ABS 456 in 64% v/v final THF concentration at different time points of the experiment. The absorbance spectrum remained substantially unchanged after 30 min of incubation and after UV bleaching.

Figure 15D:
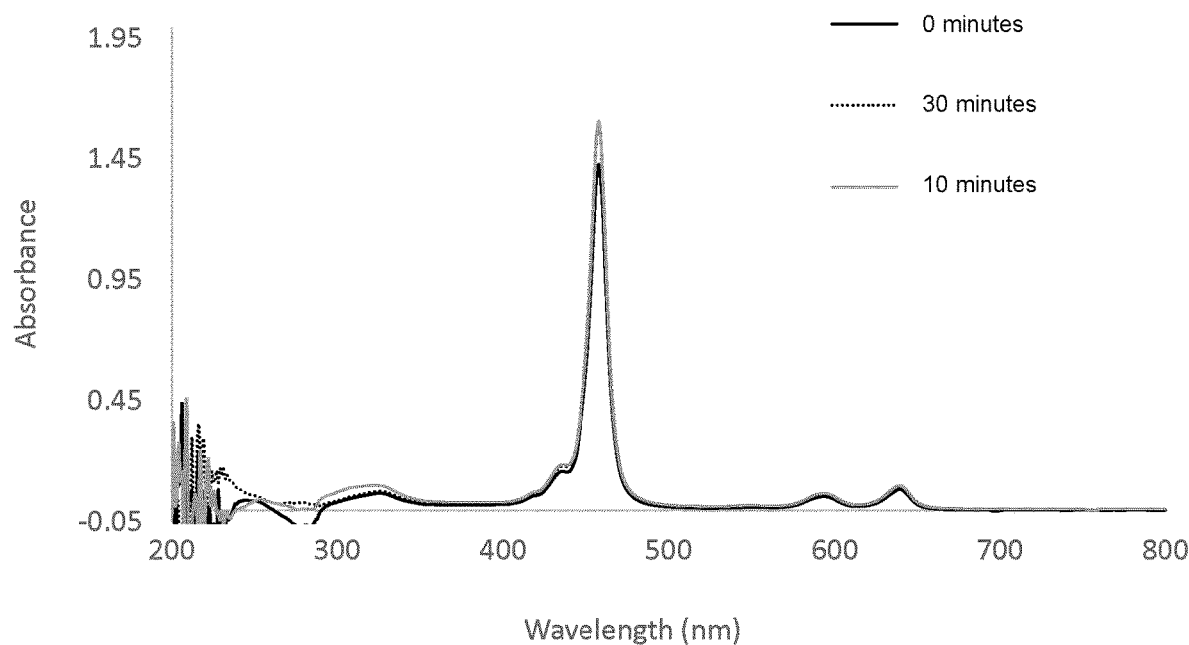

FIG. 15D shows the UV-Vis absorbance spectrum of the composite particle of Exciton ABS 456 in 99% v/v final THF concentration at different time points of the experiment. The absorbance spectrum remained substantially unchanged after 30 min of incubation and after UV bleaching.

The results show that the composite particle is stable at various concentrations of organic solvent THF and is stable to UV bleaching in organic solvent. In contrast, referring to FIG. 11A, the free dye Exciton ABS 456 is not stable to UV bleaching in 90% THF/10% water.

Example 10 Inclusion in Hydrogel

Si-PDMS macromer was prepared and reacted with polyethylene glycol methyl acrylate. A UV activator diethoxyacetophenone was added to the mixture. The polymerization was induced by UV light. Encapsulated ABS 456 or ABS 594 nanoparticles were added into the mixture just prior to UV polymerization.

A polyacrylamide gel was prepared using 1.50 mL water, 2.15 mL 40% acrylamide, 1.25 mL TRIS buffer (pH=8.6), 50 μL tetramethylethylenediamine (TEMED), 50 μL 10% ammonium persulfate and about 200 μL of stock solution containing encapsulated dyes ABS 456 and ABS 594. The gel was cast between two glass plates at a 1 mm gel thickness.

FIG. 16 shows an optical image and FIG. 17 shows an absorbance spectrum of the polyacrylamide gel doped with ABS 594 and ABS 456 encapsulated dye micelles. The spectral properties of the encapsulated dye were maintained after doping into the polyacrylamide gel.

Example 11 Methods of Preparing Composite Particles

Using Zn (II) 5,10,15,20-(tetraphenyl)porphyrin and block co-polymer poly(1,2-butadiene)$_{31500}$-b-poly(methyl methacrylate)$_{21000}$, different methods of forming composite particles were tested. The methods include flash nanoprecipitation (FNP), direct injection, ultrasonicating, and vortexing. The confined impinging jet (CIJ) mixer used was made by 3D printing and made from high temperature resin. Each method had 5 replicates to test for reproducibility. The samples were analyzed using DLS and spectrophotometer to measure the reproducibility in particle diameter, polydispersity, rate of photobleaching, and absorbance.

Description of Methodology

All samples came from the same stock of block co-polymer and dye at 2,500 mg/mL. 1 ml of the stock was mixed with 9 ml of deionized water using the various ways of nanoparticles formation. For the Vortex method, 1 ml of stock was added slowly on the inside wall of the centrifuge tube that contained 9 ml of deionized water and then vortexed for 60 seconds. The FNP method had 8 ml of water stirring, then 1 ml of water and 1 ml of the stock solution injected to form nanoparticles. The direct injection method had 9 ml of water stirring in a vial and then 1 ml of stock solution was injected via a needle. The ultrasonicator had 9 ml of water and then 1 ml of stock solution was added while the ultrasonicator was on. All samples were centrifuged after formation. All samples were analyzed by spectrophotometer (Agilent 8453) and DLS (Brook-Haven BI-200SM) to measure reproducibility in particle diameter, polydispersity, rate of photobleaching, and absorbance. Samples measured on the spectrophotometer were diluted using deionized water to 2.5 mg/mL of dye and polymer.

Results

Reproducibility of Formation Methods Assessed Using UV/Vis Spectroscopy.

FIG. 18 shows the UV-Vis absorbance spectrum of composite particles made with each method. The average peak absorbance of composite particles made with each method is shown in Table 1. Each method was successful at encapsulating the dye, while direct injection method and the FNP method showed the highest absorbance.

TABLE 1

Absorbance Reading of Different Particle Formation Methods

|  | FNP | Direct Injection | Vortex | Ultrasonication |
|---|---|---|---|---|
| Average Peak Absorbance | 0.344 | 0.654 | 0.095 | 0.089 |
| Standard Deviation | 0.085 | 0.205 | 0.023 | 0.011 |
| Error | 25% | 31% | 24% | 12% |

Reproducibility of Formation Methods Assessed Using Particle Size Analysis.

The average particle diameter of each method is shown in Table 2. All samples show a similar particles size diameter with a standard deviation ranging from 11.6 to 7.6 nm. FNP method and ultrasonication show an error of 14% and 13%. The direct injection and vortex show an error of 20% and 22%.

TABLE 2

DLS study of particles formed using different methods

|  | FNP | Direct Injection | Vortex | Ultrasonication |
|---|---|---|---|---|
| Average Particle Diameter | 55.4 | 57.4 | 50.5 | 57.3 |
| Standard Deviation | 7.8 | 11.6 | 11.0 | 7.6 |
| Polydispersity | 0.177 | 0.167 | 0.201 | 0.186 |
| Error | 14% | 20% | 22% | 13% |

This study shows that all four methods were able to form nanoparticles.

Example 12 Encapsulation Efficiency

Efficiency of encapsulating dyes into composite particles was tested by flocculation. Free dye was separated from encapsulated dye using a flocculating agent (e.g. Calcium Chloride (CaCl$_2$)). The flocculating agent can selectively flocculate nanoparticles containing dye, while not flocculating any free dye.

CaCl$_2$ Concentration and Effect on Absorbance

Three test sample were prepared using Zn (II) TPP and poly(1,2-butadiene)$_{31500}$-b-poly(methyl methacrylate)$_{21000}$:
 1. 2500 mg/mL free dye in tetrahydrofuran (THF);
 2. 2500 mg/mL copolymer in tetrahydrofuran (THF); and
 3. 2500 mg/mL copolymer and 2500 mg/mL free dye in tetrahydrofuran (THF).

Each stock solution was then used to make samples using the direct injection method, where 1 mL of sample in THF is injected into a 9 mL water solution stirring in a beaker.

The needle tip is submerged and orientated in the direction of the stirring. The sample is left stirring for 5 minutes.

This experiment will need to test four things, the absorbance of dye when $CaCl_2$) is present vs when $CaCl_2$) is not present, determination of $CaCl_2$) concentration where the difference in dye content is negligible, confirmation that this concentration of $CaCl_2$) precipitates out all of the polymer micelles, and replicate runs of this $CaCl_2$) concentration on the polymer with encapsulated dye to see encapsulation efficiency.

To the sample of dye, four tests were performed:
1. Dye stirred for 1 hour and then centrifuged
2. Dye+25 mg/mL $CaCl_2$) stirred for 1 hour and then centrifuged
3. Dye+50 mg/mL $CaCl_2$) stirred for 1 hour and then centrifuged
4. Dye+100 mg/mL $CaCl_2$) stirred for 1 hour and then centrifuged Each sample was then measured on the UV-Vis Spectrophotometer to determine dye content. In parallel to these tests, samples of polymer were tested to see if all the polymer precipitated out.
1. Polymer stirred for 1 hour and then centrifuged
2. Polymer+25 mg/mL $CaCl_2$) stirred for 1 hour and then centrifuged
3. Polymer+50 mg/mL $CaCl_2$) stirred for 1 hour and then centrifuged
4. Polymer+100 mg/mL $CaCl_2$) stirred for 1 hour and then centrifuged These samples were assessed by DLS to determine if particles were still present.

The absorbance of dye when $CaCl_2$) is present vs when $CaCl_2$) is not present was determined by measuring the absorbance of solution with varying amounts of $CaCl_2$). This method would also determine the amount of $CaCl_2$) that has no effect on flocculation of the dye. It was found that at 100 mg/mL or lower of $CaCl_2$) there is negligible difference in the amount of dye present compared to a sample with no $CaCl_2$.

DLS measurements taken of polymer with $CaCl_2$) added show that no nanoparticles were detected when 100 mg/mL and 50 mg/mL $CaCl_2$) were added. When 25 mg/mL $CaCl_2$) was added some small particles were observed, but very difficult to measure. Lastly, when no $CaCl_2$) was added nanoparticles were observed and had a mean particle size of 55 nm, with a PDI of 0.117. Since 50 mg/mL didn't affect dye concentration and removes all the polymer, 50 mg/mL can be used to identify encapsulation efficiency.

Composite particles of Zn (II) TPP and block co-polymer poly(1,2-butadiene)$_{31500}$-b-poly(methyl methacrylate)$_{21000}$ was compared to particles formed with the amphiphilic block copolymer alone and the dye alone to assess encapsulation efficiency. Test items were tested in triplicates.

Three test sample were prepared using Zn (II) TPP and poly(1,2-butadiene)$_{31500}$-b-poly(methyl methacrylate)$_{21000}$:
1. 250 mg/mL free dye in tetrahydrofuran (THF)/Water at 1:9 ratio;
2. 250 mg/mL copolymer in tetrahydrofuran (THF)/Water at 1:9 ratio; and
3. 250 mg/mL copolymer and 250 mg/mL free dye in tetrahydrofuran (THF)/Water at 1:9 ratio.

Each sample was prepared using the direct injection method, where 1 mL of sample in THF is injected into a 9 mL water solution stirring in a beaker. The needle tip is submerged and orientated in the direction of the stirring. The sample is left stirring for 5 minutes.

3 mL of each sample was then added to separate vials. A solution of $CaCl_2$) was made such that the final concentration added to each sample was 100 mg/mL. Each sample was stirred for 1 hour, and this time, all of the polymer solution precipitated out, none of the dye solution precipitated out, and the dye encapsulated micelle solution had coloured sample precipitate out and some dye remained in solution, just as it had in attempt three. Each sample was then centrifuged at 4000 RPM using an 80-02 electronic centrifuge for 1 hour, and then decanted off. This removed the solid particles, but kept the free dye in solution. These samples were measured on the UV-Vis Spectrophotometer to measure absorbance and dynamic light scattering (DLS) using a Brookhaven BI-200SM Dynamic Light Scattering Apparatus.

The solution containing only polymer showed no absorbance for the dye (as expected, no dye was added to solution at any time). (FIG. 19) The solution containing dye showed a very large peak for the Zinc (II) 5,10,15,20-(tetra phenyl) porphyrin dye, heavily diluted, and broad. The broadness could be accounted for due to the solution conditions (water), and the dilution factor, because none of the dye should have been removed. Lastly, the solution containing dye and polymer showed some absorbance (approximately 1/10 the absorbance of the dye solution). This would indicate that a significant portion of the dye was removed, compared to free dye. The dye removed must have been the encapsulated dye, leaving the remaining free dye.

Conclusion

The amount of free dye in solution was determined after flocculating all of the encapsulating dye out of solution. The flocculating agent used was calcium chloride ($CaCl_2$)), which is capable of ionic binding to the nanoparticle solutions and pulling them out of solution. The flocculating agent can selectively flocculate nanoparticles containing dye, while not flocculating any free dye. Higher concentrations of calcium chloride at 33300 mg/mL and 1660 mg/mL flocculated solutions of dye encapsulated in nanoparticles, but also flocculated free dye. Lower concentrations of 100 mg/mL and 50 mg/mL were found to flocculate dye encapsulated in nanoparticles but not free dye. It was also found by DLS that no nanoparticles exist in solution after addition of calcium chloride. After adding 50 mg/mL of calcium chloride to solutions of dye encapsulated in nanoparticles, and 50 mg/mL of calcium chloride to free dye, absorbance measurements were taken to determine the amount of dye that is unencapsulated among the nanoparticles. The ratio of the absorbance measurements shows the percent encapsulated, where the average corrected absorbance of free dye solutions is 55.8, and the average corrected absorbance of encapsulated dye solutions is 1.33. Comparing these values gives an encapsulation efficiency of 97.6%.

Using calcium chloride as a flocculating agent, selective flocculation can occur on samples of dye encapsulated in micelles. Testing a micelle formed using Zinc (II) 5,10,15, 20-(tetra phenyl) porphyrin (dye) in Poly(1,2-butadiene)$_{31500}$-b-poly (methyl methacrylate)$_{21000}$ (di-block-co-polymer) shows an encapsulation efficiency of 97.6%%+/−1.57%.

Example 13 Encapsulation of Different Dyes

Eleven structurally different hydrophobic dyes were selected to test for the ability to be encapsulated by amphiphilic block copolymer:

1. 1,3,5,7-tetramethyl-8-(4-hydroxyphenyl)BODIPY (purchased from PorphyChem) (narrow band, visible absorber)
2. 1,7-(di-4,N,N-dimethylaminophenyl)-3,5-(di-4-bromophenyl)AZABODIPY (purchased from PorphyChem) (broad band, visible absorber)
3. 2,3,7,8,12,13,17,18-(octabromo)-5,10,15,20-(tetraphenyl)porphyrin (purchased from PorphyChem) (narrow band, visible absorber)
4. Zinc (II) 2,9,16,23-(tetra-nitro)phthalocyanine (purchased from PorphyChem). (broad band UV absorber)
5. 2,3,6,7-tetrahydro-9-(trifluoromethyl)-1H,5H,11H-[1]benzopyrano(6,7,8-ij)quinolizin-11-one (99% dye content), also known as Coumarin 153 (purchased from Sigma Aldrich) (broad band, visible absorber)
6. 2,5,7,8-tetramethyl-2-(4,8,12-trimethyltridecyl)-3,4-dihydro-2H-1-benzopyran-6-yl acetate (>95.5%, liquid), also known as Vitamin E or α-tocopherol (purchased from Sigma Aldrich) (broad band, UV absorber)
7. 1,3,3-trimethyl-2-[(1E,3E,5E,7E,9E,11E,13E,15E,17E)-3,7,12,16-tetramethyl-18-(2,6,6-trimethylcyclohexen-1-yl)octadeca-1,3,5,7,9,11,13,15,17-nonaenyl]cyclohexene (>93%, Powder), also known as β-carotene (broad band, visible absorber)
8. Perylene (>99%) (purchased from Sigma Aldrich)
9. Vanadyl 2,3-naphthalocyanine (purchased from Sigma Aldrich) (narrow band, visible and near infrared absorber)
10. P-Quaterphenyl (>98%) (purchased from TCI AMERICA) (broad band, UV absorber)
11. 2-[3-(2H-Benzotriazol-2yl)-4-hydroxy-phenyl]ethyl methacrylate (99%), also known as NORBLOC™ (purchased from Sigma Aldrich)

Poly t-butyl methacrylate (8300)-b-Polyethylene oxide (5900) (purchased from Polymer Source Inc.) was used for encapsulation.

1:9 Tetrahydrofuran in Deionized water (10% v/v THF in DI water) was used as solvent.

All chemicals and solvents are kept at room temperature, and Vitamin E is kept in a dark environment to avoid UV degradation.

The following 11 composite particles were made:
1. 1,3,5,7-tetramethyl-8-(4-hydroxyphenyl)BODIPY in Poly t-butyl methacrylate (8300)-b-Polyethylene oxide (5900)
2. 1,7-(Di-4,N,N-dimethylaminophenyl)-3,5-(di-4-bromophenyl)AZABODIPY in Poly t-butyl methacrylate (8300)-b-Polyethylene oxide(5900)
3. 2,3,7,8,12,13,17,18-(octabromo)-5,10,15,20-(tetraphenyl)porphyrin in Poly t-butyl methacrylate (8300)-b-Polyethylene oxide(5900)
4. Zinc(II) 2,9,16,23-(tetra-nitro)phthalocyanine in Poly t-butyl methacrylate (8300)-b-Polyethylene oxide (5900)
5. Coumarin 153 in Poly t-butyl methacrylate (8300)-b-Polyethylene oxide(5900)
6. Vitamin E in Poly t-butyl methacrylate (8300)-b-Polyethylene oxide(5900)
7. β-Carotene in Poly t-butyl methacrylate (8300)-b-Polyethylene oxide(5900)
8. Perylene in Poly t-butyl methacrylate (8300)-b-Polyethylene oxide(5900)
9. P-Quaterphenyl in Poly t-butyl methacrylate (8300)-b-Polyethylene oxide(5900)
10. Vanadyl 2,3-naphthalocyanine in Poly t-butyl methacrylate (8300)-b-Polyethylene oxide(5900)
11. 2-[3-(2H-Benzotriazol-2yl)-4-hydroxy-phenyl]ethyl methacrylate in Poly t-butyl methacrylate (8300)-b-Polyethylene oxide(5900)

Encapsulation

The encapsulations were performed following the standard flash nanoprecipitation procedures in a 9:1 deionized water-THF solvent system. 2 ml 2500 mg/mL Poly t-butyl methacrylate (8300)-b-Polyethylene oxide(5900) and dyes solution was loaded into a 3 mL syringe, 2 ml deionized water was prepared in another syringe, then the encapsulation procedure was performed using the.

Characterization

The primary verification method used to verify the encapsulations were successful is Transmission Electron Microscopy (TEM). To obtain clear images, the 250 mg/mL Post-FNP solution was diluted 100-fold to 2.5 mg/mL using the same solvent system and was then filtered using 450 nm filters. The filtered samples were dried for 24 hours, and measured using a FEI Tecnai™ 120 kV Transmission Electron Microscope. Images were captured at the most representative regions where the particles have clear edges, dense core, and consistent shape.

Dynamic Light Scattering (DLS), was used as a secondary method to detect the presence of nanoparticles. To obtain precise measurements, the 250 mg/mL Post-FNP solution was diluted 100-fold to 2.5 mg/mL using filtered deionized water and then filtered using 450 nm filters to remove suspended dust. The filtered samples were measured using a Brook-Haven BI 200-SM Dynamic Light Scattering. Each of the samples was measured 3 times, and then the particle size was interpreted as NNLS, CONTIN or effective diameter.

The post-FNP spectrums were measured using an Agilent 8653 Spectrophotometer which is capable of measuring infrared regions. To obtain the most accurate spectral data, samples were diluted to an absorbance range of 0.5 to 1 using the same solvent system.

Results

Eleven dyes were successfully encapsulated using the same poly t-butyl methacrylate (8300)-b-polyethylene oxide (5900) di-block copolymer and 9:1 deionized water-THF the solvent system. These dyes include:
1. 1,3,5,7-Tetramethyl-8-(4-hydroxyphenyl)BODIPY
2. 1,7-(Di-4,N,N-dimethylaminophenyl)-3,5-(di-4-bromophenyl)AZABODIPY
3. 2,3,7,8,12,13,17,18-(octabromo)-5,10,15,20-(tetraphenyl)porphyrin
4. zinc(II) 2,9,16,23-(tetra-nitro)phthalocyanine
5. coumarin 153
6. vitamin E
7. β-carotene
8. perylene
9. P-quaterphenyl
10. vanadyl 2,3-naphthalocyanine
11. 2-[3-(2H-Benzotriazol-2yl)-4-hydroxy-phenyl]ethyl methacrylate FIGS. 20 to 21 (A to K) show TEM images, and UV-Vis absorbance data of particles encapsulating different dyes, showing that different dyes can be encapsulated into amphiphilic block copolymers while retaining UV-Vis absorbance properties. The particle size and polydispersity results measured by DLS along with UV-Vis absorbance are summarized in Table 3.

TABLE 3

Particle Size and Absorbance of Particles Encapsulating Different Dyes

| Dye | Particle diameter (nm) (SD in parentheses) | Polydispersity Index (SD in parentheses) | Absorbance peak (nm) (FWHM in parentheses) |
|---|---|---|---|
| 1,3,5,7-Tetramethyl-8-(4-hydroxyphenyl)BODIPY | 67 (12.15) | 0.146 (0.038) | 503 (38) |
| 1,7-(Di-4,N,N-dimethylaminophenyl)-3,5-(di-4-bromophenyl)AZABODIPY | 75.4 (12.15) | 0.109 (0.0078) | 635 (298) |
| 2,3,7,8,12,13,17,18-(octabromo)-5,10,15,20-(tetraphenyl)porphyrin | 80 (8.01) | 0.127 (0.0164) | 498 (105) Broad abs in UV-A, UV-B and hazardous blue light region |
| Zinc(II) 2,9,16,23-(tetranitro)phthalocyanine | 92.86 (24.22) | 0.109 (0.0249) | 641 (143) Broad abs in UV-A, UV-B and hazardous blue light region |
| Coumarin 153 | 116 (0.432) | 0.0887 (0.00997) | 407 (100) |
| Vitamin E | 116.03 (14.27) | 0.154 (0.0171) | Broad abs in UV range, hazardous blue light and hazardous red light regions |
| β-carotene | 65.43 (15.13) | 0.251 (0.0167) | Broad peak in visible red region 469 (148) |
| Perylene | 76.7 (20.66) | 0.188 (0.0263) | 398 (189) Broad abs in UV-B region |
| P-quaterphenyl | 138.23 (0.618) | 0.0927 (0.00694) | Broad UV abs between 250 to 350 nm |
| Vanadyl 2,3-naphthalocyanine | 87.53 (13.83) | 0.133 (0.0254) | 860 (450) Broad abs in UV-A, UV-B and visible regions |
| 2-[3-(2H-Benzotriazol-2yl)-4-hydroxy-phenyl]ethyl methacrylate | 77.13 (19.36) | 0.121 (0.0275) | Broad abs in UV range, hazardous blue light |

Example 14 Crosslinking in the Amphiphilic Block Copolymer Glutaraldehyde Cross-Linking 20 mL of stock composite particles were created using standard method (described in previous Example 11) of dissolving the diblock copolymer and hydrophobic dye into 2 mL THF at a concentration of 2500 mg/mL for both and subsequently injected into the high-temperature resin confined impinging jet (CIJ) mixer with another 2 mL of deionized (DI) water injected, with these solutions dropping into 16 mL of DI water. PVA(2,500)-PMMA(25,000) loaded with Zinc (II) tetraphenyl porphyrin were diluted 1000× compared to stock was used for the crosslinking experiment, as it was observed that a higher concentration of particles resulted in intermicellar crosslinking, and visible agglomeration and precipitation of the suspended micelles. Concentrations of the reagents can be adjusted to avoid agglomeration due to intermicellar crosslinking.

Glutaraldehyde (GA) was added in varying concentrations to each of these solutions corresponding to 8.9%, 13.4%, and 26.8% molar ratio compared to the PVA end of the diblock copolymer. Once the GA was added to each sample, the samples were allowed to react at room temperature for 24 hours before DLS measurement. A fourth particle sample was prepared at the same dilution, but with no GA added to serve as a control for the particle size.

The results of the particle size analysis using DLS is shown in Table 4.

TABLE 4

DLS of GA cross-linked particles

| Sample | CONTIN Diameter (nm) | CONTIN Standard Deviation (nm) | Effective Diameter (nm) | Effective Diameter St. Dev. (nm) | Polydispersity Index |
|---|---|---|---|---|---|
| Control | 56.2 | 1.1 | 102.2 | 0.3 | 0.16 |
| 8.9% GA | 913.0 | 491.8 | 6200.1 | 562.6 | 0.46 |
| 13.4% GA | 53.1 | 10.3 | 120.6 | 5.0 | 0.19 |
| 26.8% GA | 475.2 | 649.7 | 10133.1 | 1103.6 | 0.53 |

Polybutadiene Cross-Linking

Stock THF solutions were created at 50 mg/mL of polymer. Samples were then treated with crosslinking agents at a concentration of 1% by weight compared to the polybutadiene and optionally 1% by weight TRIS. Test items were created using the high temperature resin confined impinging jet (CIJ) mixer. Upon creation, particles were inserted into Falcon tubes and centrifuged at 4000 rpm for 30 minutes using a Canfort 80-2 Electronic Centrifuge. Samples were then heated at 80° C. for 24 hours.

Samples with polybutadiene crosslinking have shown increased solvent resistance, suggesting that internal core crosslinking has occurred. CS18 (no crosslinking) does not survive ethanol exposure, CS38 (polybutadiene crosslinking) does survive ethanol exposure.

Tetraethyl Orthosilicate (TEOS) Crosslinking 20 mL of particle solution was created containing 100 mg of polymer, 100 mg of Zinc (II) Tetraphenyl Porphyrin (Zn (II) TPP), and 1 mL (0.933 g) TEOS. These were formed using the direct injection method, where the material is dissolved in 2 mL THF and injected into 17 mL water (TEOS is added at 1 mL so total volume is 20 mL). The following systems were tested:
- (1,2)PbD(15,000)-b-PAA(6,500) loaded with Zn (II) TPP and crosslinked using TEOS.
- (1,2)PbD(31,500)-b-PMMA(21,000) loaded with Zn (II) TPP and crosslinked using TEOS.
- PS(1,300)-b-PEO(5,600) loaded with ZnTPP and crosslinked using TEOS.

A control sample was created in the same way as the experimental samples above, except without polymer or dye. This was also created using a direct injection method, where 1 mL (1.21 g) TEOS is added to 2 mL THF, and injected into 17 mL water.

Each sample was created using its own individual stock solution containing polymer, ZnTPP, and TEOS—stock solutions were allowed to mix for 48 hours to ensure dissolution of materials, and subsequently created via direct injection into DI water. These were created at a high concentration due to the amount of material required to perform successful solid state nuclear magnetic resonance (ssNMR) measurements. Once created, a small aliquot was removed and diluted 100 fold for SEM testing, and these samples were subsequently lyophilized to remove all water and THF in order to measure using ssNMR.

Magic Angle Spinning (MAS)$^1$H NMR was performed to determine the delay time for the slowest protons in the sample at 0.2 ppm, which corresponds to hydrogen nuclei proximal to silicon nuclei. Subsequently, a $^{29}$Si Cross-Polarization experiment was performed to measure the environment of these silicon nuclei. Cross-Polarization is a technique in which the polarization of sensitive nuclei ($^1$H) is transferred to less sensitive nuclei ($^{29}$Si) to increase sensitivity. Additionally, this technique allowed for observation of silicon nuclei that are proximal to polymer hydrogens, effectively allowing for measurement of $^{29}$Si nuclei that are incorporated in the silicon shell of the micelle.

The 29Si and 1H magic angle spinning (MAS) NMR experiment were carried out on a Bruker Avance DSX NMR spectrometer with a 9.4T magnet (400.24 MHz proton Larmor frequency, 79.52 MHz 29Si Larmor frequency) at the NMR-3 in the Chemistry Department of Dalhousie University. The sample was packed into a rotor of 4 mm diameter and spun at 7.00 kHz.

For the 29Si cross-polarization (CP)/MAS-data on the particles, the 1H parameters need to be known: The 1H MAS NMR spectra were acquired under 7 kHz sample rotation frequency with one pulse excitation followed by background suppression. Relaxation times for the 1H NMR experiments were determined by inversion recovery sequences and estimated to be on the order of 0.84 s for the slowest component (at 0.2 ppm). The spectra were acquired with a 4.2 s delay. The chemical shift scale was referenced based on the 29Si chemical shift reference using the conversion factor from the IUPAC Recommendations 2001. The 29Si (CP)/MAS NMR experiments NMR experiments were conducted in rotors of 4 mm diameter spinning 7.0 kHz. The 29Si CP/MAS NMR spectra were acquired with a 4.2 s repetition time, 5 ms CP contact time, accumulating 1024 scans. The cross-polarization (CP) parameters were optimized on Kaolin, which also served as secondary chemical shift standard at −91.0 ppm and −91.5 ppm as secondary chemical shift reference standard against TMS.

The 29Si CP/MAS NMR spectra are shown in FIG. 22 A to C. Three peaks can be seen with shift positions of the maxima at −91.6 ppm, −101.5 ppm and −111.0 ppm. These agree well with the typical Q2, Q3, and Q4 chemical shift values, respectively. The control sample was prepared exactly the same as the experimental samples in this section, however no polymer or dye was added. After 96 hours of reaction time and subsequent lyophilization, a white powder was obtained. Measurement of this control sample should then show the signal that unencapsulated silica would show in the experimental samples. The 29Si ssNMR spectrum is shown in FIG. 22 D. These NMR results show that TEOS has successfully hydrolyzed and condensed around the composite particles. For the (1,2)PbD(15,000)-b-PAA(6,500) and PS(1,300)-b-PEO(5,600) polymer systems, there is very strong signal compared to noise which indicates that there is an abundance of silica in the solid that was measured. Without wishing to be bound by theory, this is likely due to a high encapsulation efficiency for these two polymer systems. The low signal to noise ratio observed for 1,2)PbD (31,500)-PMMA(21,000) is likely due to low encapsulation efficiency for this system.

Variation in TEOS Concentrations.

10 mL of particle solution created containing 2.5 mg polymer, 2.5 mg Zn (II) TPP, and varying amounts of TEOS described below. Polymers tested are:
1. (1,2)PbD(15,000)-b-PAA(6,500)
   a. With 12.5 mg TEOS
   b. With 5 mg TEOS
   c. With 2.5 mg TEOS
2. (1,2)PbD(31,500)-b-PMMA(21,000)
   a. With 12.5 mg TEOS
   b. With 5 mg TEOS
   c. With 2.5 mg TEOS
3. PS(1,300)-b-PEO(5,600)
   a. With 12.5 mg TEOS
   b. With 5 mg TEOS
   c. With 2.5 mg TEOS
4. PMMA(25,000)-b-PVA(2,300)
   a. With 12.5 mg TEOS
   b. With 5 mg TEOS
   c. With 2.5 mg TEOS One stock solution was prepared for each polymer system containing polymer and Zn (II) TPP to ensure the same concentration between different samples—stock solutions were allowed to mix for 48 hours to ensure dissolution of materials, and subsequently created using the high-temperature resin confined impinging jet (CIJ) mixer.

Aliquots were removed and TEOS was added in its varying amounts for each sample of the same polymer type, and volumes were corrected using THF to ensure that all samples contained the same concentration of polymer and Zn (II) TPP in the same volume of stock. Once created, samples were diluted 400× for measurement via Dynamic Light Scattering (DLS), and diluted 100× for SEM imaging. The remainder of the samples were retained for use in stability studies.

All samples were kept at room temperature for a minimum of 96 hours before any testing to allow the TEOS to react and crosslink around the particle composite.

For all 4 polymer systems tested, DLS was performed to measure particle size and polydispersity. The data is tabulated below in Tables Table 5, Table 6 Table 7 and Table 8.

TABLE 5

DLS data for (1,2)PbD(15000)-b-PAA(6500) polymer system

| Sample | NNLS diameter | NNLS Standard Deviation | CONTIN Diameter | CONTIN Standard Deration | Effective Diameter | Effective Diameter St. Dev. | Polydispersity Index |
|---|---|---|---|---|---|---|---|
| PbD-PAA 1x | 22.8 | 25.5 | 37.0 | 4.9 | 60.2 | 0.5 | 0.17 |
| PbD-PAA 2x | 3.0 | 0.7 | 24.5 | 0.3 | 43.8 | 0.2 | 0.15 |
| PbD-PAA 5x | 12.4 | 6.8 | 32.9 | 2.4 | 65.0 | 0.9 | 0.18 |

TABLE 6

DLS Data for (1,2)PbD(15000)-b-PMMA(21000) polymer system

| Sample | NNLS diameter | NNLS Standard Deviation | CONTIN Diameter | CONTIN Standard Deviation | Effective Diameter | Effective Diameter St. Dev. | Polydispersity Index |
|---|---|---|---|---|---|---|---|
| PbD-PMMA 1x | 18.5 | 2.0 | 26.5 | 10.5 | 77.5 | 0.9 | 0.21 |
| PbD-PMMA 2x | 30.3 | 12.8 | 30.4 | 15.8 | 75.7 | 0.6 | 0.21 |
| PbD-PMMA 5x | 13.6 | 3.6 | 22.1 | 11.1 | 79.7 | 1.8 | 0.21 |

TABLE 7

DLS Data for PS(1300)-b-PEO(5600) polymer system

| Sample | NNLS diameter | NNLS Standard Deviation | CONTIN Diameter | CONTIN Standard Deviation | Effective Diameter | Effective Diameter St Dev. | Polydspersity Index |
|---|---|---|---|---|---|---|---|
| PS-PEO 1x | 17.6 | 1.2 | 41.3 | 20.3 | 113.1 | 1.2 | 0.19 |
| PS-PEO 2x | 39.2 | 34.5 | 55.9 | 5.8 | 108.7 | 0.8 | 0.23 |
| PS-PEO 5x | 33.3 | 27.1 | 41.1 | 28.2 | 116.9 | 9.7 | 0.21 |

TABLE 8

DLS Data for PMMA(25000)-b-PVA(2300) polymer system

| Sample | NNLS diameter | NNLS Standard Deviation | CONTIN Diameter | CONTIN Standard Deviation | Effective Diameter | Effective Diameter St. Dev. | Polydispersity Index |
|---|---|---|---|---|---|---|---|
| PMMA-PVA 1x | 2.7 | 0.1 | 20.5 | 3.0 | 51.0 | 0.1 | 0.20 |
| PMMA-PVA 2x | 13.1 | 0.7 | 25.1 | 2.9 | 58.5 | 0.3 | 0.21 |
| PMMA-PVA 3x | 7.9 | 1.0 | 12.5 | 13.7 | 60.6 | 0.6 | 0.19 |

The DLS data shows particle sizes ranging from 2 nm up to over 100 nm.

The samples were also measured using TEM imaging (FIG. 23) to visualize the particles. Although some clumping is observed, it is believed that this is due to the slow drying of water and the stickiness of the polymers when dried because the DLS data does not indicate significant agglomeration.

In this study, synthetic polymer micelles were formed using a variety of polymer systems of (1,2)PbD(15,000)-b-PAA(6,500), (1,2)PbD(31,500)-b-PMMA(21,000), PS(1,300)-b-PEO(5,600), and PMMA(25,000)-b-PVA(2,300). These were successfully crosslinked via TEOS hydrolysis and condensation around the particle. The control sample demonstrates that through the use of the Cross-Polarization/Magic Angle Spinning ssNMR measurements, unencapsulated polymerized TEOS does not produce a signal. This lack of signal observed in the control sample confirms that the signal observed in the experimental samples comes from the crosslinked silica shell around the particle, and that the CP/MAS ssNMR experiment is insensitive to unencapsulated silica. In the experimental samples in the NMR studies, signals are unambiguously observed. Observing a signal in a 29Si nuclei Cross-Polarization experiment requires silica nuclei to be in close proximity to polymeric protons, so the observation of signal in these experiments confirms the presence of polymerized silica around the particle. DLS measurement and SEM imaging confirm the presence of particles. TEOS crosslinking does not require a reaction between the TEOS and the polymer encapsulate, so this method of crosslinking can be applied to any polymer system, as long as the TEOS will be incorporated into the core of the particle. This method of crosslinking can be performed when the particles are suspended in an aqueous solution to hydrolyze the TEOS before condensation. With silica shell crosslinking shown, TEOS crosslinking can be employed in stability studies to determine its effect on stability against solvent, high temperature, and other manufacturing conditions.

Example 15 Particle Drying

Poly(1,2-butadiene) 31500-b-poly (methyl methacrylate)$_{21000}$ was used to encapsulate Zn (II) TPP using the FNP method as described above. Polyethylene glycol 4000 (PEG 4000) was used as a cryoprotectant. A stock solution of block copolymer and dye both at 250 mg/mL in THF was made. The FNP method had 8 ml of water stirring, then 1 ml of water and 1 ml of the stock solution to form nanoparticles. All samples were analyzed by spectrophotometer (Agilent) and DLS (Brook-Haven BI-200SM) to measure particle diameter, polydispersity, and absorbance. Samples run on the spectrophotometer were diluted using deionized water to 5 mg/mL of dye and polymer. The sample is set at 25° C. during DLS runs and room temperature for spectrophotometer.

FIG. 24 shows the UV-Vis spectrum of freeze dried composite particles with cryoprotectant after resuspension in 90% v/v water/10% v/v THF. Resuspended particles showed maximum UV absorbance at the same wavelength as non-freeze dried particle, showing that particles are stable to freeze drying.

Table 9 shows particle size analysis of pre and post freeze dried particle samples with cryoprotectant. The particle size is substantially unchanged.

TABLE 9

DLS data of pre and post freeze dried particles

| | Stock with Cryoprotectant Pre-Drying | Freeze-Dried Sample with Cryoprotectant |
|---|---|---|
| Average Diameter (nm) | 65.4 | 62.4 |
| Standard Deviation | 7.75 | 11.33 |
| Polydispersity | 0.203 | 0.205 |

The DLS and the TEM data shows that the stock solution with the PEG4000 is likely the same size after freeze drying. Stock particle solution with PEG4000 has an average particle size of 65 nm (standard deviation of 11 nm) with a polydispersity of 0.203 (standard deviation of 0.033). The PEG 4000 increased the size of the nanoparticle by 20 nm. After the nanoparticles were freeze dried for 24 hours, they were resuspended in 10% THF/90% water. The samples were then diluted with water and then measured on DLS. The resuspended samples were 62 nm (with a standard deviation of 11.3 nm) in diameter and a polydispersity of 0.205 (with a standard deviation of 0.023), indicating that the particle size of the resuspended samples was not altered through freeze drying with a cryoprotectant.

Example 16 Stability in Hydrogel Monomer and in Hydrogel Polymer

Composite particles of the present disclosure were incorporated into representative contact lens monomers using the M2Dx formulation to simulate the integration process in contact lens manufacturing. The stability of particles was evaluated through visual inspection and UV/Vis spectrometry. 14 particles of the present disclosure and 2 comparative embodiments were incorporated, and all were found to survive the exposure to M2Dx monomers. Unencapsulated zinc (II) 5,10,15,20-(tetra phenyl) porphyrin could also be integrated. All test items were re-suspended uniformly in M2Dx monomers, and no obvious yellowing and clouding of the solutions was observed. Integration did not appear to alter the optical filtering properties in any particle composite embodiments tested. All test items were then integrated uniformly in M2Dx polymers through UV-curing, and no obvious yellowing and clouding of the contact lens prototypes was observed. Integration did not appear to alter the optical filtering properties of any particle composite embodiments tested. Therefore, all of the test items and control items passed this contact lens pre-polymer study.

In order for composite particles to be used in contact lenses, they are ideally compatible with the chemical environment of the contact lens matrix and to be amenable to the homogenizing and curing conditions of contact lens manufacture.

In this study, candidate particles were evaluated in representative silicone hydrogel monomers, using the M2Dx composition provided by Tangible Science LLC. 9 shell crosslinked, 2 core-crosslinked, two double-linked (both shell and core) and 2 compositions with both crosslinking methods were evaluated in M2Dx monomers along with 3 comparative embodiments and 2 control items. To simulate the manufacturing processes, all test items were dried through vacuum filtration in the presence of cryoprotectant poly (ethylene glycol) 4000, and the dried particles were then added and homogenized into M2Dx. The primary evaluations were done through visual inspection as well as spectral analysis. Test Items Three comparative particles BC01, PH01 and PN01 were made:

BC01: Dye encapsulated nanoparticles {zinc (II) 5,10,15, 20-(tetra phenyl) porphyrin (dye) poly(2-methyl oxazoline)2400-b-poly(dimethyl siloxane)5000-b-poly(2-methyl oxazoline)2400 (tri-block-co-polymer)}

PH01: Dye encapsulated nanoparticles {zinc (II) 5,10,15, 20-(tetra phenyl) porphyrin (dye) poly(n-butylacrylate) 7500-b-poly (acrylic acid)5500 (di-block-co-polymer)}

Dye encapsulated nanoparticles {zinc (II) 5,10,15,20-(tetra phenyl) porphyrin (dye) poly(ethylene oxide) 4000-b-poly(propylene glycol)3000-b-poly (ethylene oxide)4000 (tri-block-co-polymer)}

Test Items BC01 and PH01 were synthesized following the standard flash nanoprecipitation (FNP) procedures (as described above) in a 9:1 deionized water-tetrahydrofuran solvent system. 6 mL of 2500 mg/L dye-block copolymers and 6 mL of deionized water was prepared in two 10 ml syringes. The stock solution was then injected against the water into a 48 mL water bath while stirring. The post-FNP solution was evenly transferred into 3 scintillation vials.

Fourteen composite particles of the present disclosure were tested:

1. CS28 (Coloursmith) Dye encapsulated nanoparticles {zinc (II) 5,10,15,20-(tetra phenyl) porphyrin (dye) poly(dimethyl siloxane) 8000-b-poly (acrylic acid) 8000 (di-block-co-polymer)} shell crosslinked using tetraethyl orthosilicate (5 times the weight to the poly (acrylic acid) block) in the presence of 0.001 M hydrochloric acid, heated for 24 hours at 80 degrees Celsius
2. CS29 (Coloursmith) Dye encapsulated nanoparticles {zinc (II) 5,10,15,20-(tetra phenyl) porphyrin (dye) poly(methyl methacrylate)7400-b-poly (acrylic acid) 24300 (di-block-co-polymer)} shell crosslinked using tetraethyl orthosilicate (5 times the weight to the poly (acrylic acid)block) in the presence of 0.001 M hydrochloric acid, heated for 24 hours at 80 degrees Celsius
3. CS30 (Coloursmith) Dye encapsulated nanoparticles {zinc (II) 5,10,15,20-(tetra phenyl) porphyrin (dye) poly(1,2-butadiene)=-b-poly (acrylic acid)6500 (di-block-co-polymer)} shell crosslinked using tetraethyl orthosilicate (5 times the weight to the poly (acrylic acid) block) in the presence of 0.001 M hydrochloric acid, heated for 24 hours at 80 degrees Celsius
4. CS31 (Coloursmith) Dye encapsulated nanoparticles {zinc (II) 5,10,15,20-(tetra phenyl) porphyrin (dye) poly(dimethyl siloxane) 5000-b-poly (ethylene oxide) 2100 (di-block-co-polymer)} shell crosslinked using tetraethyl orthosilicate (5 times the weight to the poly (ethylene oxide) block) in the presence of 0.001 M hydrochloric acid, heated for 24 hours at 80 degrees Celsius
5. CS33 (Coloursmith) Dye encapsulated nanoparticles {zinc (II) 5,10,15,20-(tetra phenyl) porphyrin (dye) poly(styrene) 1300-b-poly (ethylene oxide)5600 (di-block-co-polymer)} shell crosslinked using tetraethyl orthosilicate (5 times the weight to the poly (ethylene oxide)block) in the presence of 0.001 M hydrochloric acid, heated for 24 hours at 80 degrees Celsius
6. CS34 (Coloursmith) Dye encapsulated nanoparticles {zinc (II) 5,10,15,20-(tetra phenyl) porphyrin (dye) poly(n-butylacrylate)7500-b-poly (acrylic acid)5500 (di-block-co-polymer)} shell crosslinked using tetraethyl orthosilicate (5 times the weight to the poly (acrylic acid)block) in the presence of 0.001 M hydrochloric acid, heated for 24 hours at 80 degrees Celsius
7. CS35 (Coloursmith) Dye encapsulated nanoparticles {zinc (II) 5,10,15,20-(tetra phenyl) porphyrin (dye) poly(methyl methacrylate)3000-b-poly (ethylene oxide)3000 (di-block-co-polymer)} shell crosslinked using tetraethyl orthosilicate (5 times the weight to the poly (ethylene oxide) block) in the presence of 0.001 M hydrochloric acid, heated for 24 hours at 80 degrees Celsius
8. CS36 (Coloursmith) Dye encapsulated nanoparticles {zinc (II) 5,10,15,20-(tetra phenyl) porphyrin (dye) poly(1,4-butadiene) 9000-b-poly (acrylic acid)3500 (di-block-co-polymer)} shell crosslinked using tetraethyl orthosilicate (5 times the weight to the poly (acrylic acid)block) in the presence of 0.001 M hydrochloric acid, heated for 24 hours at 80 degrees Celsius
9. CS37 (Coloursmith) Dye encapsulated nanoparticles {zinc (II) 5,10,15,20-(tetra phenyl) porphyrin (dye) poly(1,2-butadiene) 15000-b-poly (acrylic acid)6500 (di-block-co-polymer)} shell crosslinked using fumed silica (5 times the weight to the poly (acrylic acid) block) in the presence of 0.001M hydrochloric acid, heated for 24 hours at 80 degrees Celsius
10. CS38 (Coloursmith) Dye encapsulated nanoparticles {zinc (II) 5,10,15,20-(tetra phenyl) porphyrin (dye) poly(1,2-butadiene) 15000-b-poly (acrylic acid)6500 (di-block-co-polymer)}core crosslinked via free radicalization in the presence of trimethylolpropane tris(3-mercaptopropionate), initiated using azobisisobutyronitrile (AIBN) at 80 degrees Celsius for 24 hours
11. CS39 (Coloursmith) Dye encapsulated nanoparticles {zinc (II) 5,10,15,20-(tetra phenyl) porphyrin (dye) poly(1,4-butadiene) 9000-b-poly (acrylic acid)3500 (di-block-co-polymer)} core crosslinked via free radicalization in the presence of trimethylolpropane tris(3-mercaptopropionate), initiated using azobisisobutyronitrile (AIBN) at 80 degrees Celsius for 24 hours
12. CS40 (Coloursmith) Dye encapsulated nanoparticles {zinc (II) 5,10,15,20-(tetra phenyl) porphyrin (dye) poly(1,2-butadiene) 15000-b-poly (acrylic acid)6500 (di-block-co-polymer)} shell crosslinked using tetraethyl orthosilicate (5 times the weight to the poly (acrylic acid)block) in the presence of 0.001M hydrochloric acid, core crosslinked via free radicalization in the presence of trimethylolpropane tris(3-mercaptopropionate), initiated using azobisisobutyronitrile (AIBN) at 80 degrees Celsius for 24 hours
13. CS41 (Coloursmith) Dye encapsulated nanoparticles {zinc (II) 5,10,15,20-(tetra phenyl) porphyrin (dye) poly(1,4-butadiene) 9000-b-poly (acrylic acid)3500 (di-block-co-polymer)} shell crosslinked using tetraethyl orthosilicate (5 times the weight to the poly (acrylic acid)block) in the presence of 0.001M hydrochloric acid, core crosslinked via free radicalization in the presence of trimethylolpropane tris(3-mercaptopropionate), initiated using azobisisobutyronitrile (AIBN) at 80 degrees Celsius for 24 hours
14. CS42 (Coloursmith) Dye encapsulated nanoparticles {zinc (II) 5,10,15,20-(tetra phenyl) porphyrin (dye) poly(methyl methacrylate)3000-b-poly (ethylene oxide)3000 (di-block-co-polymer)}

The shell-crosslinked test items were synthesized by encapsulating tetraethyl orthosilicate (TEOS) that was 5 times the weight to the hydrophilic block into the dye-block copolymers stock solution. Then, hydrochloric acid (HCl) was added into the water bath as an acid catalyst at a concentration of 0.001 M. The particles were fabricated using FNP and heat treated for 24 hours at 80 degrees Celsius. CS37 was shell-crosslinked using fumed silica instead of TEOS. The core-crosslinking was achieved by encapsulating free radical transfer agent trimethylolpropane tris(3-mercaptopropionate (TRIS) and thermally-activated free radical initiator azobisisobutyronitrile (AIBN). The THF used to prepare the stock solution did not contain free radical inhibitor butylated hydroxytoluene (BHT). The post-FNP was thermally treated for 24 hours at 80 degrees Celsius.

Two control items were included:
CS00 (Free dye) Free zinc (II) 5,10,15,20-(tetra phenyl) Porphyrin
Empty M2DX Prepolymers.

The double-crosslinked test items (CS40 and CS41) were fabricated by combining the two crosslinked methods. AIBN, TRIS, and TEOS were encapsulated at the same concentrations as described above along with the dye using di-block copolymers through FNP. The resultant particle solution was heated for 24 hours at 80 degrees Celsius in the presence of HCl.

To obtain dried nanoparticles, 10 mg/mL of poly (ethylene glycol)4000 was added into each post-FNP solution as cryoprotectant, and then the particle solutions were vacuum-dried through 30 nm membrane filters or air dried.

Preparation of M2Dx Prepolymers and Integration of Particles 87.5 mL of M2Dx stock solutions were prepared by mixing 14 mL methacryloxypropyl terminated poly dimethyl siloxane (M2Dx), 28 mL 3-[tris(trimethylsiloxy)silyl]propyl methacrylate (Tris), 28 mL dimethyl acrylamide (DMA) and 17.5 mL 1-hexanol. The solution was stirred and kept in an amber glass bottle to prevent undesired polymerization. The stock was stirred for 24 hours prior to the particle's integrations.

Since the dried particles could not be separated from the filters, it was impossible to quantitatively transfer particles from the filters into each pre-polymer solution. Therefore, a 2.0 mm by 0.5 mm strip was cut from the filter using a scalpel and fully immersed into 0.5 mL of M2Dx prepolymer solution to obtain a concentrated particle-contained M2Dx solution.

A standard spectrum was obtained by measuring the M2Dx prepolymers solution that contained 1 mg/mL of freeze-dried particle (with PEG 4000), which had been confirmed to have approximately 50% of light transmission at 426 nm after being polymerized into gel. The standard absorbance value of the secondary peak was determined to be approximately 0.5 at 560 nm. Then, the test items were prepared by gradually adding small volume of the concentrated particles-contained M2Dx solutions that had unknown concentrations into 1.5 mL of M2Dx stock, while being measured on an Agilent 8453 spectrophotometer until its spectrum and the secondary absorbance matched the standard.

Evaluation in M2Dx Prepolymers

The particles-contained M2Dx solutions were evaluated by spectral measurement and visual inspection. The spectra of the test items were examined during the particles' integration phase and the M2Dx solutions were visually examined.

Results

All test items including free dye could be uniformly re-suspended in M2Dx prepolymers. The particles-contained prepolymers were visually examined, no noticeable abnormalities were observed. As shown in FIG. 25, the spectra of all test items had the same characteristic peak as zinc (II) 5,10,15,20-(tetra phenyl) Porphyrin.

Polymerization of M2Dx Matrix

The contact lens prototypes were polymerized in a mold that was assembled by sandwiching an aluminum frame that had a designated volume of 1 mL using two glass slides. Oil-based mold release agent was sprayed onto the frame and slides as a mold releasing agent prior to the mold assembly. The mold was placed in a plastic bag, and 4 clamps were used to apply pressure onto the slides in order to avoid leakage. Once the spectra measurement was performed, 10 µl of photo initiator 2-hydroxy-2-methylpropiophenone (Darocure™ 1173) was immediately added into the particle-contained M2Dx solution. Then the solution was injected into the mold through the inlet using a 3 mL syringe. Once the solution was loaded, the bag was vacuum sealed using a vacuum-sealing machine and then placed into the UV chamber. The M2Dx solution was UV-cured in the plastic bag for 10 minutes. Once the curing process was done, the gel was carefully transferred from the mold into a scintillation vial that contained 20 mL of deionized water using a round-tip tweezer.

Evaluation in M2Dx Polymer

The particles-contained M2Dx polymers were evaluated by spectral measurement and visual inspection. To obtain good spectral data, the spectrophotometer was blanked using an empty M2Dx gel that was made using the same procedures and the gel was wiped using Kimwipe to remove water prior to spectral measurements. All prototypes were visually examined to ensure high quality test items with no visual abnormalities. To correct the baseline of the samples, the average value over 700 to 1000 nm was taken for each sample, and then it was subtracted from the absorbance value at each wavelength. All test items including free dye could be UV-cured into M2Dx polymers. FIG. 26 shows a picture of a M2Dx polymer gel representative of all samples tested, no noticeable abnormalities were observed. However, all test items had different degrees of tinting. The UV-Vis absorbance spectra of each M2Dx polymer containing different composite particles were taken and shown in FIG. 27A. The transmission spectrum is shown in FIG. 27B.

Given that the M2Dx polymer in itself has no optical properties and visual characteristics, the absorbance peak of the test items can be attributed to the incorporation of different particles. Incorporation of particles of the present disclosure was able to confer an absorbance corresponding to the absorbance of the dye encapsulated in the composite particle.

Example 17 Optical Filtration in Contact Lenses

This study demonstrates the optical properties of various composite particles of the present disclosure incorporated into representative silicon hydrogel lenses. The goal of which is to compare test item samples for their ability to limit light exposure in for example the blue light hazard region of the spectrum (400-450 nm). Test items were created by dosing dried particle composites into M2Dx formulation monomers, and subsequently polymerized to create a lens. The spectra of the contact lenses that contained test items was indicative of a blue light hazard blocker, all test items showed the same characteristic peak as the control item that contained free zinc (II) 5,10,15,20-(tetra phenyl) porphyrin (Zn (II) TPP) dye, which suggested that the encapsulation did not alter the shape of the spectrum of the dye payload. In addition, encapsulation had no effect on samples bandwidth except CS28. Encapsulation using poly (dimethyl siloxane) 8000-b-poly (acrylic acid) 8000 (di-block-co-polymer) broadened the spectrum of the dye payload by 8 nm in this polymer system.

Comparative items BC01, PH01 and PN01 were used. Composite particles of the present disclosure, CS28 to CS42 were made as described above and tested. M2Dx prepolymers were prepared as described above. Two control items, CS00 (free dye) and empty M2Dx polymers were also prepared as described above and used in this study. The particles were dried with cryoprotectant PEG 4000. The particle solutions were vacuum-dried through 30 nm membrane filters except PN01, which was filtered using a 10 nm membrane filter. Test Items CS42 and PN01 could not be filtered using 30 nm or 10 nm membrane filters, which suggested that the particles were either smaller than 10 nm or it had a low encapsulation efficiency. As a result, CS42 and PN01 were air-dried at room temperature. The M2Dx prepolymers were mixed with each particle and polymerized as described above.

The gels were measured using UV/Vis spectrometry in order to evaluate their optical properties. The spectrophotometer was blanked using the M2Dx gel that did not contain particles. To correct the baseline of the samples, the average value over 700 to 1000 nm was taken for each sample, and then it was subtracted from the absorbance value at each wavelength.

The optical properties of the M2Dx polymer gels are summarized in Table 10.

TABLE 10

Optical properties of M2Dx polymer with different particles

| Test Item | Peak Wavelength (nm) | Transmission at Peak (% T) | Absorbance at the Peak | Full Width Half Max (nm) |
|---|---|---|---|---|
| Free dye in THF | 422 | 10.0 (normalized data) | 1.0 (normalized data) | 11 |
| Free dye In M2Dx | 425 | 17.09 | 0.77 | 11 |
| BC01 | 425 | 17.74 | 0.75 | 12 |
| PH01 | 425 | 24.58 | 0.61 | 10 |
| PN01 | 425 | 79.59 | 0.099 | 10 |
| CS28 | 425 | 63.87 | 0.19 | 19 |
| CS29 | 425 | 13.11 | 0.88 | 12 |
| CS30 | 425 | 32.56 | 0.49 | 11 |
| CS31 | 425 | 18.61 | 0.73 | 11 |
| CS32 | 425 | 65.18 | 0.19 | 13 |
| CS33 | 425 | 34.37 | 0.46 | 12 |
| CS34 | 425 | 27.41 | 0.56 | 13 |
| CS35 | 425 | 18.62 | 0.73 | 12 |
| CS36 | 425 | 26.94 | 0.60 | 12 |
| CS37 | 425 | 31.19 | 0.51 | 14 |
| CS38 | 425 | 26.84 | 0.57 | 12 |
| CS39 | 425 | 36.27 | 0.44 | 12 |
| CS40 | 425 | 21.71 | 0.66 | 12 |
| CS41 | 425 | 24.75 | 0.61 | 12 |
| CS42 | 425 | 7.44 | 1.13 | 10 |

All test and control items had consistent shape, bandwidth, and peak wavelength as free dye in THF. Slight broadening (19 nm) in bandwidth was observed for CS28. The characteristic peak was detected in the blue light hazard region (410 to 450 nm) with a peak position at 425 nm for all test and control items. A 3 nm of peak shift compared to the free dye in THF had been observed for all test and control items due to the change of solvent system. By comparing the control item with the test items, a conclusion could be confidently drawn that encapsulation did not significantly alter the absorbance spectrum of the zinc (II) 5,10,15,20-(tetra phenyl) porphyrin dye.

Example 18 Ethanol Extraction of Contact Lens Containing Composite Particle

In contact lens manufacturing, the contact lenses made undergo a series of ethanol washing steps in order to remove any unreacted monomer in order for the lens to be safe to enter the eye. Dyes incorporated into contact lenses through the composite particles ideally should not be extracted out of the contact lenses by ethanol washes.

Comparative items BC01, PH01 and PN01 were used. Composite particles of the present disclosure, CS28 to CS42 were made as described above and tested. M2Dx prepolymers were prepared as described above. Two control items, CS00 (free dye) and empty M2Dx polymers were also prepared as described above and used in this study.

Upon creation of the gels and cutting into the size required for this experiment, all gels were kept in deionized (DI) water vials for 24 hours to allow them to hydrate.

The samples were removed from their water vials, and placed in empty and labelled scintillation vials. At time=0, 10 mL of 25% ethanol extracting solution was poured in at the same time for all samples, and the gels remained immersed in this solution for 1 hour. At the 1 hour mark, the gels were removed from the solution and placed into vials of water to quickly stop the extraction. At this point the gels and the ethanol were measured using a UV/Vis spectrometer, using appropriate blanks.

This process was repeated for the 50%, 75%, and 95% ethanol extraction steps, with a volume of 10 mL used for each extracting solution. The solutions were not stirred, so as to avoid damaging the gels which can become easier to break upon exposure to ethanol. Note that the gels were not measured after the 75% ethanol extraction, as the gels appeared to have become weaker and breaking of the gels was a concern.

UV-Vis absorbance measurements were taken of all the gels. A correction coefficient was applied to account for the different amount of particles in each gel sample. The correction coefficient is shown in Table 11.

TABLE 11

Correction Coefficient

| Test item | Initial absorbance in gel | Correction coefficient |
|---|---|---|
| BC01 | 0.70038 | 0.89789 |
| PH01 | 0.60436 | 0.77479 |
| PN01 | 0.09900 | 0.12691 |
| CS00 | 0.69044 | 0.88515 |
| CS28* | 0.19533 | 0.25041 |
| CS29 | 0.71821 | 0.92074 |
| CS30 | 0.28881 | 0.37026 |
| CS31 | 0.55946 | 0.71722 |
| CS32 | 0.18546 | 0.23776 |
| CS33 | 0.43053 | 0.55194 |
| CS34 | 0.69911 | 0.89626 |
| CS35 | 0.64609 | 0.82829 |
| CS36 | 0.78003 | 1.00000 |
| CS37 | 0.42686 | 0.54723 |
| CS38 | 0.58602 | 0.75127 |
| CS39 | 0.69006 | 0.88465 |
| CS40 | 0.32513 | 0.41682 |
| CS41 | 0.61530 | 0.78881 |
| CS42 | 1.12866 | 1.44694 |

The absorbance readings in ethanol are tabulated below in Table 12. Because the 25% and 50% ethanol extractions did not lead to any absorbance reading, these results were not included. The absorbance values shown are corrected using the correction coefficient, where the actual absorbance was divided by the correction coefficient to account for differences in initial absorbance in the gel. The absorbances measured in the 75% and the 95% washes are added together to give the absorbance lost in the ethanol washing. A lower total absorbance in EtOH indicates lower extraction of dye by ethanol wash.

TABLE 12

Absorbance measured in 75% and 95% ethanol extractions

| Test Item | Absorbance in 75% EtOH | Absorbance in 95% EtOH | Total absorbance in EtOH |
|---|---|---|---|
| BC01 | 0.028 | 0.074 | 0.103 |
| PH01 | 0.023 | 0.034 | 0.058 |
| PN01* | 0.087 | 0.220 | 0.307 |
| CS00 | 0.013 | 0.026 | 0.039 |
| CS28* | 0.000 | 0.014 | 0.014 |
| CS29 | 0.021 | 0.052 | 0.072 |
| CS30 | 0.015 | 0.076 | 0.090 |
| CS31 | 0.007 | 0.048 | 0.056 |

TABLE 12-continued

Absorbance measured in 75% and 95% ethanol extractions

| Test Item | Absorbance in 75% EtOH | Absorbance in 95% EtOH | Total absorbance in EtOH |
|---|---|---|---|
| CS32* | 0.068 | 0.372 | 0.439 |
| CS33 | 0.000 | 0.070 | 0.070 |
| CS34 | 0.006 | 0.019 | 0.024 |
| CS35 | 0.016 | 0.060 | 0.076 |
| CS36 | 0.015 | 0.075 | 0.090 |
| CS37 | 0.008 | 0.044 | 0.052 |
| CS38 | 0.016 | 0.045 | 0.061 |
| CS39 | 0.020 | 0.073 | 0.093 |
| CS40 | 0.008 | 0.051 | 0.059 |
| CS41 | 0.012 | 0.040 | 0.052 |
| CS42 | 0.006 | 0.003 | 0.009 |

Representative UV-Vis absorbance spectra of the CS42 gel, the CS34 gel, the CS37 gel, and the CS41 gel, and their corresponding 95% ethanol wash are shown in FIG. 28 (A to D).

Based on the UV-Vis absorbance spectra, the composite particles of the present disclosure were capable of resisting ethanol leaching. In particular, CS28, CS34 and CS42 outperformed the control item free dye CS00.

Example 19 Thermal Stability of Particles in Contact Lens

Autoclaving procedures are used in contact lens manufacture to sterilize contact lenses after packaging. Contact lens manufacturers sterilize contact lenses immersed in saline using an autoclave. Autoclave conditions include having the sample at 121° C. and 108 kPa for 30 minutes. Composite particles had been incorporated into representative contact lens gels and then exposed to autoclave conditions for 30 minutes. After the autoclave process the saline storage solution and the gels were measured on the spectrophotometer. It was found that all samples tested in this study showed no leaching into the saline solution. The absorbance spectrum, and thus the optical filtering capabilities of the additives were unchanged by the autoclave process.

M2Dx gels containing different composite particles were prepared as described above. Comparative items BC01, and PH01 were used. Composite particles of the present disclosure, CS28 to CS31 and CS33 to CS41 were made as described above and tested. M2Dx prepolymers were prepared as described above. Two control items, CS00 (free dye) and empty M2Dx polymers were also prepared as described above and used in this study.

All test items were cut in a 2 cm by 2 cm gel and then added to a scintillation vial with 5 mL of saline. The sample was then run through a preset "L30 cycle" autoclave process, meaning the sample is under sterile conditions for 30 minutes. The autoclave is of the make and model AMSCO Steris.

Representative UV-Vis absorbance spectra are shown in FIG. 29. The UV-Vis absorbance of the saline solution after autoclaving was also measured. The spectrum is shown in FIG. 30 and no absorbance peak corresponding to the encapsulated dye was observed.

It was shown in this study that the autoclave process did not cause the composite particles of the present disclosure to leach into the saline solution. From the results, it was also shown that autoclaving does not affect the optical filtering capabilities of the additives. From looking at the gel's absorbance, there were no significant changes from before or after the autoclave process.

Example 20 Solvent Stability of Contact Lens

Manufacture of contact lens usually involves the use of organic solvents. Main solvents can include ethanol, hexanol, butoxyethanol, nonanol and t-amyl alcohol. The particles tested and their corresponding codes are listed below.
1. CS09—Dye encapsulated nanoparticles {zinc (II) 5,10,15,20-(tetra phenyl) porphyrin (dye) poly(1,2-butadiene)31,000-b-poly (methyl methacrylate)21,500 (di-block-co-polymer)}
2. CS01—Dye encapsulated nanoparticles {zinc (II) 5,10,15,20-(tetra phenyl) porphyrin (dye) poly(1,2-butadiene)31,000-b-poly (methyl methacrylate)21,500 (di-block-co-polymer)} crosslinked via tetraethyl orthosilicate (5 times the weight to the hydrophilic block)
3. CS13—Dye encapsulated nanoparticles {zinc (II) 5,10,15,20-(tetra phenyl) porphyrin (dye) poly(1,2-butadiene)31,000-b-poly (methyl methacrylate)21,500 (di-block-co-polymer)} crosslinked via tetraethyl orthosilicate (5 times the weight to the hydrophilic block) and hydrochloric acid.
4. PN01—Dye encapsulated Nanoparticle {Zinc (II) 5,10,15,20-(tetra phenyl) porphyrin (dye) Poly(ethylene oxide)4000-b-poly(methyl ethylene oxide)3000-b-poly (ethylene oxide)4000 (tri-block-co-polymer)}
5. CS14—Dye encapsulated Nanoparticle {Zinc (II) 5,10,15,20-(tetra phenyl) porphyrin (dye) Poly(ethylene oxide)4000-b-poly(methyl ethylene oxide)3000-b-poly (ethylene oxide) (tri-block-co-polymer)4000} crosslinked via tetraethyl orthosilicate (5 times the weight to the hydrophilic block) and by free radicalization (1%)
6. CS15—Dye encapsulated Nanoparticle {Zinc (II) 5,10,15,20-(tetra phenyl) porphyrin (dye) Poly(ethylene oxide)4000-b-poly(methyl ethylene oxide)3000-b-poly (ethylene oxide)4000 (tri-block-co-polymer)} crosslinked via tetraethyl orthosilicate (5 times the weight to the hydrophilic block) and hydrochloric acid.
7. CS16—Dye encapsulated nanoparticles {zinc (II) 5,10,15,20-(tetra phenyl) porphyrin (dye) poly(dimethyl siloxane) 8000-b-poly (acrylic acid) 8000 (di-block-co-polymer)}
8. CS17—Dye encapsulated nanoparticles {zinc (II) 5,10,15,20-(tetra phenyl) porphyrin (dye) poly(dimethyl siloxane) 8000-b-poly (acrylic acid) 8000 (di-block-co-polymer)} crosslinked using tetraethyl orthosilicate (5 times the weight to the hydrophilic block)
9. CS18—Dye encapsulated nanoparticles {zinc (II) 5,10,15,20-(tetra phenyl) porphyrin (dye) poly(1,2-butadiene) 15000-b-poly (acrylic acid)6500 (di-block-co-polymer)}
10. CS19—Dye encapsulated Nanoparticle {Zinc (II) 5,10,15,20-(tetra phenyl) porphyrin (dye) Poly(1,2-butadiene) 15000-b-poly (acrylic acid)6500 (di-block-co-polymer)} Crosslinked by tetraethyl orthosilicate, free radicalization, and acid
11. CS20—Dye encapsulated Nanoparticle {Zinc (II) 5,10,15,20-(tetra phenyl) porphyrin (dye) Poly(1,2-butadiene) 15000-b-poly (acrylic acid)6500 (di-block-co-polymer)} Crosslinked by tetraethyl orthosilicate, free radicalization, acid, and heat
12. CS21—Dye encapsulated Nanoparticle {Zinc (II) 5,10,15,20-(tetra phenyl) porphyrin (dye) Poly(1,2-

13. CS22—Dye encapsulated Nanoparticle {Zinc (II) 5,10,15,20-(tetra phenyl) porphyrin (dye) Poly(1,2-butadiene) 15000-b-poly (acrylic acid)6500 (di-block-co-polymer)} Crosslinked by tetraethyl orthosilicate, free radicalization, and heat
14. CS04—Dye encapsulated nanoparticles {zinc (II) 5,10,15,20-(tetra phenyl) porphyrin (dye) poly(1,2-butadiene) 15000-b-poly (acrylic acid)6500 (di-block-co-polymer)} Crosslinked by tetraethyl orthosilicate (5 times the weight to the hydrophilic block)
15. CS23—Dye encapsulated nanoparticles {zinc (II) 5,10,15,20-(tetra phenyl) porphyrin (dye) poly(1,2-butadiene) 15000-b-poly (acrylic acid)6500 (di-block-co-polymer)} Crosslinked by tetraethyl orthosilicate (20 times the weight to the hydrophilic block)
16. CS27—Dye encapsulated Nanoparticle {Zinc (II) 5,10,15,20-(tetra phenyl) porphyrin (dye) Poly(vinyl alcohol) 2300-b-poly (methyl methacrylate)25000 (di-block-co-polymer)})} shell crosslinked using tetraethyl orthosilicate (5 times the weight to the poly (acrylic acid) block) in the presence of 0.001M hydrochloric acid, heated for 24 hours at 80° C.
17. CS28—Dye encapsulated nanoparticles {zinc (II) 5,10,15,20-(tetra phenyl) porphyrin (dye) poly(dimethyl siloxane) 8000-b-poly (acrylic acid) 8000 (di-block-co-polymer)} shell crosslinked using tetraethyl orthosilicate (5 times the weight to the poly (acrylic acid) block) in the presence of 0.001 M hydrochloric acid, heated for 24 hours at 80° C.
18. CS29—Dye encapsulated nanoparticles {zinc (II) 5,10,15,20-(tetra phenyl) porphyrin (dye) poly(methyl methacrylate)7400-b-poly (acrylic acid)24300 (di-block-co-polymer)} shell crosslinked using tetraethyl orthosilicate (5 times the weight to the poly (acrylic acid)block) in the presence of 0.001M hydrochloric acid, heated for 24 hours at 80° C.
19. CS30—Dye encapsulated nanoparticles {zinc (II) 5,10,15,20-(tetra phenyl) porphyrin (dye) poly(1,2-butadiene)=-b-poly (acrylic acid)6500 (di-block-co-polymer)} shell crosslinked using tetraethyl orthosilicate (5 times the weight to the poly (acrylic acid) block) in the presence of 0.001M hydrochloric acid, heated for 24 hours at 80° C.
20. CS31—Dye encapsulated nanoparticles {zinc (II) 5,10,15,20-(tetra phenyl) porphyrin (dye) poly(dimethyl siloxane) 5000-b-poly (ethylene oxide) 2100 (di-block-co-polymer)} shell crosslinked using tetraethyl orthosilicate (5 times the weight to the poly (ethylene oxide) block) in the presence of 0.001 M hydrochloric acid, heated for 24 hours at 80° C.
21. CS33—Dye encapsulated nanoparticles {zinc (II) 5,10,15,20-(tetra phenyl) porphyrin (dye) poly(styrene) 1300-b-poly (ethylene oxide)5600 (di-block-co-polymer)} shell crosslinked using tetraethyl orthosilicate (5 times the weight to the poly (ethylene oxide)block) in the presence of 0.001M hydrochloric acid, heated for 24 hours at 80° C.
22. CS34—Dye encapsulated nanoparticles {zinc (II) 5,10,15,20-(tetra phenyl) porphyrin (dye) poly(n-butylacrylate)7500-b-poly (acrylic acid)5500 (di-block-co-polymer)} shell crosslinked using tetraethyl orthosilicate (5 times the weight to the poly (acrylic acid)block) in the presence of 0.001 M hydrochloric acid, heated for 24 hours at 80° C.
23. CS35—Dye encapsulated nanoparticles {zinc (II) 5,10,15,20-(tetra phenyl) porphyrin (dye) poly(methyl methacrylate)3000-b-poly (ethylene oxide)3000 (di-block-co-polymer)} shell crosslinked using tetraethyl orthosilicate (5 times the weight to the poly (ethylene oxide) block) in the presence of 0.001 M hydrochloric acid, heated for 24 hours at 80° C.
24. CS36—Dye encapsulated nanoparticles {zinc (II) 5,10,15,20-(tetra phenyl) porphyrin (dye) poly(1,4-butadiene) 9000-b-poly (acrylic acid)3500 (di-block-co-polymer)} shell crosslinked using tetraethyl orthosilicate (5 times the weight to the poly (acrylic acid) block) in the presence of 0.001M hydrochloric acid, heated for 24 hours at 80° C.

The composite particles are prepared and dried where appropriate as described above.

This study was conducted over the course of three experiments to determine the effect of solvent washes on synthetic polymer micelle formulations. Samples were made in tetrahydrofuran (THF) with both block copolymer and dye at 2,500 mg/mL concentration. 2 ml of the stock was mixed with 18 ml of deionized water using FNP to get a final concentration of 250 mg/mL. The FNP had 16 ml of water stirring and then 2 ml of water and 2 ml of the stock solution were added using the metal confined impinging jet (CIJ) mixer device through syringes to form synthetic polymer micelles. All samples were centrifuged at 4000 RPM for 1 hour using the 80-2 Electronic Centrifuge after formation. These samples were then exposed to a solution of 50% ethanol to get an understanding of ethanol exposure (0.5 mL of sample with 0.5 mL of ethanol). The resulting samples were then vortexed for 15 seconds and left overnight. Solutions were then compared using spectrophotometer and visual inspection. All dynamic light scatter (DLS) samples were prepared by diluting the composite particle samples (100-fold) and filtering them through 450 nm filters and analyzed for particle size measurements using Brookhaven™ BI-200SM instrument. Preparation for visual characteristics required samples to be individually photographed in a photobox with stock and ethanol treated samples. The first experiment was conducted to determine which composite particles survive an exposure to 50% ethanol overnight. Samples that best survive ethanol exposure will be tested on more solvents. Additionally, stock solutions were measured (100-fold diluted) to compare the loss of absorbance in the samples.

The second experiment used test items from the first experiment that best survived ethanol washing, judged via absorbance and visual inspection. These test items were then further tested in this experiment to determine the effect of multiple solvents used in the production of contact lenses on different composite particle formulations. The following test items were used for this experiment; CS17, CS20, CS22, and CS04. To test the effect of solvents on composite particle solutions, 0.5 mL of each sample was first placed in a centrifuge tube for each solvent to be tested. Each sample had 0.5 mL of either hexanol, butoxyethanol, methanol, t-amyl alcohol, or nonanol added to it resulting in a 50% alcohol solution. All of the resulting samples were then vortexed for 15 seconds and left overnight after which they were centrifuged. Samples were then analyzed for survivability by visual characteristics, absorbance data, and DLS data. DLS samples were prepared by diluting the synthetic polymer micelle samples (100-fold) and filtering them through 450 nm filters, representative size measurements were obtained using DLS. Samples for spectrophotometer UV-Vis measurements (Agilent) were diluted to get representative absorbance measurements. Preparation for visual characteristics required samples to be individually photographed in a photobox and compared to stock samples.

UV-Vis spectra of representative composite particles in ethanol are shown in FIG. 31 panels A to F. UV-Vis spectra of representative composite particles in various solvents are shown FIG. 31 panels G to I.

DLS data of representative composite particles CS17, CS20, CS22, and CS04 are shown in Table 13, Table 14, Table 15, and Table 16 respectively.

TABLE 13

DLS data of CS17

| Solvent | Diameter (nm) | Standard Deviation | Polydispersity |
|---|---|---|---|
| Ethanol | 81.40 | 12.80 | 0.214 |
| Methanol | 60.07 | 10.39 | 0.250 |
| Butoxyethanol | N/A | N/A | N/A |
| Nonanol | 65.43 | 6.54 | 0.182 |
| Hexanol | 62.88 | 12.10 | 0.204 |
| T-amyl alcohol | 111.37 | 1.67 | 0.163 |
| 100° C. | 54.33 | 24.78 | 0.167 |
| 80° C. | 51.58 | 12.59 | 0.316 |

TABLE 14

DLS data on CS20

| Solvent | Diameter (nm) | Standard Deviation | Polydispersity |
|---|---|---|---|
| Ethanol | N/A | N/A | N/A |
| Butoxyethanol | N/A | N/A | N/A |
| Hexanol | 256.73 | 4.19 | 0.249 |
| T-amyl Alcohol | 87.60 | 15.15 | 0.183 |

TABLE 15

DLS data on CS22

| Solvent | Diameter (nm) | Standard Deviation | Polydispersity |
|---|---|---|---|
| ethanol | 84.27 | 21.82 | 0.299 |
| Methanol | 23.98 | 6.13 | 0.183 |
| Nonanol | 21.57 | 13.33 | 0.218 |
| Hexanol | 7.70 | 7.99 | 0.228 |
| T-amyl alcohol | 19.4 | 19.68 | 0.228 |
| Butoxyethanol | N/A | N/A | N/A |
| 100° C. | 64.98 | 29.22 | 0.163 |

TABLE 16

DLS data on CS04

| Solvent | Diameter (nm) | Standard Deviation | Polydispersity |
|---|---|---|---|
| Ethanol | 71.58 | 21.29 | 0.197 |
| Methanol | 32.67 | 8.45 | 0.358 |
| Hexanol | 39.85 | 8.47 | 0.181 |
| Butoxyethanol | N/A | N/A | N/A |
| Nonanol | 39.50 | 10.19 | 0.246 |
| t-amyl | 75.77 | 3.66 | 0.202 |
| 80° C. | 29.17 | 4.55 | 0.232 |
| 100° C. | 17.20 | 3.01 | 0.218 |

Stability results in various solvents are summarized in Table 17. Satisfactory (S)/Improvement (I) criteria is based on combined visual inspection of the sample, UV-Vis absorbance and DLS results where a satisfactory sample is comparable to CS00, and an improvement increases performance compared to CS00. Visual inspection compared the solution colour of CS00 to composite particles to determine relative concentration of dye. UV-Vis absorbance compared the solution absorbance of CS00 to composite particles to determine relative concentration of dye. DLS results of composite particles indicated if particles were stable in the solvent tested. Based on the visual inspection, UV-Vis absorbance, and DLS results composite particles of the present disclosure were able to survive solvent exposure better than CS00 and presented an improvement on a system containing only free dye including CS04, CS17, CS19, CS20, CS22, CS28, CS29, CS31, CS33, CS34, and CS35.

TABLE 17

Solvent Stability

| ID | Ethanol (50% v/v) | Methanol (50% v/v) | Hexanol (50% v/v) | Butoxyethanol (50% v/v) | Nonanol (50% v/v) | T-amyl ethanol (50% v/v) |
|---|---|---|---|---|---|---|
| CS09 | S | | | | | |
| CS01 | S | | | | | |
| CS13 | S | | | | | |
| PN01 | I | | | | | |
| CS14 | I | | | | | |
| CS15 | I | | | | | |
| CS16 | I | | | | | |
| CS17 | I | I | S | I | S | S |
| CS18 | I | | | | | |
| CS19 | S | | | | | |
| CS20 | I | I | I | I | I | I |
| CS21 | I | | | | | |
| CS22 | I | I | I | I | I | I |
| CS04 | I | I | I | I | I | I |
| CS23 | I | I | I | I | I | I |
| CS24 | I | | | | | |
| CS25 | S | | | | | |

TABLE 17-continued

Solvent Stability

| ID | Ethanol (50% v/v) | Methanol (50% v/v) | Hexanol (50% v/v) | Butoxyethanol (50% v/v) | Nonanol (50% v/v) | T-amyl ethanol (50% v/v) |
|---|---|---|---|---|---|---|
| CS26 | I | | | | | |
| CS27 | S | | | | | |
| CS28 | S | | | | | |
| CS29 | I | | | | | |
| CS30 | I | | | | | |
| CS31 | I | | | | | |
| CS32 | I | | | | | |
| CS33 | I | | | | | |
| CS34 | I | | | | | |
| CS35 | I | | | | | |
| CS36 | I | | | | | |

Example 21 Photobleaching of Composite Particles in Contact Lens

Photobleaching is the photochemical alteration of a dye or a fluorophore molecule such that the absorbance spectrum of the compound is permanently altered or destroyed. Because normal wear of contact lens could expose the lens to various UV conditions, it may be desirable for the composite particles incorporated into a contact lens to have some resistance to photobleaching. However, this is not an absolute criterion of the composite particles for use in contact lens, since normal daily wear of contact lens likely only exposes the lens and the composite particles to UV conditions that are much more gradual and significantly less powerful than photobleaching conditions used in this experiment.

Comparative items BC01, PH01 and PN01 were used. Composite particles of the present disclosure, CS28 to CS42 were made as described above and tested. M2Dx prepolymers were prepared as described above. Two control items, CS00 (free dye) and empty M2Dx polymers were also prepared as described above and used in this study.

The dried particles were resuspended in a stock of M2Dx, the particles were then diluted to another M2Dx solution until the secondary peak in the spectrophotometer measured an absorbance at approximately 0.5. 12.5 µL of 2-Hydroxy-2-methylpropiophenone (DAROCUR 1173) was then added to 3 mL of M2Dx solution as the photo initiator. M2Dx was then polymerized in the UV reactor for 10 minutes and then stored in DI water. Spectrophotometer was blanked using a M2Dx without dye or nanoparticles.

Photobleaching

This experiment exposed all samples to UV light (~250 nm) using a UV reaction chamber. After exposure, each sample was measured using the Agilent spectrophotometer to determine the change in optical filtering capabilities. This was done over a series of time points every 1 minute. Samples were photobleached for a total of 5 minutes. The gels were measured after every 1 minute of photobleaching up until 5 minutes.

A UV-Vis absorbance spectrum of a representative gel (containing CS35) is shown in FIG. 32. It was found that the rate of photobleaching of each composite particle in a contact lens gel followed second order kinetics using peak absorbance at 425 nm. The rate of photobleaching (k) for second order kinetics is shown in Table 18, where a smaller k indicates a slower rate of photobleaching. Most of the composite particles of the present disclosure showed a slower rate of photobleaching compared to the free dye (CS00) and the comparative examples BC01 and PN01.

TABLE 18

Rate of photobleaching 2nd order

| Sample | k | $r^2$ |
|---|---|---|
| CS35 | 0.183 | 0.971 |
| PH01 | 0.217 | 0.976 |
| CS36 | 0.222 | 0.983 |
| CS39 | 0.223 | 0.987 |
| CS42 | 0.225 | 0.975 |
| CS32 | 0.226 | 0.912 |
| CS29 | 0.293 | 0.970 |
| CS30 | 0.359 | 0.930 |
| CS34 | 0.380 | 0.994 |
| CS41 | 0.417 | 0.935 |
| CS28 | 0.425 | 0.969 |
| CS31 | 0.431 | 0.880 |
| CS38 | 0.440 | 0.946 |
| CS33 | 0.476 | 0.986 |
| CS37 | 0.487 | 0.856 |
| CS00 | 0.573 | 0.954 |
| BC01 | 0.597 | 0.926 |
| CS40 | 0.611 | 0.927 |
| PN01 | 2.496 | 0.927 |

Based on the $2^{nd}$ order photobleaching rate, the composite particles of the present disclosure were capable of resisting photobleaching. These embodiments are CS28, CS29, CS30, CS31, CS32, CS33, CS34, CS35, CS36, CS37, CS38, CS39, CS40, CS41, and CS42. In particular, several composite particles of the present disclosure performed better at resisting photobleaching than the control item free dye CS00 and presented an improvement on a system containing only free dye. These embodiments are CS28, CS29, CS30, CS31, CS32, CS33, CS34, CS35, CS36, CS37, CS38, CS39, CS41, and CS42.

Further, the comparative example PN01 was incapable of resisting photobleaching.

Example 22 Shelf Life Storage Stability

Contact lenses for commercial use are usually submerged in phosphate-buffered saline (PBS) and packaged in blister packs, which are sterilized and can be stored for a period of time. In this study, different composite particles incorporated in M2Dx gel were exposed to saline solutions after autoclaving to simulate the storage conditions of sterilized contact lenses. This study followed the guideline of Color Additive Petition of contact lens created by the U.S Food and Drug Administration in order to evaluate the migration of the particles. The leaching of the particles was determined through visual inspection and UV-Vis spectrometry. The saline solutions used to contain the prototypes were measured in order to determine the presence of particles. An accelerated aging technique was applied to reduce the saline exposure time. All test and control items had no leaching after 136.5 hours of saline exposure at 50° C. because no absorbance was measured at the dye peak wavelength of 425 nm. In addition, no visual abnormality was observed in either gels or saline solution. Therefore, it could be concluded that saline exposure did not cause particles to migrate and all test items and control items passed this shelf life study.

According to the FDA, to simulate the daily wear contact lenses that contain a color additive, the prototypes should be immersed into saline or PBS for 14 days at 37 degrees Celsius. In addition, the migration study should be carried out using 0.9% (be weight) saline solution or PBS and a surface area to volume ratio of 120 $cm^2$ lens to 20 mL extract (or 6 $cm^2$/mL).

To accelerate the saline exposure, an accelerated-aging technique recognized by the FDA was introduced. In this study, the evaluation of the prototypes was carried out in 0.9% Saline solution at a gel surface area to saline volume ratio of 6 $cm^2$/mL. Test items were heat treated at 50 degrees Celsius for 136.5 hours. The saline solutions were measured using a spectrophotometer after heat treatment in order to detect the particle migration.

The stability of the nanoparticles will be evaluated using the following criteria
1. The aged particle-loaded contact lens prototypes should have the same/similar spectrum and optical properties as the reference
2. The aged particle-loaded contact lens prototypes should not have any noticeable abnormalities (yellowing, clouding, darkening, etc.)
3. The spectrum of the saline solutions used to extract the prototypes should not contain the signals of free dye or particles
4. Free dye should not precipitate out into the saline solution Comparative items BC01, PH01 and PN01 were used. Composite particles of the present disclosure, CS28 to CS42 were made as described above and tested. M2Dx prepolymers were prepared as described above. Two control items, CS00 (free dye) and empty M2Dx polymers were also prepared as described above and used in this study.

The contact lens prototypes were polymerized in a mold that was assembled by sandwiching an aluminum frame that had a designated volume of 1 mL using two glass slides. Oil-based mold release agent was sprayed onto the frame and slides as a mold releasing agent prior to the mold assembly. The mold was placed in a plastic bag, and 4 clamps were used to apply pressure onto the slides in order to avoid leakage. Once the spectrum measurement was done, 10 μl of photo initiator 2-hydroxy-2-methylpropiophenone (Darocure 1173) was immediately added into the particle-contained M2Dx solution. Then the solution was injected into the mold through the inlet using a 3 mL syringe. Once the solution was loaded, the bag was vacuum sealed using a vacuum-sealing machine and then placed into the UV chamber. The M2Dx solution was UV-cured in the plastic bag for 10 minutes. Once the curing process was done, the gel was carefully transferred from the mold into a scintillation vial that contained 20 mL of deionized water using a round-tip tweezer.

Autoclaving

Prototypes were autoclaved using AMSCO Steris at 121 degrees Celsius and 108 kPa in 5 mL of saline solution for 30 minutes. Composite particles CS28, 29, 30, 31, and 33 to 41, and comparative examples BC01 and PH01 were subjected to autoclave.

Accelerated Aging

All 2 cm by 2 cm prototypes were cut into 9 small pieces, so that each one had a length, width and height of 0.67 cm, 0.67 cm and 0.1 cm, respectively. It brought the total surface area of each test item to 6.30 $cm^2$. To achieve a 6 $cm^2$/mL surface area to volume ratio, the gels were fully immersed into 1.05 mL of saline solution. Then, the prototypes were heated at 50 degrees Celsius for 136.5 hours in a Thermo Scientific oven. The required heating temperature and time were calculated using accelerating aging technique based on Arrhenius theory. The samples were removed from the oven after the designated time and cooled down to room temperature prior to spectral measurements.

Spectrum Measurement

The saline solutions of the post-heating samples were measured using a spectrophotometer to identify the presence of the particles or dye leached out from the gels. The spectrophotometer was blanked using the saline solution used to contain the empty M2Dx, and it was heat treated the same way as the other samples.

Results

All illustrated in FIG. 33, no signal was observed in the visible light region of the saline solution used to contain the prototypes after aging for all test and control items. Some small peaks can be found at 368, 486, 637 and 656 nm due to the surface defects (scratches) of the plastic disposable cuvettes. The gels and the saline solutions were visually examined after aging, no visual abnormalities (such as precipitation, yellowing, and clouding) were observed.

The spectral data had suggested that the saline exposure did not cause the particle to migrate from the gel into the solution, as no absorbance was measured at Zn (II) TPP's peak wavelength 425 nm. If the free dye leached out from the gels it would not be detectable due to its hydrophobic nature, which makes it insoluble in saline. The saline was examined visually for any solids, so it does not appear that any unencapsulated dye was released into the saline. No water-soluble species leached out from the gels, because no dye absorbance peak was detected at 425 nm by the spectrophotometer.

All particles have been shown to be shelf stable according to FDA regulated criteria.

Example 23 Code Name of Examples of Composite Particles of the Present Disclosure Table 19 shows a list of examples of the composite particles of the present disclosure.

TABLE 19

List and code name of composite particles

| Code | Polymer System |
|---|---|
| BC01 | Dye encapsulated nanoparticles {zinc (II) 5,10,15,20-(tetra phenyl) porphyrin (dye) poly(2-methyl oxazoline)2400-b-poly(dimethyl siloxane)5000-b-poly(2-methyl oxazoline)2400 (triblock-copolymer)} |
| PN01 | Dye encapsulated nanoparticles {zinc (II) 5,10,15,20-(tetra phenyl) porphyrin (dye) poly(ethylene oxide)4000-b-poly (propylene glycol)3000-b-poly (ethylene oxide)4000 (triblock-copolymer)} |
| PH01 | Dye encapsulated nanoparticles {zinc (II) 5,10,15,20-(tetra phenyl) porphyrin (dye) poly(n-butylacrylate)7500-b-poly (acrylic acid)5500 (diblock-copolymer)} |
| CS00 | Free zinc (II) 5,10,15,20-(tetra phenyl) Porphyrin |
| CS01 | Dye encapsulated nanoparticles {zinc (II) 5,10,15,20-(tetra phenyl) porphyrin (dye) poly(1,2-butadiene)31500-b-poly (methyl methacrylate)21000 (diblock-copolymer)} shell crosslinked using tetraethyl orthosilicate (5 times the weight to the hydrophilic block) |
| CS02 | Dye encapsulated nanoparticles {zinc (II) 5,10,15,20-(tetra phenyl) porphyrin (dye) poly(1,2-butadiene)31500-b-poly (methyl methacrylate)21000 (diblock-copolymer)} shell crosslinked using tetraethyl orthosilicate (5 times the weight to the hydrophilic block) |
| CS03 | Dye encapsulated nanoparticles {zinc (II) 5,10,15,20-(tetra phenyl) porphyrin (dye) poly(1,2-butadiene)31500-b-poly (methyl methacrylate)21000 (diblock-copolymer)} shell crosslinked using tetraethyl orthosilicate (5 times the weight to the hydrophilic block) |
| CS04 | Dye encapsulated nanoparticles {zinc (II) 5,10,15,20-(tetra phenyl) porphyrin (dye) poly(1,2-butadiene)31500-b-poly (acrylic acid)6500 (diblock-copolymer)} shell crosslinked using tetraethyl orthosilicate (5 times the weight to the hydrophilic block) |
| CS05 | Dye encapsulated nanoparticles {zinc (II) 5,10,15,20-(tetra phenyl) porphyrin (dye) poly(vinyl alcohol)2300-b-poly (methyl methacrylate )21000 (diblock-copolymer)} shell crosslinked using tetraethyl orthosilicate (5 times the weight to the hydrophilic block) |
| CS06 | Dye encapsulated nanoparticles {zinc (II) 5,10,15,20-(tetra phenyl) porphyrin (dye) poly(styrene) 1600-b-poly (ethylene oxide)5000 (diblock-copolymer)} shell crosslinked using tetraethyl orthosilicate (5 times the weight to the hydrophilic block) |
| CS07 | Dye encapsulated nanoparticles {zinc (II) 5,10,15,20-(tetra phenyl) porphyrin (dye) poly(1,2-butadiene) 31500-b-poly (methyl methacrylate)21000 (diblock-copolymer)}core crosslinked via free radicalization in the presence of trimethylolpropane tris(3-mercaptopropionate), initiated using azobisisobutyronitrile (AIBN) at 80 degrees Celsius for 24 hours |
| CS08 | Dye encapsulated nanoparticles {zinc (II) 5,10,15,20-(tetra phenyl) porphyrin (dye) poly(1,4-butadiene) 9000-b-poly (acrylic acid)3500 (diblock-copolymer)} core crosslinked via free radicalization in the presence of trimethylolpropane tris(3-mercaptopropionate), initiated using azobisisobutyronitrile (AIBN) at 80 degrees Celsius for 24 hours |
| CS09 | Dye encapsulated nanoparticles {zinc (II) 5,10,15,20-(tetra phenyl) porphyrin (dye) poly(methyl methacrylate)3000-b-poly (ethylene oxide)3000 (diblock-copolymer)} |
| CS10 | Dye encapsulated nanoparticles {zinc (II) 5,10,15,20-(tetra phenyl) porphyrin (dye) poly(2-methyl oxazoline)2400-b-poly(dimethyl siloxane)5000-b-poly(2-methyl oxazoline)2400 (triblock-copolymer)} |
| CS11 | Dye encapsulated nanoparticles {zinc (II) 5,10,15,20-(tetra phenyl) porphyrin (dye) poly(n-butylacrylate)7500-b-poly (acrylic acid)5500 (diblock-copolymer)} |
| CS12 | Dye encapsulated nanoparticles {zinc (II) 5,10,15,20-(tetra phenyl) porphyrin (dye) poly(ethylene oxide)4000-b-poly(methyl ethylene oxide)3000-b-poly(ethylene oxide)4000 (triblock-copolymer)} |
| CS13 | Dye encapsulated nanoparticles {zinc (II) 5,10,15,20-(tetra phenyl) porphyrin (dye) poly(1,2-butadiene)31,000-b-poly (methyl methacrylate)21,500 (diblock-copolymer)} crosslinked via tetraethyl orthosilicate (5 time the weight of the hydrophilic block) and hydrochloric acid. |
| CS14 | Dye encapsulated Nanoparticle {Zinc (II) 5,10,15,20-(tetra phenyl) porphyrin (dye) Polyethylene oxide)4000-b-poly(methyl ethylene oxide)3000-b-poly(ethylene oxide) (triblock-copolymer)4000} crosslinked via tetraethyl orthosilicate (5 time the weight of the hydrophilic block) and by free radicalization (1%) |
| CS15 | Dye encapsulated Nanoparticle {Zinc (II) 5,10,15,20-(tetra phenyl) porphyrin (dye) Polyethylene oxide)4000-b-poly(methyl ethylene oxide)3000-b-poly(ethylene oxide) (triblock-copolymer)4000} crosslinked via tetraethyl orthosilicate (5 time the weight of the hydrophilic block) and hydrochloric acid. |
| CS16 | Dye encapsulated nanoparticles {zinc (II) 5,10,15,20-(tetra phenyl) porphyrin (dye) poly(dimethyl siloxane) 8000-b-poly (acrylic acid) 8000 (diblock-copolymer)} |
| CS17 | Dye encapsulated nanoparticles {zinc (II) 5,10,15,20-(tetra phenyl) porphyrin (dye) poly(dimethyl siloxane) 8000-b-poly (acrylic acid) 8000 (diblock-copolymer)} crosslinked using tetraethyl orthosilicate (5 time the weight of the hydrophilic block) |

TABLE 19-continued

List and code name of composite particles

Code | Polymer System

CS18 Dye encapsulated nanoparticles {zinc (II) 5,10,15,20-(tetra phenyl) porphyrin (dye) poly(1,2-butadiene) 15000-b-poly (acrylic acid)6500 (diblock-copolymer)}

CS19 Dye encapsulated Nanoparticle {Zinc (II) 5,10,15,20-(tetra phenyl) porphyrin (dye) Poly(1,2-butadiene) 15000-b-poly (acrylic acid)6500 (diblock-copolymer)} Crosslinked by tetraethyl orthosilicate, free radicalization, and acid CS20 Dye encapsulated Nanoparticle {Zinc (II) 5,10,15,20-(tetra phenyl) porphyrin (dye) Poly(1,2-butadiene) 15000-b-poly (acrylic acid)6500 (diblock-copolymer)} Crosslinked by tetraethyl orthosilicate, free radicalization, acid, and heat CS21 Dye encapsulated Nanoparticle {Zinc (II) 5,10,15,20-(tetra phenyl) porphyrin (dye) Poly(1,2-butadiene) 15000-b-poly (acrylic acid)6500 (diblock-copolymer)} Crosslinked by tetraethyl orthosilicate, and free radicalization CS22 Dye encapsulated Nanoparticle {Zinc (II) 5,10,15,20-(tetra phenyl) porphyrin (dye) Poly(1,2-butadiene) 15000-b-poly (acrylic acid)6500 (diblock-copolymer)} Crosslinked by tetraethyl orthosilicate, free radicalization, and heat CS23 Dye encapsulated nanoparticles {zinc (II) 5,10,15,20-(tetra phenyl) porphyrin (dye) poly(1,2-butadiene) 15000-b-poly (acrylic acid)6500 (diblock-copolymer)} Crosslinked by tetraethyl orthosilicate (20 times the weight to the hydrophilic block)

CS24 Dye encapsulated Nanoparticle {Zinc (II) 5,10,15,20-(tetra phenyl) porphyrin (dye) Poly(vinyl alcohol) 2300-b-poly (methyl methacrylate)25000 (diblock-copolymer)})} shell crosslinked using tetraethyl orthosilicate (20 times the weight to the hydrophilic block)

CS25 Dye encapsulated nanoparticles {zinc (II) 5,10,15,20-(tetra phenyl) porphyrin (dye) poly(methyl methacrylate)7400-b-poly (acrylic acid)24300 (diblock-copolymer)} shell crosslinked using tetraethyl orthosilicate (20 times the weight to the poly (acrylic acid)block)

CS26 Dye encapsulated nanoparticles {zinc (II) 5,10,15,20-(tetra phenyl) porphyrin (dye) poly(methyl methacrylate)7400-b-poly (acrylic acid)24300 (diblock-copolymer)}

CS27 Dye encapsulated Nanoparticle {Zinc (II) 5,10,15,20-(tetra phenyl) porphyrin (dye) Poly(vinyl alcohol) 2300-b-poly (methyl methacrylate)25000 (diblock-copolymer)})} shell crosslinked using tetraethyl orthosilicate (5 times the weight to the hydrophilic block) in the presence of 0.001M hydrochloric acid, heated for 24 hours at 80° C.

CS28 Dye encapsulated nanoparticles {zinc (II) 5,10,15,20-(tetra phenyl) porphyrin (dye) poly(dimethyl siloxane) 8000-b-poly (acrylic acid) 8000 (diblock-copolymer)} shell crosslinked using tetraethyl orthosilicate (5 times the weight to the hydrophilic block) in the presence of 0.001M hydrochloric acid, heated for 24 hours at 80 degrees Celsius CS29 Dye encapsulated nanoparticles {zinc (II) 5,10,15,20-(tetra phenyl) porphyrin (dye) poly(methyl methacrylate)7400-b-poly (acrylic acid)24300 (diblock-copolymer)} shell crosslinked using tetraethyl orthosilicate (5 times the weight to the hydrophilic block) in the presence of 0.001M hydrochloric acid, heated for 24 hours at 80 degrees Celsius CS30 Dye encapsulated nanoparticles {zinc (II) 5,10,15,20-(tetra phenyl) porphyrin (dye) poly(1,2-butadiene)15000-b-poly (acrylic acid)6500 (diblock-copolymer)} shell crosslinked using tetraethyl orthosilicate (5 times the weight to the hydrophilic block) in the presence of 0.001M hydrochloric acid, heated for 24 hours at 80 degrees Celsius CS31 Dye encapsulated nanoparticles {zinc (II) 5,10,15,20-(tetra phenyl) porphyrin (dye) poly(dimethyl siloxane) 5000-b-poly (ethylene oxide) 2100 (diblock-copolymer)} shell crosslinked using tetraethyl orthosilicate 5 times the weight to the hydrophilic block) in the presence of 0.001M hydrochloric acid, heated for 24 hours at 80 degrees Celsius CS32 Dye encapsulated nanoparticles {zinc (II) 5,10,15,20-(tetra phenyl) porphyrin (dye) poly( vinyl alcohol)2500-b-poly (styrene)12500(diblock-copolymer)} shell crosslinked using tetraethyl orthosilicate (0.5 times the weight to the poly (vinyl alcohol) block)

CS33 Dye encapsulated nanoparticles {zinc (II) 5,10,15,20-(tetra phenyl) porphyrin (dye) poly(styrene) 1300-b-poly (ethylene oxide)5600 (diblock-copolymer)} shell crosslinked using tetraethyl 5 times the weight to the hydrophilic block) in the presence of 0.001M hydrochloric acid, heated for 24 hours at 80 degrees Celsius CS34 Dye encapsulated nanoparticles {zinc (II) 5,10,15,20-(tetra phenyl) porphyrin (dye) poly(n-butylacrylate)7500-b-poly (acrylic acid)5500 (diblock-copolymer)} shell crosslinked using tetraethyl orthosilicate 5 times the weight to the hydrophilic block) in the presence of 0.001M hydrochloric acid, heated for 24 hours at 80 degrees Celsius CS35 Dye encapsulated nanoparticles {zinc (II) 5,10,15,20-(tetra phenyl) porphyrin (dye) poly(methyl methacrylate)3000-b-poly (ethylene oxide)3000 (diblock-copolymer)} shell crosslinked using tetraethyl 5 times the weight to the hydrophilic block) in the presence of 0.001M hydrochloric acid, heated for 24 hours at 80 degrees Celsius

TABLE 19-continued

List and code name of composite particles

| Code | Polymer System |
|---|---|
| CS36 | Dye encapsulated nanoparticles {zinc (II) 5,10,15,20-(tetra phenyl) porphyrin (dye) poly(1,4-butadiene) 9000-b-poly (acrylic acid)3500 (diblock-copolymer)} shell crosslinked using tetraethyl orthosilicate 5 times the weight to the hydrophilic block) in the presence of 0.001M hydrochloric acid, heated for 24 hours at 80 degrees Celsius |
| CS37 | Dye encapsulated nanoparticles {zinc (II) 5,10,15,20-(tetra phenyl) porphyrin (dye) poly(1,2-butadiene) 15000-b-poly (acrylic acid)6500 (diblock-copolymer)} shell crosslinked using fumed 5 times the weight to the hydrophilic block) in the presence of 0.001M hydrochloric acid, heated for 24 hours at 80 degrees Celsius |
| CS38 | Dye encapsulated nanoparticles {zinc (II) 5,10,15,20-(tetra phenyl) porphyrin (dye) poly(1,2-butadiene) 15000-b-poly (acrylic acid)6500 (diblock-copolymer)}core crosslinked via free radicalization in the presence of trimethylolpropane tris(3-mercaptopropionate), initiated using azobisisobutyronitrile (AIBN) at 80 degrees Celsius for 24 hours |
| CS39 | Dye encapsulated nanoparticles {zinc (II) 5,10,15,20-(tetra phenyl) porphyrin (dye) poly(1,4-butadiene) 9000-b-poly (acrylic acid)3500 (diblock-copolymer)} core crosslinked via free radicalization in the presence of trimethylolpropane tris(3-mercaptopropionate), initiated using azobisisobutyronitrile (AIBN) at 80 degrees Celsius for 24 hours |
| CS40 | Dye encapsulated nanoparticles {zinc (II) 5,10,15,20-(tetra phenyl) porphyrin (dye) poly(1,2-butadiene) 15000-b-poly (acrylic acid)6500 (diblock-copolymer)} shell crosslinked using tetraethyl orthosilicate 5 times the weight to the hydrophilic block) in the presence of 0.001M hydrochloric acid, core crosslinked via free radicalization in the presence of trimethylolpropane tris(3-mercaptopropionate), initiated using azobisisobutyronitrile (AIBN) at 80 degrees Celsius for 24 hours |
| CS41 | Dye encapsulated nanoparticles {zinc (II) 5,10,15,20-(tetra phenyl) porphyrin (dye) poly(1,4-butadiene) 9000-b-poly (acrylic acid)3500 (diblock-copolymer)} shell crosslinked using tetraethyl orthosilicate 5 times the weight to the hydrophilic block) in the presence of 0.001M hydrochloric acid, core crosslinked via free radicalization in the presence of trimethylolpropane tris(3-mercaptopropionate), initiated using azobisisobutyronitrile (AIBN) at 80 degrees Celsius for 24 hours |
| CS42 | Dye encapsulated nanoparticles {zinc (II) 5,10,15,20-(tetra phenyl) porphyrin (dye) poly(methyl methacrylate)3000-b-poly (ethylene oxide)3000 (diblock-copolymer)} |

While the present disclosure has been described with reference to what are presently considered to be the preferred examples, it is to be understood that the invention is not limited to the disclosed examples. To the contrary, the invention is intended to cover various modifications and equivalent arrangements included within the spirit and scope of the appended claims.

All publications, patents and patent applications are herein incorporated by reference in their entirety to the same extent as if each individual publication, patent or patent application was specifically and individually indicated to be incorporated by reference in its entirety.

The invention claimed is:

1. A contact lens comprising one or more composite particle, the one or more composite particle comprising:
   a hydrophobic dye; and
   an amphiphilic block copolymer encapsulating the hydrophobic dye,
   wherein the hydrophobic dye has an absorbance in the range of from the ultraviolet region to the infrared region of the electromagnetic spectrum providing UV-Vis absorbance to the contact lens.

2. The contact lens of claim 1, wherein the amphiphilic block copolymer is crosslinked.

3. The contact lens of claim 1, wherein the hydrophobic dye is a laser dye or an absorber dye.

4. The contact lens of claim 1, wherein the hydrophobic dye is selected from coumarins, fluoresceins, rhodamines, pyrromethenes, cyanines, carbocyanines, flavins, oxazines, carbazines, stilbenes, diphenylstilbenes, oxazols, diphenyls, terphenyls, quaterphenyls, polyphenyls, phenyloxazones, phenoxazoniums, pyridines, pyridiniums, carotenoids, retinoids, porphyrins, phthalocyanines, benzophenones, metal oxides, benzotriazoles, tocopherols, tocotrienols, anthracenes, perylene, polycyclic aromatic hydrocarbons (PAH), polyenes, corrins, chlorins, corphins, indolenines, chlorophylls, azo dyes, polymethines, diarylmethanes, triarylmethanes, polyenes, anthracinediones, pyrazolones, anthraquinones, pyrans, phenothiazines, triazines, oxalanilides, acridines, benzanthrones and combinations thereof.

5. The contact lens of claim 1, wherein the amphiphilic block copolymer is biocompatible.

6. The contact lens of claim 1, wherein the amphiphilic block copolymer is a poly(alkyl acrylate)-based copolymer, a poly(alkyl methacrylate)-based copolymer, a poly (acrylic acid)-based copolymer, a poly(methacrylic acid)-based copolymer, a polydiene-based copolymer, a poly(N-isopropylacrylamide)-based copolymer, a polyethylene glycol-based copolymer, a poly (methylene indane)-based copolymer, a polysiloxane-based copolymer, a polystyrene-based copolymer, a substituted polystyrene-based copolymer, a poly(vinyl pyridine)-based copolymer, a poly(vinyl alcohol) based copolymer, a poly(alkylacrylic acid)-based copolymer, a poly(alkylene oxide)-based copolymer, a poly(dialkyl siloxane)-based copolymer, a poly(olefin)-based copolymer, a poly(alkylene oxide diacrylate)-based copolymer, a poly (butanediol diacrylate)-based copolymer, or combinations thereof.

7. The contact lens of claim 1, wherein the amphiphilic block copolymer is selected from poly(1,2-butadiene)-b- poly (acrylic acid), poly(1,2-butadiene)-b-poly (ethylene oxide), poly(1,2-butadiene)-b-poly(methacrylic acid), poly (1,2-butadiene)-b-poly (methyl methacrylate), poly(1,2-butadiene)-b-poly(vinyl alcohol), poly(1,2-butadiene-co-1,4-butadiene)-b-poly (acrylic acid), poly(1,2-butadiene-co-1,4-butadiene)-b-poly (ethylene oxide), poly(1,2-butadiene-co-1,4-butadiene)-b-poly(methacrylic acid), poly(1,2-butadiene-co-1,4-butadiene)-b-poly(vinyl alcohol), poly(1,4-butadiene)-b-poly (acrylic acid), poly(1,4-butadiene)-b-poly (ethylene oxide), poly(1,4-butadiene)-b-poly (methacrylic acid), poly(1,4-butadiene)-b-poly(vinyl alcohol), poly(dimethylsiloxane)-b-poly (acrylic acid), poly (dimethylsiloxane)-b-poly (ethylene oxide), poly(dimethylsiloxane)-b-poly(methacrylic acid), poly(dimethylsiloxane)-b-poly (n-butyl acrylate), poly (ethylene oxide)-b-poly (butadiene), poly (ethylene oxide)-b-poly (dimethylsiloxane), poly (ethylene oxide)-b-poly (methyl methacrylate), poly (ethylene oxide)-b-poly(n-butyl acrylate), poly (ethylene oxide)-b-poly(styrene), poly (ethylene oxide)-b-poly(tert-butyl methacrylate), poly (methyl methacrylate)-b-poly (acrylic acid), poly (methyl methacrylate)-b-poly(dimethylsiloxane), poly (methyl methacrylate)-b-poly (ethylene oxide), poly (methyl methacrylate)-b-poly (methacrylic acid), poly (methyl methacrylate)-b-poly (styrene), poly(n-butyl acrylate)-b-poly (acrylic acid), poly (propylene oxide)-b-poly(butadiene), poly(propylene oxide)-b-poly(dimethylsiloxane), poly(propylene oxide)-b-poly (methyl methacrylate), poly(propylene oxide)-b-poly (n-butyl acrylate), poly(propylene oxide)-b-poly(styrene), poly(propylene oxide)-b-poly(tert-butyl methacrylate), poly (vinyl alcohol)-b-poly(butadiene), poly(vinyl alcohol)-b-poly(dimethylsiloxane), poly(vinyl alcohol)-b-poly (methyl methacrylate), poly(vinyl alcohol)-b-poly(n-butyl acrylate), poly(vinyl alcohol)-b-poly(styrene), poly(vinyl alcohol)-b-poly(tert-butyl methacrylate), poly(1,2-butadiene)$_{15000}$-b-poly (acrylic acid)$_{6500}$, poly(1,4-butadiene)$_{9000}$-b-poly (acrylic acid)$_{3500}$, poly(dimethylsiloxane)$_{5000}$-b-poly (ethylene oxide)$_{2100}$, poly(dimethylsiloxane)$_{8000}$-b-poly (acrylic acid)$_{8000}$, poly (methyl methacrylate)$_{3000}$-b-poly (ethylene oxide)$_{3000}$, poly (methyl methacrylate)$_{7400}$-b-poly (acrylic acid)$_{24300}$, poly(n-butyl acrylate)$_{7500}$-b-poly (acrylic acid)$_{5500}$, poly(styrene)$_{1300}$-b-poly (ethylene oxide)$_{5600}$, poly(vinyl alcohol)$_{2300}$-b-poly (methyl methacrylate)$_{25000}$, poly(vinyl alcohol)$_{2500}$-b-poly(styrene)$_{12500}$, and combinations thereof.

8. The contact lens of claim 1, wherein the amphiphilic block copolymer is terminally functionalized, optionally, the amphiphilic block copolymer is acrylate-terminated, alkylacrylate-terminated, methacrylate-terminated, alkyl methacrylate-terminated, or combinations thereof.

9. The contact lens of claim 2, wherein the amphiphilic block copolymer is crosslinked using a crosslinking method selected from dialdehyde crosslinking, diamine crosslinking, diol crosslinking, ester crosslinking, free radical initiated alkene polymerization, Q-ammonium crosslinking, silane crosslinking, trialdehyde crosslinking, triamine crosslinking, triol crosslinking, urethane crosslinking, and combinations thereof.

10. The contact lens of claim 1, wherein the composite particle has a diameter of about 1 to about 600 nanometers.

11. The contact lens of claim 1, wherein the maximum UV-Vis absorbance of the composite particle after being autoclaved at about 121° C. at 108 kPa in an aqueous solution is at least 50%, 60%, 70%, 80%, or 90% of the maximum UV-Vis absorbance before the autoclaving.

12. The contact lens of claim 1, wherein the UV-Vis absorbance spectrum of the composite particle after ethanol wash with about 25% v/v, about 50% v/v, about 75% v/v or about 95% v/v ethanol in water for about one hour is substantially unchanged.

13. The contact lens of claim 1, wherein the change in the maximum UV-Vis transmittance of the composite particle after photobleaching at UV exposure at 250 nm at 12.8 mW/cm$^2$ after about 1 min, about 3 min, about 5 min, about 10 min, or about 15 min is smaller than the change in the maximum UV-Vis transmittance of the hydrophobic dye alone after photobleaching at UV exposure at 250 nm after about 1 min, about 3 min, about 5 min, about 10 min, or about 15 min respectively.

14. The contact lens of claim 1, wherein the maximum UV-Vis absorbance of the contact lens after photobleaching by UV of 250 nm at 12.8 mW/cm$^2$ for about 1 min, about 3 min, about 5 min, about 10 min, or about 15 min is at least 50%, 60%, 70%, 80%, or 90% of the maximum UV-Vis absorbance before the UV exposure at 250 nm at 12.8 mW/cm$^2$.

15. The contact lens of claim 1, wherein the UV-Vis absorbance spectrum of the contact lens is substantially unchanged after being autoclaved at about 121° C. at 108 kPa in an aqueous solution.

16. The contact lens of claim 1, wherein the maximum UV-Vis absorbance of the contact lens after ethanol wash with about 25% v/v, about 50% v/v, about 75% v/v or about 95% v/v ethanol in water for about one hour is at least 50%, 60%, 70%, 80%, or 90% of the maximum UV-Vis absorbance before the ethanol wash.

17. The contact lens of claim 1, wherein the maximum UV-Vis absorbance of the contact lens after storage in a saline solution at 50° C. for at least one day, at least three days, at least four days, at least five days, at least 125 hours, at least 130 hours, or at least 136 hours is at least 50%, 60%, 70%, 80%, or 90% of the maximum UV-Vis absorbance before the storage.

18. A method of optical filtration comprising selectively blocking light radiation using contact lens as defined in claim 1.

19. The method of claim 18, wherein the light radiation is selected from UV light, blue light and combinations thereof.

20. The contact lens of claim 1, wherein substantially no leaching of the one or more composite particles from the contact lens is observed over time, exposure to organic solvent or to temperature change.

* * * * *